(12) United States Patent
Nystad

(10) Patent No.: US 9,142,037 B2
(45) Date of Patent: Sep. 22, 2015

(54) METHODS OF AND APPARATUS FOR ENCODING AND DECODING DATA

(71) Applicant: Jorn Nystad, Trondheim (NO)

(72) Inventor: Jorn Nystad, Trondheim (NO)

(73) Assignee: ARM LIMITED, Cambridge (GB)

( * ) Notice: Subject to any disclaimer, the term of this patent is extended or adjusted under 35 U.S.C. 154(b) by 9 days.

(21) Appl. No.: 13/933,604

(22) Filed: Jul. 2, 2013

(65) Prior Publication Data

US 2014/0193081 A1    Jul. 10, 2014

(30) Foreign Application Priority Data

Jul. 4, 2012  (GB) .................................. 1211862.6

(51) Int. Cl.
*G06T 9/00* (2006.01)
*G06T 7/40* (2006.01)
*H04N 19/90* (2014.01)

(52) U.S. Cl.
CPC ... *G06T 9/00* (2013.01); *G06T 7/40* (2013.01); *H04N 19/90* (2014.11)

(58) Field of Classification Search
USPC .......................................... 382/197, 232, 248
See application file for complete search history.

(56) References Cited

U.S. PATENT DOCUMENTS

| | | | |
|---|---|---|---|
| 5,046,119 A | 9/1991 | Hoffert | |
| 5,047,853 A | 9/1991 | Hoffert | |
| 5,956,431 A | 9/1999 | Iourcha | |
| 6,298,169 B1 | 10/2001 | Guenter | |
| 6,775,417 B2 | 8/2004 | Hong | |
| 6,937,250 B1 | 8/2005 | Schilling | |
| 6,940,511 B2 | 9/2005 | Akenine-Moller | |
| 7,242,811 B2 | 7/2007 | Fenney | |
| 7,734,105 B2 | 6/2010 | Strom et al. | |
| 8,102,402 B2 | 1/2012 | Sorgard | |
| 8,289,343 B2 | 10/2012 | Sorgard | |
| 2002/0171660 A1 | 11/2002 | Luo | |
| 2003/0227462 A1 | 12/2003 | Akenine-Moller | |
| 2011/0148896 A1 | 6/2011 | Lee | |
| 2012/0281005 A1 | 11/2012 | Nystad | |
| 2012/0281006 A1 | 11/2012 | Nystad | |

(Continued)

FOREIGN PATENT DOCUMENTS

| | | |
|---|---|---|
| CN | 101398936 | 4/2009 |
| GB | 1517383 | 8/1975 |

(Continued)

OTHER PUBLICATIONS

Office Action dated Apr. 30, 2014 in U.S. Appl. No. 13/464,663, 6 pages.

(Continued)

*Primary Examiner* — Duy M Dang
(74) *Attorney, Agent, or Firm* — Vierra Magen Marcus LLP

(57) ABSTRACT

When encoding a set of texture data elements 30 for use in a graphics processing system, the direction along which the data values of the set of texture data elements in question exhibit the greatest variance in the color space is estimated by using one or more infinite planes 41 to divide the texture data elements in the color space. For each such plane, texture data element values on each side of the plane are added up to give respective sum points 48, 49, and the vector 50 between these two sum points determined. The direction in the data space of one of the determined vectors 50 is then used to derive endpoint color values to use when encoding the set of texture data elements.

23 Claims, 15 Drawing Sheets

(56) References Cited

U.S. PATENT DOCUMENTS

2012/0281007 A1 11/2012 Nystad
2012/0281925 A1 11/2012 Nystad

FOREIGN PATENT DOCUMENTS

| GB | 2423906 | 9/2006 |
|---|---|---|
| GB | 2439481 | 12/2007 |
| WO | WO9922519 | 5/1999 |
| WO | WO2009/133860 | 4/2009 |

OTHER PUBLICATIONS

Office Action (Restriction) dated May 13, 2014 in U.S. Appl. No. 13/464,686, 6 pages.
Office Action (Restriction) dated May 13, 2014 in U.S. Appl. No. 13/464,696, 6 pages.
Office Action dated Aug. 20, 2014 in U.S. Appl. No. 13/464,663, 24 pages.
Combined Search and Examination Report, dated Sep. 27, 2012, GB Patent Application No. GB1208056.0.
Combined Search and Examination Report, dated Oct. 9, 2012, GB Patent Application No. GB1208058.6.
Combined Search and Examination Report, dated Oct. 9, 2012, GB Patent Application No. GB1208059.4.
Combined Search and Examination Report, dated Oct. 8, 2012, GB Patent Application No. GB1208060.2.
BC6H Format, 2011 Microsoft, http://msdn.microsoft.com/en-us/library/hh308952(d=printer).aspx.
BC7H Format, 2011 Microsoft, http://msdn.microsoft.com/en-us/library/hh308953(d=printer).aspx.
Block Truncation Coding, Wikipedia, Aug. 2013, http://en.wikipedia.org/wiki/Block_Truncation_Coding.
Fenney, "Texture Compression using Low-Frequency Signal Modulation," Graphics Hardware 2003, Imagination Technologies Ltc., UK, The Eurographics Association 2003.
PVRTC, Wikipedia, Mar. 2012, http://en.wikipedia.org/wiki/PVRTC.
S3 Texture Compression, Wikipedia, Nov. 2013, http://en.wikipedia.org/wiki/S3_Texture_Compression.
Strom, "iPackman: High-Quality, Low-Complexity Texture Compression for Mobile Phones," Lund University, Graphics Hardware 2005, The Eurographics Association.
Karhunen-Loeve theorem, Wikipedia, Sep. 2013, http://en.wikipedia.org/wiki/Karhunen%E2%80%93Lo%C3%A8ve_theorem.
Castano, "High Quality DXT Compression using OpenCL for CUDA," NVIDIA, Mar. 2009.
"Simple, fast DXT compressor," Molly Rocket Feed, Jun. 2007, https://mollyrocket.com/forums/viewtopic.php?t=392.
van Waveren, "Real-Time DXT Compression," Id Software, Inc. May 20, 2006.
Response to Office Action (Restriction) filed Jun. 30, 2014 in U.S. Appl. No. 13/464,663, 13 pages.
Response to Office Action (Restriction) filed Jul. 14, 2014 in U.S. Appl. No. 13/464,686, 12 pages.
Response to Office Action (Restriction) filed Jul. 14, 2014 in U.S. Appl. No. 13/464,696, 17 pages.
UK Search Report dated Feb. 28, 2013, UK Patent Application No. GB1211862.6.
English translation of Abstract of Chinese Application No. CN101398936.
Office Action dated Sep. 18, 2014 in U.S. Appl. No. 13/464,686, 29 pages.
Office Action dated Sep. 18, 2014 in U.S. Appl. No. 13/464,696, 24 pages.
Response to Office Action filed Nov. 20, 2014 in U.S. Appl. No. 13/464,663, 9 pages.
Response to Office Action filed Jan. 20, 2015 in U.S. Appl. No. 13/464,696, 15 pages.
Notice of Allowance dated Jan. 20, 2015 in U.S. Appl. No. 13/464,663, 16 pages.
Final Office Action dated Apr. 9, 2015 in U.S. Appl. No. 13/464,686, 25 pages.
Notice of Allowance dated Feb. 6, 2015 in U.S. Appl. No. 13/464,696, 22 pages.
Response to Office Action filed Feb. 18, 2015 in U.S. Appl. No. 13/464,686, 17 pages.
Restriction dated Mar. 17, 2015 in U.S. Appl. No. 13/464,676, 6 pages.

Block Layout Overview

FIG. 5

*Non-Partitioned Block Layout with Dual Planes*

FIG. 6

*2-Partition Block Layout*

FIG. 7

*3-Partition Block Layout*

FIG. 8

*4-Partition Block Layout*

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| Texel Index Data (Variable Width) ||||||||||||||||||||||||||||||||

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| | | | | | | | CM1 | | CCS | | Endpoint Color Data 1 (Variable Width) |||||||||||| Endpoint Color Data 0 (Variable ||||||||

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Width) | CM0 | | C1 | | C0 | | CPS | Partition Index ||||||| 0 | 1 | Index Mode |||||||||||||

FIG. 9

*2-Partition Block Layout with Dual Planes*

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| | | | | | | | | Color A | | | | | | | | | | | | | Color B | | | | | | | | | | |

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| | | | | | | | | Color G | | | | | | | | | | | | | Color R | | | | | | | | | | |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| | | | | High T | | | | | | | | | | | Low T | | | | | | | | | | | | | High S | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | | Low S | | | | | | | | | | 1 | 1 | 1 | 1 | D | 1 | 1 | 1 | 1 | 1 | 1 | 1 | 1 | 0 |

2D Void-Extent Block Layout

FIG. 10

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| | | | | | Color A | | | | | | | | | | | | | | | | | Color B | | | | | | | | | |

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| | | | | | Color G | | | | | | | | | | | | | | | | | Color R | | | | | | | | | |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| | High P | | | | | | | | | | | | | | Low P | | | | | | | | | High T | | | | | | | Low T |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | High S | | | | | | | | | | | Low S | | | | | | | | | D | 1 | 1 | 1 | 1 | 1 | 1 | 1 | 0 | 0 |

*3D Void-Extent Block Layout*

FIG. 11

METHODS OF AND APPARATUS FOR ENCODING AND DECODING DATA

BACKGROUND

The technology described herein relates to methods of and apparatus for encoding and decoding data, and in particular to such methods and apparatus for use when compressing and decompressing texture data for use in computer graphics systems.

It is common in computer graphics systems to generate colours for sampling positions in an image to be displayed by applying so-called textures or texture data to the surfaces to be drawn. For example, surface detail on objects may be generated by applying a predefined "texture" to a set of graphics primitives (such as polygons) representing the object, to give the rendered image of the object the appearance of the "texture". Such textures are typically applied by storing an array of texture elements or "texels", each representing given texture data (such as colour, luminance, and/or light/shadow, etc., values) at a given location (position), and then mapping the texels onto the corresponding elements, such as (and, indeed, typically) a set of sampling positions, for the image to be displayed. The stored arrays of texture elements (data) are typically referred to as "texture maps".

Such arrangements can provide relatively high image quality, but have a number of drawbacks. In particular, the storage of the texture data and accessing it in use can place, e.g., high storage and processing requirements on a graphics processing device (or conversely lead to a loss in performance where such requirements are not met). This is particularly significant for lower power, mobile, and handheld, devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a graphics processing device when using textures.

It is common for texture compression techniques to use block-based encoding, i.e. arrangements in which the overall array of texture elements (the texture map) to be encoded is divided into an array of smaller blocks of texels (such as blocks of 4×4 texels), with each such block then being encoded (compressed), and decoded, separately. This can, e.g., help to make the decoding process more efficient, because the decoder, for example, may need to decode only one or a few of the encoded blocks to determine the value of a texel of interest, rather than the entire encoded texture.

Block-based texture compression techniques typically determine a reduced set or palette of colours (or other data) to be used for a given block of texels, and then store for each texture element (texel) in the block an index into the set or palette of colours, indicating the colour to be used for the texture element (texel) in question. This has the advantage that only an index, rather than a full, e.g. colour, value needs to be stored for each texel.

One known block-based texture compression technique is so-called block truncation encoding (BTC). In this technique the overall texture array (texture map) is subdivided into smaller blocks, e.g. of 4×4 texels, and a number (typically two) of base or primary colour values is determined for each such block, with each texel in the block being set to one of the base colour values. This saves on the data that has to be stored and accessed, but at a cost of lower image quality.

U.S. Pat. No. 5,047,853 describes an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two index bits, to indicate which of the four block "colours" should be used for the texel. This system provides improved image quality over basic block truncation coding, but requires more data per block.

There are other block-based texture compression schemes, such as S3TC, BC6 and BC7 that similarly divide the texture into blocks, then define two base "endpoint" colours for each block, form additional colours by interpolating between the two endpoint colours, and then use an index for each texel to select the colour for the texel from the resulting set of colours.

For example, in the S3TC texture compression format, a texture is represented as 4×4 texel blocks. For each block, two endpoint colors are determined, and two additional colors are formed through interpolation between the two endpoints. This results in a palette of four colors for the block that all lie on a straight line in the color-space. A texel index is then used, for each texel, to map the texel to one of the four colors. Each encoded block stores the two endpoint colors for the block and a grid of 4×4 texel indexes for the block.

The most complex step of these types of texture compression process is usually the selection of the two endpoint colors to use. This is usually done by determining a line in the colour space that the texel values can be projected on to. This line is usually derived by computing an average color and a direction vector for the texel block in question. The line in the color-space that the texels in the block are then projected on to is then determined to be the line passing through the average colour point and having the direction of the determined direction vector.

In these arrangements, the best direction vector to use is a vector that lies along the direction in the colour space along which the texels exhibit the greatest variance in their values (i.e. the dominant direction for the texel values in the colour space), and so is traditionally computed using the discrete Karhunen-Loewe Transform (KLT) (also known as Principal Component Analysis).

Thus, a standard method to compute the two endpoint colors to be used when encoding a block of texels (given the uncompressed texture, where every texel is represented, e.g. with an (R,G,B) color tuple, as the input) is as follows:

1. Compute an average color C across the block of texels to be encoded
2. For each texel, subtract the average color C from the texel's color value: T'=T−C
3. From the subtracted texel values in step 2, compute a covariance matrix M
4. Compute M's eigenvalues and eigenvectors, then keep the eigenvector V that represented the most energy. This can be done by computing the eigenvector corresponding to the largest eigenvalue, or by using the "Power Iteration" method to find the dominant eigenvector.
5. Define a parametric line in the color-space that passes through the average colour value C and has the direction of the determined eigenvector V, L=C+t*V
6. Project all the texels onto this line (i.e. determine, for each texel, the point on the line that is closest to that texel). This basically amounts to finding a parameter value t for the point on the line L that is closest to the texel: given a subtracted texel T'=T−C, the parameter can be computed as t=dot(V,T')/dot(V,V), where dot( ) denotes the usual vector dot-product.

7. Find the highest and lowest points (values) on the line that the texels were projected on to. This basically amounts to finding the lowest (t_low) and highest (t_high) parameter values that resulted from the texels.
8. Then define the endpoint colors as being the highest and lowest points (values) on the line that the texels were projected on to. This basically amounts to defining: E1=C+t_low*V and E2=C+t_high*V After these two endpoint values have been computed, the, e.g. two, other colour values to use for the encoded block are computed by interpolation from these endpoint colours (e.g. as ⅓ E1+⅔ E2, and ⅔ E1+⅓ E2, respectively). Each texel is then assigned an index corresponding to which of the, e.g., four, colours for the block its colour value is closest to (for fast encoding, this can be done by just rescaling and quantizing the parameter values 't' computed in step 6 above).

In this process, steps 1-4 make up the Karhunen-Loewe transform and the remaining steps make use of the KLT result to perform the actual texture compression.

Using the Karhunen-Loewe transform (and in particular steps 3 and 4 above) to determine the vector direction to use, while providing an accurate estimate of the desired dominant direction for the block of texels to be encoded, is computationally expensive, and prone to numeric instability and the requirement to handle special cases.

For example, when computing eigenvalues, it is necessary to solve a 3rd degree polynomial. Doing this analytically requires several expensive transcendental operations (cube-root, sine, cosine, arctan), and doing it numerically requires relatively complex methods (e.g. Jenkins-Traub) to ensure convergence in reasonable time.

Using a power iteration method to find the dominant eigenvector is simpler. However, this still requires picking a random vector, then repeatedly multiplying it with the covariance matrix until the resulting vector eventually converges to the dominant eigenvector. Care also needs to be taken to ensure that the repetition doesn't result in an overflow or underflow.

Special care is also needed to handle situations like uniform-colour blocks (which result in an all-zeroes covariance matrix; such a matrix has no eigenvectors), and blocks where there are two equally-dominant directions (multiplicity-2 eigenvalues).

This all means that while the existing techniques for deriving the endpoint colours to use when encoding a block of texels, and in particular for determining the direction of the line in the colour space to use when doing that, can accurately identify a good direction to use for this (namely the dominant direction (principal axis) of the texel values in the colour space), those existing techniques are computationally expensive and slow.

The Applicants believe therefore that there remains scope for improved techniques for estimating the dominant direction of a set (e.g. block) of texel values to be encoded (i.e. the direction along which the values of the texels being considered exhibit the greatest variance), and in particular when determining the, e.g., endpoint colours, to use when encoding texture data for use in a graphics processing system.

BRIEF DESCRIPTION OF THE DRAWINGS

A number of embodiments of the technology described herein will now be described by way of example only and with reference to the accompanying drawings, in which:

FIGS. 3 to 11 show encoded block layouts of the described embodiment of the technology described herein;

Like numerals are used for like features in the drawings (where appropriate).

DETAILED DESCRIPTION

Figure 1:
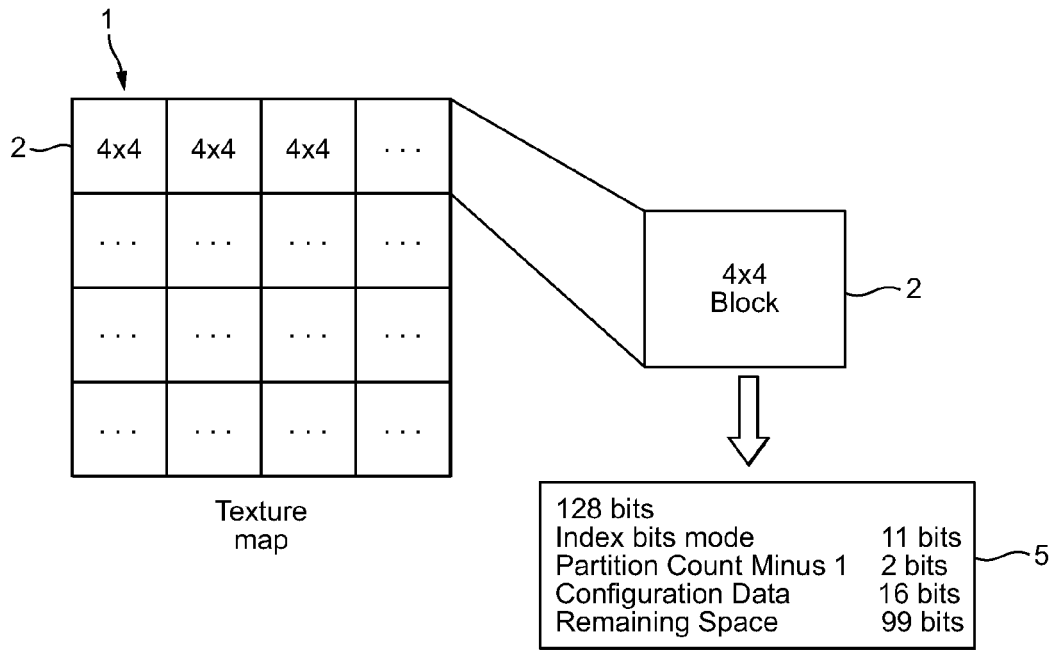
FIG. 1 shows schematically the encoding of an array of image data as a plurality of encoded data blocks.

A first embodiment of the technology described herein comprises a method of determining for a set of texture data elements to be encoded for use in a graphics processing system, a direction in the data space of the texture data elements to be used when determining a base data value or values to be used for the set of texture data elements when encoding the set of texture data elements, the method comprising:
  determining, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and
  using the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements.

A second embodiment of the technology described herein comprises an apparatus for determining for a set of texture data elements to be encoded for use in a graphics processing system, a direction in the data space of the texture data elements to be used when determining a base data value or values to be used for the set of texture data elements when encoding the set of texture data elements, the apparatus comprising:
  processing circuitry configured to:
  determine, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and
  use the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements.

The technology described herein relates to a technique and system for determining the direction in the data space (e.g. the colour space) of a set of texture data elements being encoded to use when determining base, e.g., endpoint, values to use when encoding the texture data elements. However, rather than using, e.g., eigenvector-based methods to do this, the technology described herein determines the direction to use by, in effect, dividing the texture data elements' values into two groups in their data space using a plane, and then determining the direction to use as being the direction from a point in the data space that is based on the values of the texture data elements whose values lie on one side of the plane in the data space to a point in the data space that is based on the values of the texture data elements whose values lie on the other side of the plane in the data space.

As will be discussed further below, the Applicants have found that this arrangement can provide a sufficiently accurate and reliable estimate of the dominant direction in the data space for a set of texture data elements to be encoded (i.e. of the direction in the data space along which the texture data elements' values exhibit the greatest variance) to be suitable for use for texture compression schemes. Moreover, this is without the need to use eigenvector-based methods as are used in the prior art. The technology described herein does not need to use complex computation techniques such as multiplications, divisions, root-taking, nor allow for special-case handling, and can accordingly estimate the dominant direction in their data space of a set of texture data element values to be encoded faster than what is possible with standard eigenvector-based methods. It is also accordingly suitable for direct hardware implementation, unlike traditional KLT-based methods, and, due to the relatively low computational load of the technology described herein, it is also suitable for use with "ultrafast" software encoders, for example.

Thus, the technology described herein comprises a method and system for determining the dominant direction in the data space of a set of texture data element values to be encoded that is much simpler than the KLT method, and which thus, unlike the KLT method, is suitable for "ultrafast" texture compression and hardware texture compression, but which nonetheless can retain texture compression quality.

The technology described herein can be used for and with any texture compression scheme that requires a 1-dimensional partition of the texel values in the data, e.g. colour, space, such as compressors for S3TC, the BTC family, ASTC, etc. It is particularly suited for use with block-based encoding schemes, i.e. in which a texture to be encoded is divided into smaller blocks (arrays) of texels for encoding purposes.

The set of texture data elements for which the dominant direction is estimated may comprise any suitable set of texture data elements of a texture to be encoded. In an embodiment, it comprises a set of texture data elements from a single block of texture data elements that the texture to be encoded has been divided into for encoding purposes (e.g. in a block-based encoding scheme). In this case, the set of texture data elements could comprise all of the texture data elements of the block (and in one embodiment this is what is done). Alternatively, the set of texture data elements could comprise a subset of the texture data elements of a given block of texture data elements that the texture has been divided into for encoding purposes. This may be appropriate where, for example, a block of texture data elements to be encoded is partitioned into plural subsets of texture data elements for encoding purposes. In this latter case, in an embodiment a (dominant) direction to use is determined in the manner of the technology described herein separately for each subset (partition) that the overall set of texture data elements of the block is divided into for encoding purposes.

Thus in one embodiment the set of texture data elements that is being encoded comprises all the texture data elements of a block of texture data elements that the texture has been divided into for encoding purposes. In another embodiment, the set of texture data elements comprises a subset of the texture data elements of a block of texture data elements that the texture has been divided into for encoding purposes.

The data space of the set (e.g. block) of texture data elements being considered that the direction is determined in will, as is known in the art, be the data space that corresponds to the data values that the texture data elements represent. Thus, where the texture data elements represent colour values (e.g. RGB or RGBA values), the data space will be the colour space (of the texture data elements). In one embodiment, the data space is the colour space. However, as will be discussed further below, the texture data elements need not necessarily represent colour values, and so the data space in other embodiments is not a colour space, but is some other data space.

The plane or planes that is or are used to divide the texture data elements into two groups in the data space can be selected as desired. Each plane is in an embodiment a, in an embodiment infinite, plane that cuts through the data space and divides it into two parts. The plane or planes may be, and in an embodiment are, selected based on the known and/or expected values in the set of texture data elements, such as an average value for the set of texture data elements.

In an embodiment, the plane or planes are predefined (i.e. predetermined), i.e. the process uses at least one (uses one or more) predetermined planes to divide the texture data elements in the data space, and determines the direction in respect of at least one predetermined plane (determines the direction for one or more predetermined planes) in the data space.

The form of the plane or planes will depend on how many dimensions the data space (i.e. the texture data elements' values) has. For two-dimensional texel values (data space), the plane or planes will be lines in the data space, for three-dimensional texel values (data space), such as RGB values, the plane or planes will be two-dimensional surfaces in the data space, for four-dimensional texel values (data space), such as RGBA values, the plane or planes will be three-dimensional shapes in the data space, and so on.

The technology described herein can be used irrespective of the number of dimensions that the texture data elements' values (and thus the data space) have, although it is most suited to relatively low-dimensional data spaces (data values), such as, and in an embodiment data spaces (data values) having 2 to 4 dimensions.

The direction in the data space that is determined for a respective plane that is being considered is, as discussed above, the direction from a point in the data space that is based on the values of texture data elements that lie on one side of the plane in the data space to a point in the data space that is based on the values of texture data elements that lie on the other side of the plane in the data space. As will be discussed further below, the Applicants have recognised that this can be used to provide a reasonable and sufficiently accurate estimate of the dominant direction in the data space for a set of texture data element values to be encoded.

The texture data elements whose values lie on each side of the plane in the data space can be determined for this purpose as desired, for example, and in an embodiment, by comparing the texture data elements' values to the values defined by (that lie in) the plane to see which side of the plane the texture data elements lie on in the data space.

The points in the data space that the direction is determined between could be based on some but not all of the texture data element values on the side of the plane in question. In an embodiment, they are based on all of the texture data element values on the side of the plane in question.

The points in the data space that the direction is determined between could be based on the texture data element values on the side of the plane in question in any suitable and desired manner. However, in an embodiment, they are points that represent or correspond to an average value for the texture data elements that lie on the side of the plane in question.

Thus, in an embodiment, the direction in the data space that is determined for a respective plane that is being considered is the direction from a point in the data space of an average value for the texture data elements that lie on one side of the plane in the data space to a point in the data space of an average value for the texture data elements that lie on the other side of the plane in the data space. As will be discussed further below, the Applicants have recognised that this can provide a sufficiently accurate estimate of the dominant direction in the data space for a set of texture data element values to be encoded.

Thus, in an embodiment, the technology described herein comprises steps of determining, or processing circuitry configured to determine, for at least one plane that divides the set of texture data elements to be encoded into two groups in the data space, the direction of a vector in the data space from a point in the data space of an average value for the texture data elements of the set of texture data elements to be encoded whose values lie on one side of the plane in the data space to a point in the data space of an average value for the texture data elements of the set of texture data elements to be encoded whose values lie on the other side of the plane in the data space.

The average value points in the data space that the direction is determined between in these arrangements can be determined as desired (based on the values of the texture data elements on each side of the plane in question). For example, the actual, true average value point of the group of texture data elements could be determined and used, or an approximation to the true average value point, such as the point halfway between the minimum and maximum texture data element values for the group of texture data elements on the side of the plane in question, or an average value based on some but not all of the texture data element values on the side of the plane in question, could be used, if desired. Using the actual average value points will give a better estimate of the dominant direction.

Thus, in an embodiment, the direction between the actual average value points (rather than approximations of the average value points) is determined. Thus, in an embodiment, the technology described herein comprises a step of determining, or processing circuitry configured to determine, for at least one plane that divides the set of texture data elements to be encoded into two groups in the data space, the direction of a vector in the data space from the point in the data space of the average value of the texture data elements of the set of texture data elements to be encoded whose values lie on one side of the plane in the data space to the point in the data space of the average value of the texture data elements of the set of texture data elements to be encoded whose values lie on the other side of the plane in the data space.

In this case, the average value points in the data space can be determined as desired. For example (e.g. when using arbitrary planes through the data space), average values of the data elements on each side of the plane can be determined in the normal fashion, by summing the texture data elements' values and dividing by the number of texture data elements in question.

Alternatively, the sum of all the values on the respective side of the plane could be determined to give an overall sum value, and then the value of a point on the dividing plane (such as an average value for the set of texture data elements where the dividing plane passes through the average value) times the number of data elements on the side of the plane in question subtracted from the overall sum value for that side of the plane to give the average value point on that side of the plane that is to be used to determine the direction for the plane in question. (Thus, where n texture data element values are being summed on one side of the plane being considered, n times a value in the dividing plane should be subtracted from the summed n texture data element values to give the average value point in the data space to be used for the side of the plane in question for the direction determining process.)

Where a sum of the values of the texture data elements, e.g. on a given side of the plane, is required, that sum can be determined as desired, for example, and in an embodiment, by simply adding the respective texture data element values together.

The Applicants have recognised that if the texture data elements' values and the plane dividing them are offset in the data space such that the dividing plane then passes through the origin in the data space (when offset), then the direction between the point in the data space of the sum of all the offset texture data element values on one side of the plane and the point in the data space of the sum of all the offset texture data element values on the other side of the plane will correspond to the direction between average value points on each side of the plane for the set of texture data elements in question. (Because all the data values are offset using the same value, the direction between the two offset value sum points will be the same as the direction between average data value positions on each side of the plane.)

This then means that the direction between the average data value positions on each side of the plane can be determined by first offsetting the texture data elements' values such that a plane that passes through the origin in the data space will divide the texture data elements into two groups, and then summing the offset data values on each respective side of the plane to give the points in the data space on each side of the plane that the direction is to be determined between.

This can then allow the direction in the data space to be determined simply by adding the offset data values together, thereby avoiding the need for (potentially) expensive divisions, for example.

(It is true that in this case the magnitude of the determined direction vector between the offset sum points may not be the same as where "non-offset" texture data element values were being considered. However, this does not matter, because it is the direction of the vector that is of interest, and the magnitude of the determined vector does not affect the direction determination.)

In these arrangements, the texture data element values are in an embodiment offset based on an average value for the set of texture data elements in question, as that then means that a plane passing through the origin will effectively pass through the average value for the set of texture data elements.

Thus, in an embodiment, an average texture data element value (e.g. average colour value) for the set of texture data elements being considered is first determined, and each texture data element's value is then offset by this average value (e.g., and in an embodiment, by subtracting the average value from the actual value of the texture data element).

The texture data element value sums and the direction in the data space are in an embodiment then determined using the offset texture data element values, rather than the original (actual) texture data element values. In an embodiment this is done by determining for each plane that divides the offset values of the set of texture data elements to be encoded into two groups in the data space, the direction of a vector in the data space between the point in the data space of the sum of the offset values of one or more of, in an embodiment plural of, and in an embodiment all of, the texture data elements of the set of texture data elements to be encoded whose offset values lie on one side of the plane in the data space and the point in the data space of the sum of the offset values of one or more of, in an embodiment plural of, and in an embodiment all of, the texture data elements of the set of texture data elements to be encoded whose offset values lie on the other side of the plane in the data space.

In an embodiment the points in the data space of the sums of the offset values of all of the texture data elements on each side of the plane in the data space are determined, as this will give a better estimate of the dominant direction. However, it would be possible to sum less than all (i.e. some but not all) of the values on a given side of the plane, if desired.

As will be discussed further below, this facilitates a number of optimisations to the direction determining process.

In these arrangements, the average value that is used for the set of texture data elements to be encoded could again be (and in an embodiment is) the actual, true average value of the texture data elements, or it could be an approximation to the true average value, such as halfway between the minimum and maximum texture data element values, if desired. (Any division for determining the actual average value may be relatively cheap, especially if it is by a power of two, and as that value is then used to offset the data values, only one division, rather than multiple divisions, is required.)

The direction (vector) between the points in the data space (e.g. the average data value points) can be determined as desired. For example, the vector value of one of the points in the data space could be subtracted from the vector value at the other point.

Where the data values are offset using an average value, an optimisation to the direction determining process is possible. In particular, if the texture data element values are offset based on their average value, the differences between the two sums of the offset values (one for each side of the plane) will be the same as twice one of the sum values in the case of a plane that passes through the origin in the data space. This then means that, at least in the case of a plane that passes through the origin in the data space, the direction can be determined from the sum of the offset values of all the texture data elements on one side of the plane only (and without the need to double that sum (although this can be done if desired)).

In this case the direction to use can be, and is in an embodiment, determined as the direction between (i.e. from or to) the origin in the data space (e.g. colour space) of the texture data element values and (i.e. to or from, respectively) the point in the data space of the sum the offset values of one or more of, in an embodiment plural of, and in an embodiment all of, the texture data elements whose (offset) values lie on one side of the plane in the data space. In an embodiment the point in the data space of the sum the offset values of all of the texture data elements whose (offset) values lie on one side of the plane in the data space is used. Since the origin is being considered, the relevant direction in the data space can be determined simply as the (vector) sum of the texture data element values that lie on the side of the plane being considered.

Thus, in an embodiment, the method and apparatus of the technology described herein comprise steps of or processing circuitry configured to, first determine an average data value for the set of texture data elements being encoded, and then offset each texture data element's value with that average value, and to then determine the direction to use by determining, for at least one plane that divides the offset texture data elements into two groups in the data space, the direction of a vector in the data space between the origin in the data space and the point in the data space of the sum of the offset values of one or more of, in an embodiment plural of, and in an embodiment all of, the texture data elements of the set of texture data elements to be encoded whose values lie on one side of the plane in the data space.

Similarly, another embodiment of the technology described herein comprises a method of determining for a set of texture data elements to be encoded for use in a graphics processing system, a direction in the data space of the texture data elements to be used when determining a base data value or values to be used for the set of texture data elements when encoding the set of texture data elements, the method comprising:

determining an average data value for the set of texture data elements being encoded, and then offsetting each texture data element's value with that average value;

determining, for at least one plane that divides the offset values of the set of texture data elements to be encoded into two groups in the data space, the direction of a vector in the data space between the origin in the data space and the point in the data space of the sum of the offset values of one or more of, in an embodiment plural of, and in an embodiment all of, the texture data elements of the set of texture data elements to be encoded whose values lie on one side of the plane in the data space; and using the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

Another embodiment of the technology described herein comprises an apparatus for determining for a set of texture data elements to be encoded for use in a graphics processing system, a direction in the data space of the texture data elements to be used when determining a base data value or values to be used for the set of texture data elements when encoding the set of texture data elements, the apparatus comprising:

processing circuitry configured to:

determine an average data value for the set of texture data elements being encoded, and then offset each texture data element's value with that average value;

determining, for at least one plane that divides the offset values of the set of texture data elements to be encoded into two groups in the data space, the direction of a vector in the data space between the origin in the data space and the point in the data space of the sum of the offset values of one or more of, in an embodiment plural of, and in an embodiment all of, the texture data elements of the set of texture data elements to be encoded whose values lie on one side of the plane in the data space; and using the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

As will be appreciated by those skilled in the art, these embodiments of the technology described herein can and in embodiments do include any one or more or all of the features of the technology described herein described herein, as appropriate.

In these arrangements, the direction vector may be determined as being from the origin to the sum point, or vice-versa, as desired. Equally, the sum point may be the sum point of all the positive texel values (relative to the plane) or the sum point of all the negative texel values, as desired. In an embodiment, the positive values' sum point is used. As discussed above, since the origin is being considered, the direction can be calculated simply as the vector sum of all the positive (or of all the negative) texel values (relative to the plane).

It will be appreciated from the above that the technology described herein can accordingly be (and is in an embodiment) implemented using mainly comparisons and additions of texture data element data values only. This then means that the technology described herein is suitable for direct hardware implementation and for use with "ultrafast" software encoders, for example, unlike the known KLT-based methods.

The plane or planes for which a direction is determined in an embodiment all pass through an average position (value) for the set of texture data elements being considered (which average value could be the true average, or an approximation to the true average, as discussed above). This helps to simplify the direction finding process.

Thus, where the actual (i.e. not-offset) data values for the texture data elements are to be used for the direction finding process, then the plane, or each plane, for which a direction is determined in an embodiment passes through a determined average value for the set of texture data elements in the data space (which average value could be the true average, or an approximation to the true average, as discussed above).

Correspondingly, where data values for the texture data elements that have been offset based on an average value for the texture data elements of the set being considered are to be used for the direction finding process, then the plane, or each plane, for which a direction is determined in an embodiment passes through the origin of the data space (since in this case, the origin will correspond to the average of the original texture data element values, taking the offsetting into account).

While it would be possible to determine the direction to use for a single plane only for a given set of texture data elements to be encoded (and, as will be discussed further below, in one embodiment, this is what is done), the Applicants have recognised that a better estimate of the dominant direction for a given set of texture data elements to be encoded will tend to be determined if directions in the data space are determined in the manner of the technology described herein for plural different planes that divide the texture data elements in the data space.

Thus, in an embodiment, the method of the technology described herein comprises steps of, and the apparatus of the technology described herein comprises processing circuitry configured to:

determine, for each of plural different planes that divide the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and use the direction determined in the data space of the texture data elements for at least one of the plural different planes that divide the set of texture data elements into two groups to determine a direction in the data space to be used when determining a base data value or values to be used for the set of texture data elements when encoding the set of texture data elements.

Where plural different planes are being considered, then the plural planes that are used are in an embodiment uncorrelated in the data (e.g. colour) space of the texture data elements, and in an embodiment are orthogonal to each other (or at least to one or more of the other planes being considered). In an embodiment a set of plural mutually orthogonal planes is considered. Using uncorrelated and orthogonal planes increases the likelihood that one of the directions determined based on the planes will be a good estimate of the dominant direction for the set of texture data element values being considered.

Where directions in respect of plural different planes are being determined, then that is in an embodiment done for at least as many planes as there are dimensions of the data space (and in an embodiment, for as many planes as there are dimensions in the data space, i.e. for N planes for an N-dimensional data space (data values)). This helps further to ensure that at least one of the planes being tested will result in a direction that is a good estimate of the dominant direction of the texture data element values in the data space.

In this case each plane is in an embodiment orthogonal to the other planes. In an embodiment each plane is perpendicular to one of the axes of the data space (to a respective different axis of the data space) (i.e. the process in an embodiment uses N axis-aligned planes, for an N-dimensional data space).

Thus, in the case of a three-dimensional data space (e.g. an RGB colour space), in an embodiment three orthogonal planes are considered, and in an embodiment each of a plane perpendicular to the x axis (the R axis), a plane perpendicular to the y axis (the G axis), and a plane perpendicular to the Z axis (the B axis) are considered).

Where the data values are offset by their average value before performing the direction determination in the data space, each of the plane defined by x=0 (R=0), the plane defined by y=0 (G=0), and the plane defined by z=0 (B=0), is in an embodiment considered. In this case, the direction vector calculation will accordingly amount to, for the plane defined by red=0, the (vector) sum of the offset values of all the texels having a positive red component (i.e. the (vector) sum of the offset values all the texels whose values have a positive red component after having been offset with the average value for the set of texels in question), for the plane defined by green=0, the (vector) sum of the offset values of all the texels with a positive green component, and for the plane defined by blue=0, the (vector) sum of all the offset values of the texels with a positive blue component (or, correspondingly, for each plane, the (vector) sum of the offset values of all the texels with a negative red, green or blue component, respectively).

For a fourth dimension, such as an RGBA colour space, a fourth plane perpendicular to the fourth axis (e.g. the alpha axis), such as the plane defined by alpha=0 should also accordingly in an embodiment be used. In this case, the fourth estimate vector, for the plane is defined by alpha=0 will be the (vector) sum of the offset values of all the texels with a positive alpha component (or, correspondingly, the (vector) sum of the offset values of all the texels with a negative alpha component).

Where plural different planes are considered, a direction in the data space will be determined for each plane. The determined directions should then be used to determine the direction in the data space to use when determining the base data value(s) for the set of texture data elements being considered.

In one embodiment, this is done by summing the direction vectors for some or all (and in an embodiment for all) of the planes being considered, to thereby give an "overall" direction vector for the set of planes in question that will then be used as the direction in the data space to use when determining the base data value(s) for the set of texture data elements being considered.

In another embodiment, one of the determined directions is chosen as the direction to use when encoding the set of texture data elements, i.e. one of the determined directions is selected as the direction to use.

Thus, in an embodiment where plural different planes are considered, the direction determined for one of the planes is selected as the direction in the data space to use when determining the base data value(s) for the set of texture data elements being considered.

Thus, in an embodiment, the technology described herein comprises a step of using and/or selecting, or processing circuitry configured to use and/or select, the direction determined in the data space of the texture data elements for one of the at least one planes that divide the texture data elements into two groups in the data space as the direction in the data space that is used when determining a base data value or values to be used for the set of texture data elements when encoding the set of texture data elements.

Similarly, in an embodiment, the method of the technology described herein comprises steps of, and the apparatus of the technology described herein comprises processing circuitry configured to:
  determine, for each of plural different planes that divide the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and
  select the direction determined in the data space of the texture data elements for one of the plural different planes that divide the set of texture data elements into two groups as the direction in the data space that is used when determining a base data value or values to be used for the set of texture data elements when encoding the set of texture data elements.

Where a direction for one of the planes being considered is to be selected as the direction to use, then the direction to use can be selected as desired. In an embodiment, a direction having a longer (and in an embodiment the direction having the longest) vector in the data space (i.e. a direction for which the distance between the two average data value points, or the distance between the (offset) data value sum point and the origin (where the data values are offset based on an average value), is greater (and in an embodiment the direction for which the distance between the two average data value points, or the distance between the (offset) data value sum point and the origin (where the data values are offset based on an average value), is greatest)) is selected as the direction to use when determining the base data values for the set of texture data elements. The Applicants have recognised that the longer the determined direction vector is, the more likely it is to lie along the dominant direction for the texture data element values in the data space, and so selecting a longer or the longest direction vector as the direction to use should provide a better estimate of the dominant direction than selecting a shorter direction vector.

Thus, in an embodiment the technology described herein comprises selecting the direction (vector) to use when determining the base data values to use when encoding the set of texture data elements in question on the basis of the length of the direction vector (and, correspondingly, determining whether to use a determined direction vector for a plane that has been used to divide the texture data element values as the direction (vector) to use when determining the base data values to use when encoding the set of texture data elements in question on the basis of the length of the direction vector).

Similarly, the technology described herein in an embodiment comprises determining a direction vector in the above manner for one or more of (and in an embodiment for each of) plural planes that divide the texture data element values into two groups in the data space, and then selecting (the direction of) one of those vectors as the direction to use when determining the base data values to use when encoding the set of texture data elements in question based on the length(s) of the direction vector or vectors. In an embodiment a sufficiently long one of, and in an embodiment the longest one of, the direction vector(s) is selected.

In these arrangements, a direction vector could be determined for each plane, and then the longest vector of all the determined direction vectors identified and used, for example by comparing the lengths of each vector (and in one embodiment this is what is done).

Alternatively, a, in an embodiment predetermined, threshold vector length could be set, for example, and if a vector is found to exceed that length, that vector then used, even if other vectors are yet to be determined and/or are yet to be tested. In this case, the direction vector for each plane could be determined and/or tested in turn, with each vector being compared to the threshold length, and if the vector exceeds the threshold length, that vector then used, without determining and/or testing vectors for any further planes (in an embodiment with the longest vector being used, if none of the vectors is found to exceed the threshold length).

In such an iterative process, in an embodiment the planes are tested in the order of the planes most likely to determine the dominant direction first (e.g. based on statistical analysis of typical textures, e.g. game content).

The length of each direction vector can be determined as desired. For example, the usual Euclidean way using a dot product could be used. Alternatively, the Manhattan length of each vector could be used, to avoid having to perform multiplications, if desired.

Although as discussed above, the use of plural planes can provide a more accurate estimate of the dominant direction in the data space for the set of texture data elements in question, the Applicants have found that using only a single plane can suffice, particularly in certain circumstances (e.g. for certain forms of texture content). Considering only a single plane will reduce the likely quality of the direction estimate, but will provide faster direction estimation performance, and so may be suitable, e.g., for "ultrafast" encoding implementations where increased speed is required and any loss of quality can be accepted. Thus, in another embodiment, the direction is determined for a single plane in the data space only, and that direction is then used when encoding the texture data elements.

Accordingly, in an embodiment, the method of the technology described herein comprises, and the apparatus of the technology described herein comprises processing circuitry configured to:

determine, for one and only one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and use the direction determined in the data space of the texture data elements for the plane that divides the values of the set of texture data elements to be encoded into two groups in the data space as the direction in the data space that is used when determining base data values to be used for the set of texture data elements when encoding the set of texture data elements.

Where only a single plane in the data space is considered, then in an embodiment the plane that is used is selected so as to avoid common case optimal directions (i.e. likely dominant directions given typical and/or known texture content) lying in the plane that is used to divide the texture data element values in the data space. Such common case optimal directions (to therefore avoid) could be determined, e.g., by testing typical texture content (e.g. game textures) in advance.

For example, the Applicants have determined that for RGB colour content, particularly when the data values are close to gray, the dominant direction for a set of texture data elements is usually fairly close to (1, 1, 1). Thus in an embodiment a plane to use for RGB content when using only a single plane is the plane defined by R+G+B=0. In this case, where the texture data element values are offset by their average value, then the sum point (for determining the direction vector from or to the origin in the RGB colour space) will be given by the sum of the R+G+B sums for each texture data element in the set whose R+G+B sum is positive (or by the sum of the R+G+B sums for each texture data element in the set whose R+G+B sum is negative).

Once the direction in the data space for the set of texture data elements to be encoded has been determined, then that direction can then be, and is in an embodiment then, used to generate a base data value or values (e.g. colour or colours) to be used when encoding the set (e.g. block) of texture data elements in question.

The technology described herein accordingly also extends to, and in an embodiment includes, using the determined and/or selected direction in the data space for the set of texture data elements to derive a base data value or values for use when encoding the set of texture data elements.

The base data value or values can comprise any suitable such data value or values, e.g. depending on and according to the encoding scheme being used. In an embodiment, a set of plural base data values, e.g. colour values, are derived.

In an embodiment, a set of base data values for a set of texture data elements to be encoded comprising a pair of data values is determined. In an embodiment a pair of endpoint data values, such as a pair of endpoint colour values, in an embodiment from which data (e.g. colour) values for texture data elements of the set can be interpolated (in an embodiment by determining a weighted sum of the endpoint values), are determined for the set of texture data elements in question. The pairs of base data values could instead comprise, e.g., a base value and a difference value that can then be combined to give values for the texture data elements, if desired.

The base data values can be determined using the determined direction in the data space in any desired and suitable manner, for example depending on, and according to, the texture compression scheme being used.

In an embodiment, the base data values to use for the set of texture data elements are determined using an average value for the set of texture data elements to be encoded (which may be the true average of the values of the set of texture data elements, or an approximation of that average, as desired), and the determined (selected) vector direction.

These values are in an embodiment used to derive a line in the data space that the texture data element values can then be projected onto. In an embodiment a parametric line in the data space is defined using the average value for the set of texture data elements to be encoded and the determined (selected) vector direction:

$$L=C+t*V$$

where:

L is the parametric line in the data space;

C is an average value for the set of texture data elements; and

V is the determined vector direction.

The so-derived line is in an embodiment then used to determine the base data values to use. In an embodiment values that lie on the line are used as or to derive the base data value(s) to use.

In one embodiment, the lowest and highest value points on the determined line in the data space that texture data elements of the set of texture data elements will project on to (when projecting the texture data elements' values on to the line) are used as or to derive the base data values (endpoint values) to use. For example, the highest and lowest values could be used directly as the endpoint values (e.g.), or those values could be adjusted to give the endpoint values to use, e.g. to trade accuracy at the endpoints for greater precision in the middle of the data value range being encoded.

It would also or instead be possible to use the values (e.g. the highest and lowest values) determined from the line in the data space as, for example, starting values for (as inputs to) a more sophisticated base data value determining process, if desired.

Where the line is derived in an "offset" data value space, the average data value should be added to the data values determined from the derived line in the data space when determining the actual base (e.g. endpoint) data values to be used.

In an embodiment all the texture data elements in the set are first projected on to the derived line in the data space. This is in an embodiment done by finding the parameter value t for the point on the line L in the data space that is closest to the value of the texture data element in question. Where the texture data values have been offset using an average value for the set of texture data elements being encoded, then the parameter value t may be and is in an embodiment computed as $t=dot(V,T')/dot(V,V)$ (where dot( ) denotes the usual vector dot-product, T' is the offset texture data element value and V is the determined vector direction).

Once this is done, the lowest and highest parameter values, t_low and t_high, found for the set of texture data elements (i.e. the parameter values for the lowest and highest value points on the determined line in the data space that texture data elements of the set of texture data elements were projected on to) are in an embodiment determined. These lowest and highest parameter values are in an embodiment then used to define respective base (endpoint) data values to use for the set of texture data elements in question, in an embodiment as follows:

$$\text{endpoint colour } 1 = C + t\_low * V$$

$$\text{endpoint colour } 2 = C + t\_high * V$$

where C is an average value for the set of texture data elements, V is the determined vector direction, t_low is the lowest parameter value that resulted from the texture data elements, and t_high is the highest parameter value that resulted from the texture data elements.

Once the respective base, e.g. endpoint, data values have been determined using the determined direction in the data space, then those data values can be and are then in an embodiment used for encoding and to encode the set of texture data elements in question.

Thus, although the technology described herein has been described above with particular reference to the process of deriving the base data values (e.g. endpoint colours) to use when encoding the texture data block, the technology described herein also extends to, and in an embodiment includes, encoding the set of texture data elements as a block of texture data representing the texture data elements using the determined base data value or values.

Thus, in an embodiment, the technology described herein further comprises a step of encoding, or processing circuitry configured to encode, the set of texture data elements as a block of texture data representing the texture data elements using the determined base data value or values.

Similarly, the technology described herein also extends to, and in an embodiment includes, generating an encoded texture data block representing a block of texture data elements that includes the set of texture data elements in question, using the determined base data value or values.

The way that the encoding is done will depend upon the overall texture encoding scheme that is being used.

In one embodiment the determined base data values are first used to determine further, and in an embodiment two further, data values to use for the set of texture data elements by interpolation of the determined base (e.g. endpoint) values. In an embodiment each texture data element in the set is then assigned an index value that maps the texture data element to one (i.e. the closest) of the so-determined colours for the set of texture data elements (i.e. to the closest one of the endpoint colours and the interpolated colours). This will be done, for example, where the encoding scheme being used is S3TC, BC6 or BC7. In an embodiment, the mapping of the texture data element values to the colours is done by rescaling and quantizing the parameter values "t" derived for the texture data elements when projecting them to the determined line in the data space.

In another embodiment, each texture data element is assigned an index value that is to be used as, or that can be used to derive, a weight to use to interpolate a data value for the texture data element using the base data values (e.g. endpoint colours) determined for the set of texture data elements. This will be done, for example, where the encoding scheme being used is ASTC.

Where the set of texture data elements in question corresponds to all the texture data elements of a block of texture data elements to be encoded, then once the base data values for the set of texture data elements have been determined, the block of texture date elements can be encoded to generate an encoded texture data block representing the set of texture data elements.

On the other hand, where the set of texture data elements in question corresponds only to a subset or partition of the texture data elements of a block of texture data elements to be encoded, then the (dominant) direction and base data value determining process is in an embodiment repeated for each respective subset (partition) that the block of texture data elements has been divided into, to give a separate set of base data values for each subset (partition) that the block of texture data elements has been divided into. This has the advantage that different partitions within a block can then use, in effect, different encoding schemes (and in an embodiment, this is done).

Where a block of texture data elements to be encoded in a given texture data block is divided into plural "sub-sets" or "partitions" of texture data elements, in an embodiment 2, 3 or 4 partitions are used.

Once all the (dominant) directions and base data (e.g. endpoint) values needed for a block of texture data elements to be encoded have been determined, an encoded texture data block representing the block of texture data elements in question is in an embodiment then generated.

The encoding process can use any suitable and desired encoding scheme. In an embodiment it uses a, in an embodiment known, block-based encoding scheme, such as S3TC, BC6, BC7 or ASTC. (It is an advantage of the technology described herein that it can be used with existing and conventional block-based encoding schemes).

Thus, the method and apparatus of the technology described herein in an embodiment further comprise a step of encoding, or processing circuitry configured to encode, a block of texture data elements that a texture to be encoded has been divided into, in an embodiment using a block-based encoding scheme, to provide an encoded texture data block representing the block of texture data elements.

Each encoded texture data block should include all the information that is necessary for, and/or expected by, a decoder, to allow the decoder to decode the encoded texture data block to reproduce (at least approximately) the original array of texture data elements that the block represents. The data that should be included in the encoded texture data block to achieve this will depend upon the exact nature of the texture data encoding (compression) scheme in question. This data can be arranged in any suitable and desired manner in the encoded texture data block (i.e. in practice in the manner that a decoder can recognise and correctly interpret).

In an embodiment the encoded texture data block includes at least data indicating or allowing to be derived the base data (e.g. colour) value or values (such as colour endpoint values) for the encoded texture data block, and information to allow the decoder to determine (at least an approximation to) the value of a given texture data element from the base data value or values (e.g. endpoint colours) for the block.

In one embodiment, each encoded block of texture data includes, inter alia, data indicating, or indicating how to generate, the set of base data values (e.g. colour endpoint values) to be used to generate data values for a set of the texture data elements that the block represents, and data indicating how to use the set of base data values (e.g. colour endpoint values) to generate data values for texture data elements of the set of texture data elements that the set of base data values is to be used for.

In an embodiment, the encoded texture data blocks include data for indicating how to generate a set or sets of base data values for the block using a set of integer values that are encoded in the block. In this case, the integer values could be used directly to generate the base data values, and/or some or all of the base data values to be used could be derived from the integer values.

In an embodiment, the data indicating how to generate the set of base data values to be used indicates which one of a plurality of selected, in an embodiment predetermined, base data value set generation techniques or methods is to be used.

Where partitioning is used, in one embodiment each texture data element partition for the texture data block shares the same base value(s) (e.g. colour endpoint value(s)), and/or set of data indicating how to generate a set of base data values to be used to generate data values for the block.

In another embodiment where partitioning is used, each texture data element partition for the texture data block has its own base value(s) (e.g. colour endpoint value(s)), and/or set of data indicating how to generate a set of base data values to be used to generate data values for the particular sub-set of the texture data elements that the partition corresponds to (i.e. for the sub-set that the partition corresponds to). As discussed above, this has the advantage that different partitions within a block can use, in effect, different encoding schemes (and in an embodiment, this is done).

Where an encoded texture data block can include or includes plural partitions, then the encoded texture data block in an embodiment further includes information to indicate the partitioning pattern that has been used for the block. This information can take any suitable and desired form, such as an index that indicates to the decoder which one of a set of stored predefined partitioning patterns has been used.

In one embodiment, the partitioning patterns are generated using a partitioning pattern generation function, and the encoded texture data blocks in an embodiment then include information to be used by the decoder to configure the partitioning pattern generation function so as to allow the decoder to generate the particular partitioning pattern that has been used. This information in an embodiment comprises a partitioning pattern generation function index or seed, and the number of partitions, that were used as inputs to the partitioning pattern generation function at the encoding stage for generating the partitioning pattern that was used. (The decoder in an embodiment then uses this information, together with the position of the texture data element to be decoded (i.e. whose value is to be determined), as inputs to the partitioning pattern generation function, to determine which partition of the encoded texture data block, the texture data element in question belongs to. Once this has been done, the decoder can then, e.g., and in an embodiment, determine the base data values (e.g. endpoint colours) to be used for the partition that the texture data element has been determined to belong to, and then use those data values to determine the data value (e.g. colour value) to be used for the texture data element itself.)

As discussed above, an encoded texture data block in an embodiment includes data indicating how to use respective set(s) of base data values (e.g. endpoint colours), or generated set(s) of base data values, for a block to generate data values for the texture data elements of the block.

The data that is included in the encoded texture data block for indicating how to use the set of base data values (e.g. colour endpoint values) to generate the data values for the individual texture data elements of the block can be any suitable such data. In an embodiment, it comprises index data, giving indexes for some or all of the texture data elements in question, and that can be used to derive the data values for the texture data elements from the base data values.

In one embodiment, the indexes are to be used to map the texture data element in question to a data value (e.g. colour) in a set of colours for the block (as in the S3TC texture encoding scheme, for example).

In another embodiment the indexes are to be used to interpolate the data value for a given texture data element from the base (e.g. endpoint) data values. In an embodiment each index is to be used as or to derive a weight to compute a weighted sum of the base data values (e.g. endpoint values) (which weighted sum is then used as the data value for the texture data element to which the index relates).

Thus, for example, where two endpoint data values are generated, the index for a given texture data element that the two endpoint data values are to be used for is in an embodiment then used to derive the data value for the texture data element from the two endpoint values, in an embodiment by interpolation between the two endpoint data values based on the index value.

The encoded texture data block in an embodiment includes, and/or allows to be derived, an index for each individual texture data element that the encoded texture data block represents. In some embodiments, this is done by providing (explicitly) in the encoded texture data block an index value for each and every texture data element that the encoded texture data block represents. In other embodiments, the encoded texture data block only encodes (explicitly includes) a limited number of index values, from which the indexes to be used for the texture data elements that the encoded block represents are to be derived in use (at decode time), in an embodiment by appropriate interpolation from the provided index values.

In an embodiment, different "index" encoding arrangements can be used, and each encoded texture data block includes information indicating the encoding arrangement that has been used for the block, in an embodiment by including in the encoded texture data block information indicating a predetermined "index mode" to be used (that has been used) for the block. In an embodiment there are plural predefined index modes that can be used.

The information to be included in an encoded texture data block can be included in the encoded texture data block in any desired order and arrangement. In an embodiment a particular (and in an embodiment common) format and organisation is used for each encoded texture data block.

The technology described herein can be used to encode any suitable form of texture data. As discussed above, such data, in its original, raw or unencoded form, is typically arranged in the form of arrays of texture elements or texels, and thus in an embodiment, the technology described herein is used to encode an array of texture data elements (texels). Such arrays are typically, as is known in the art, 2-dimensional, although it is also possible to use the technology described herein to encode a 3-dimensional array (and, indeed, it is an advantage of the technology described herein that it can be used to encode 3-dimensional textures in an efficient manner).

The texture to be encoded and the texture data elements can represent any suitable texture data. In one embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc., as is known in the art.

However, the technology described herein can also be used to process and encode (and decode) textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the texture of the technology described herein may represent other forms of data that are to be processed as a texture in a graphics processing system, if desired.

In an embodiment, the texture data elements each represent a colour value for a texture element, but this is not essential. In an embodiment the texture data elements represent: low dynamic range (LDR) texture data with 1, 2, 3 or 4 components per texel (luminance, luminance-alpha, RGB and RGB-alpha, respectively) or high dynamic range (HDR) texture data with 1, 3 or 4 components per texel.

As will be appreciated by those skilled in the art, the actual data values accorded to the texture elements, both in their original, unencoded raw form, and in their encoded form (or at least when the encoded data has been decoded to reproduce a representation of the original data) will depend on the form of "texture" that the texture elements are intended to define or represent.

Thus, for example, where the texture elements define colours to be used, the texture data elements in their original, unencoded form may each comprise a set of colour values (Red, Green, Blue (RGB)), a set of colour and transparency values (Red, Green, Blue, Alpha (RGBA)), or a set of luminance and chrominance values, and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate for each texture data block to only encode data necessary to generate some, but not all, of the data values necessary to reproduce the original data, with the remaining data values being derived (e.g. therefrom) as part of the data reproduction process. Thus, in one embodiment, the encoded texture data block encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGBA values as discussed above. Equally, references to generating a set of data values for an encoded texture data block, and to data values for individual texture elements, encompass data values that each comprise or include a combination of values, such as a set of colour values (RGB or RGBA), as appropriate.

As will be appreciated from the above, the technology described herein is particularly suited to block-based encoding arrangements, where each encoded texture data block encodes (represents) a smaller portion (block) of the texture map in question (such that a plurality of such individual texture data element blocks will be encoded to encode the overall texture (array of texture data elements), e.g. texture map, to be encoded. Thus, in an embodiment, the technology described herein further includes first subdividing a texture (e.g. texture map) to be encoded into a plurality of blocks of texture data elements, and then determining a dominant direction or directions for, and encoding, each block of texture data elements as a texture data block in accordance with the technology described herein.

In an embodiment the texture being encoded is divided into blocks of equal size, i.e. each encoded texture data block represents the same number of texture data elements. This can, e.g., simplify the task of finding which encoded block a given texture data element lies in. In an embodiment, each encoded texture data block encodes, or encodes the equivalent of, a 4×4, 5×5, 6×6, 8×8, 10×10, 12×12, 3×3×3, 4×4×4, 5×5×5 or 6×6×6 array of texels. (The technology described herein can support many different block sizes.)

In an embodiment each encoded texture data block has the same size, i.e. a fixed rate encoding scheme is used for the texture in question. This facilitates the encoding and decoding processes, as is known in the art.

The actual subdividing of the texture into smaller blocks, and the order of encoding into encoded texture data blocks can be selected as desired. In an embodiment the blocks are encoded in raster order, although other arrangements, such as the use of Morton order, would, of course, be possible.

The encoding process for each block of texture data elements to be encoded as an encoded data block can be carried out in any suitable manner on or using the initial (original) texture data that is to be encoded. For example, as in known prior art processes, the block of texture data elements to be encoded could be, and in an embodiment is, first encoded using some or all of the various different encoding possibilities that are available (i.e. that, in effect, an encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block (array of texels) when it is encoded).

This will then be repeated for each different block of texture data elements that the original data (e.g. texture map) has been divided into, to produce a stream or set of encoded texture data blocks representing, and corresponding to, the original set of data (e.g. texture map). This set of encoded texture data blocks can then be stored, e.g. on a portable storage device such as a DVD, for future use, e.g. when it is desired to apply the texture to an image to be rendered. In an embodiment a texture is encoded as a set of mipmaps, with each mipmap being generated using the technology described herein.

Each block of texture data elements that the original data (e.g. texture map) is divided into for encoding purposes is in an embodiment the same size. The block size that is being used is in an embodiment provided to the decoder. The block size is in an embodiment not included in the encoded texture data blocks themselves, but is in an embodiment provided to the decoder separately. For example, the block size could be implicitly indicated by another parameter that is provided to the decoder, such as, and in an embodiment, the image type, or included in (and indicated in) a (global) data header that is associated with (attached to) the set of encoded texture data blocks.

(The reverse, decoding, process, i.e. in which the encoded texture data blocks are used to produce one or more or an array of texture data elements for use will be, as will be appreciated by those skilled in the art, essentially the reverse of the encoding process, and thus comprise, e.g., determining the encoded texture data block that represents a texture data element in question, determining from the identified encoded texture data block the set of base data values (e.g. endpoint colours) to be used for the texture data element, and then generating the data value (e.g. colour) for the texture data element accordingly.)

Although the technology described herein has been described above with particular reference to the encoding of texture data for use in a graphics processing system, as will be appreciated by those skilled in the art, it would equally be applicable to the encoding of other forms of data, and in particular to data that is in the form of (or can be expressed in the form of) arrays or blocks of (similar) data elements (e.g. data elements whose values follow a common or similar format and/or that will be or can be used for a similar or the same purpose or that represent similar information). In general the technology described herein may be used wherever it is desired to estimate the dominant direction (i.e. the direction along which the points exhibit the greatest variance) of a given set of points in an, e.g. low-dimensional space (2 to 4 dimensions) (e.g. for partitioning any set of low-dimensional data).

Such "non-graphics" data could comprise, for example, multivariate statistical data sets for medical trials, trait measurements for biological taxonomy, etc., vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded (and decoded) in an analogous manner to the texture data as described herein.

Thus, an embodiment of the technology described herein comprises a method of determining, for a set of data elements to be encoded, a direction in the data space of the data elements to be used when determining a base data value or values to be used for the set of data elements when encoding the set of data elements, the method comprising:
  determining, for at least one plane that divides the set of texture data elements to be encoded into two groups in the data space, the direction of a vector in the data space from a point in the data space that is based on the values of data elements of the set of data elements to be encoded whose values lie on one side of the plane in the data space to a point in the data space that is based on the values of data elements of the set of data elements to be encoded whose values lie on the other side of the plane in the data space; and
  using the direction determined in the data space of the data elements for at least one of the at least one planes that divide the set of texture data elements into two groups in the data space to determine a direction in the data space to be used when determining a base data value or values to be used for the set of data elements when encoding the set of data elements.

Another embodiment of the technology described herein comprises an apparatus for determining for a set of data elements to be encoded, a direction in the data space of the data elements to be used when determining a base data value or values to be used for the set of data elements when encoding the set of data elements, the apparatus comprising:
  processing circuitry configured to:
  determining, for at least one plane that divides the set of texture data elements to be encoded into two groups in the data space, the direction of a vector in the data space from a point in the data space that is based on the values of data elements of the set of data elements to be encoded whose values lie on one side of the plane in the data space to a point in the data space that is based on the values of data elements of the set of data elements to be encoded whose values lie on the other side of the plane in the data space; and
  using the direction determined in the data space of the data elements for at least one of the at least one planes that divide the set of texture data elements into two groups in the data space to determine a direction in the data space to be used when determining a base data value or values to be used for the set of data elements when encoding the set of data elements.

Another embodiment of the technology described herein comprises a method of determining for a set of data elements to be encoded, a direction in the data space of the data elements to be used when determining a base data value or values to be used for the set of data elements when encoding the set of data elements, the method comprising:
  determining an average data value for the set of data elements being encoded, and then offsetting each data element's value with that average value;
  determining, for at least one plane that divides the offset values of the set of texture data elements to be encoded into two groups in the data space, the direction of a vector in the data space between the origin in the data space and the point in the data space of the sum of the offset values of one or more of, in an embodiment plural of, and in an embodiment all of, the texture data elements of the set of texture data elements to be encoded whose values lie on one side of the plane in the data space; and
  using the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

Another embodiment of the technology described herein comprises an apparatus for determining for a set of data elements to be encoded, a direction in the data space of the data elements to be used when determining a base data value or values to be used for the set of data elements when encoding the set of data elements, the apparatus comprising:
  processing circuitry configured to:
  determine an average data value for the set of data elements being encoded, and then offset each data element's value with that average value;
  determining, for at least one plane that divides the offset values of the set of texture data elements to be encoded into two groups in the data space, the direction of a vector in the data space between the origin in the data space and the point in the data space of the sum of the offset values of one or more of, in an embodiment plural of, and in an embodiment all of, the texture data elements of the set of texture data elements to be encoded whose values lie on one side of the plane in the data space; and using the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

As will be appreciated by those skilled in the art, these embodiments of the technology described herein can and in embodiments do include any one or more or all of the features of the technology described herein, as appropriate.

The methods and apparatus of the technology described herein can be implemented in any appropriate manner, e.g. in hardware or software, and in (and be included in) any appropriate device or component. In an embodiment they are implemented in a processor, and thus the technology described herein also extends to a processor configured to use the methods of the technology described herein, or that includes the apparatus of the technology described herein. In an embodiment, the methods and apparatus of the technology described herein are implemented in hardware, in an embodiment on a single semi-conductor platform.

The technology described herein can be implemented in any suitable system, such as a suitably configured microprocessor based system. In an embodiment, the technology described herein is implemented in a computer and/or microprocessor based system.

The technology described herein may, for example, be implemented on a graphics processor or graphics processing device, and accordingly extends to a graphics processor and a graphics processing platform including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

In some embodiments, the graphics processor comprises, and/or is in communication with, one or more memories and/or memory devices that store the data described herein, and/or store software for performing the processes described herein. The graphics processor may also be in communication with a host microprocessor, and/or with a display for displaying images based on the data generated by the graphics processor.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements or processing circuitry and/or programmable hardware elements or processing circuitry that can be programmed to operate in the desired manner.

In one embodiment the apparatus of the technology described herein comprises dedicated (non-programmable) processing circuitry configured to operate in the manner described. In another embodiment, it comprises programmable processing circuitry that is programmed to operate in the manner described.

It should also be noted here that, as will be appreciated by those skilled in the art, the various functions, etc., of the technology described herein may be duplicated and/or carried out in parallel on a given processor.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to the encoding of texture data for use in graphics processing that is in the form of a colour map (i.e. colour data). However, as discussed above, and as will be appreciated by those skilled in the art, the technology described herein is applicable to data encoding in general, and so therefore should not be considered to be limited to the present example of texture colour data encoding.

FIG. 1 illustrates the basic encoding process of this embodiment. As shown in FIG. 1, an original image or array 1 of texture data elements (texels) (a texture "map") is subdivided into a plurality of 4×4 texture element blocks 2. (Other block sizes can be used, as will be discussed further below.)

In the present embodiment, as shown in FIG. 1, the original image (texture map) 1 is divided into blocks of equal size. This simplifies the task of finding which block a given texture data element lies in, and gives a constant data rate.

In this embodiment, each texture element (texel) in the original texture map data array (image) represents the colour to be used at the position of the respective texture element, and accordingly has allocated to it a data value comprising a set of colour values (e.g. red, green, blue (RGB), and, optionally, alpha (transparency), values). In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array 1 of colour data in its full, original form, each 4×4 texture element block 2 is encoded as a texture data block 5 that has a reduced size as compared to the texture data in its original, unencoded form. This, in effect, compresses the original texture data, thereby making its storage and processing easier and more efficient. In the present embodiment, each encoded texture data block 5 uses 128 bits. (Other arrangements would, of course, be possible.)

Each encoded, reduced size, texture data block 5 contains, as will be discussed further below, sufficient and appropriate data to allow data corresponding to or representing the original, unencoded, data of the 4×4 texture element block in question to be reproduced.

For each block 2 of the original image (texture map) 1, a corresponding encoded texture data block 5 is generated. The individual texture data blocks making up the texture map are encoded in the present embodiment in raster order. Other arrangements, such as the use of Morton order, would, of course, be possible.

Thus, in the present embodiment, each encoded texture data file comprises a sequence of individual texture data blocks encoding the array of texture data elements (the image data).

The number of texture data blocks in the file will depend on the size of the texture map (texture data array) that is being encoded, and, e.g., whether the data is being stored in mipmap form. If mip-maps are used, then if the first level of texture map resolution is encoded using "n" texture data blocks, there will be "n/4" texture data blocks for the mipmap level below, "n/16" blocks for the next mip-map, "n/64" for the next, "n/256" for the next again, and so on (but no less than one block for each level) until the mip-map level with size 1×1 is reached.

(In the present embodiment, the encoded texture data can be and in an embodiment is stored in the form of mip-maps (i.e. where multiple versions of the original texture data array, each having different levels of detail (resolution), are stored for use). The mip-maps are in an embodiment stored one after each other in memory, with each mip-map level being, as is known in the art, a downscaled (by a factor of 2) representation (image) of the original array (image). The mip-maps are stored in order of descending resolution, i.e. n×n, . . . , 16×16, 8×8, 4×4, 2×2, 1×1. The smaller mip-maps (<8×8) are each stored individually in a separate encoded data block.)

Figure 2:
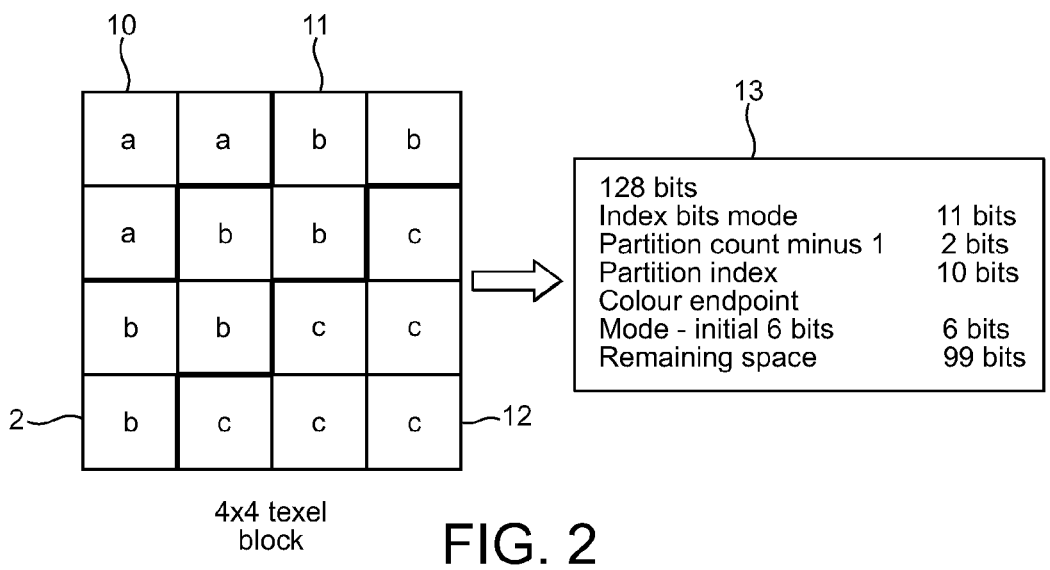
FIG. 2 shows schematically the encoding of a partitioned data block in the described embodiment of the technology described herein.

As will be discussed further below, the present embodiment supports arrangements in which the texture data elements (texels) in a given texel block to be encoded are divided into different sub-sets or partitions within the block. FIG. 2 illustrates this, and shows a 4×4 texel block 2 which has been divided into three partitions 10, 11 and 12. Thus the texels labelled "a" in FIG. 2 belong to a first partition 10, the texels labelled "b" belong to a second partition 11, and the texels labelled "c" belong to a third partition 12. This block is then encoded in a compressed form as an encoded texture data block 13, but with, as will be explained in more detail below, additional information relating to the partitioning of the original 4×4 texel block.

It will be appreciated from the above that each texel block, or each partition within a texel block, to be encoded in the present embodiment will correspond to a set of texels, each having respective colour values. As will be discussed further below, the texel block encoding process of the technology described herein operates, inter alia, to determine a pair of endpoint colours to be used for encoding (and when decoding) the set of texels that the texel block (or that the partition within the texel block) represents. Accordingly, an important operation in the encoding process of the present embodiment is to determine the pair of endpoint colours that are to be used when encoding (and decoding) the set of texels in question.

The texture encoding scheme of the present embodiment uses a selected direction in the colour space of a set of texture data elements to be encoded when determining the pair of endpoint colours to use for encoding (and decoding) the set of texture data elements.

In essence, the present embodiment operates to estimate the direction along which the data values of the set of texture data elements in question exhibit the greatest variance in the colour space (i.e. operates to estimate the dominant direction of the values of the texture data elements in the colour space). The estimated dominant direction is then used to derive the endpoint colour values to use when encoding the set of texture data elements in question.

Figure 13:
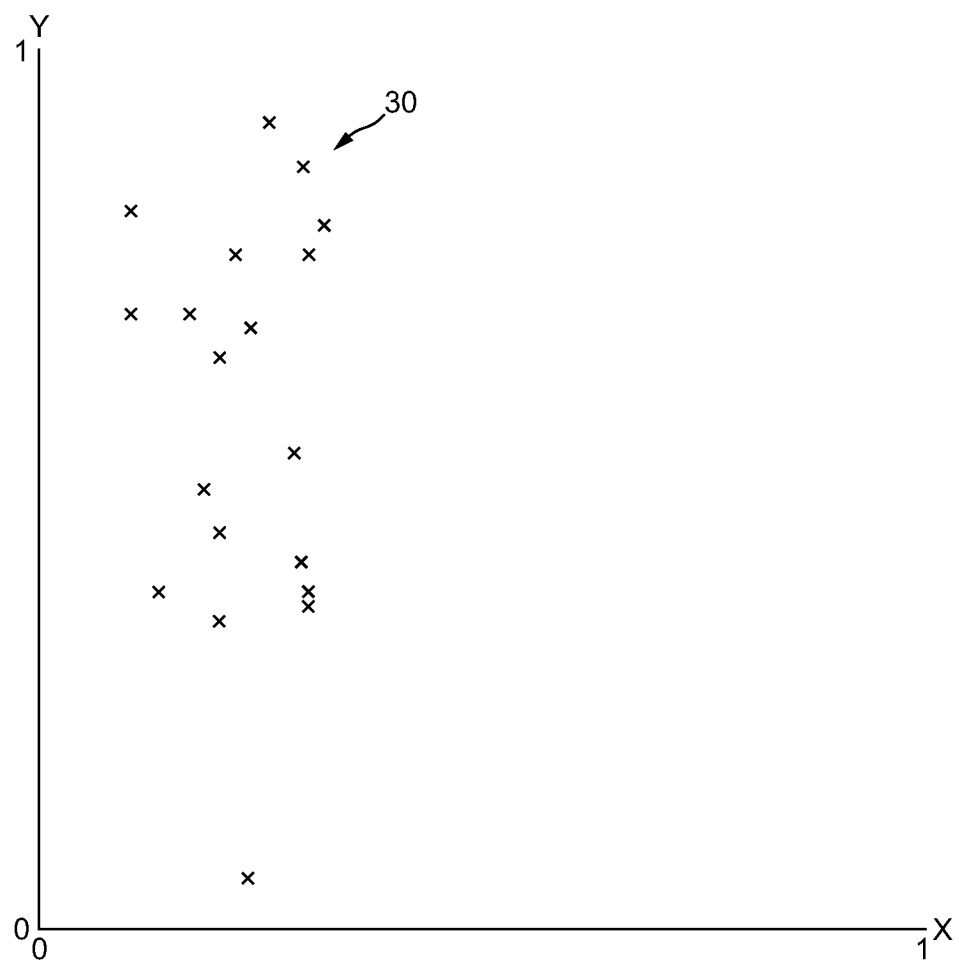
FIGS. 13 to 18 illustrate the dominant direction estimating process of the described embodiment of the technology described herein.
Figure 14:
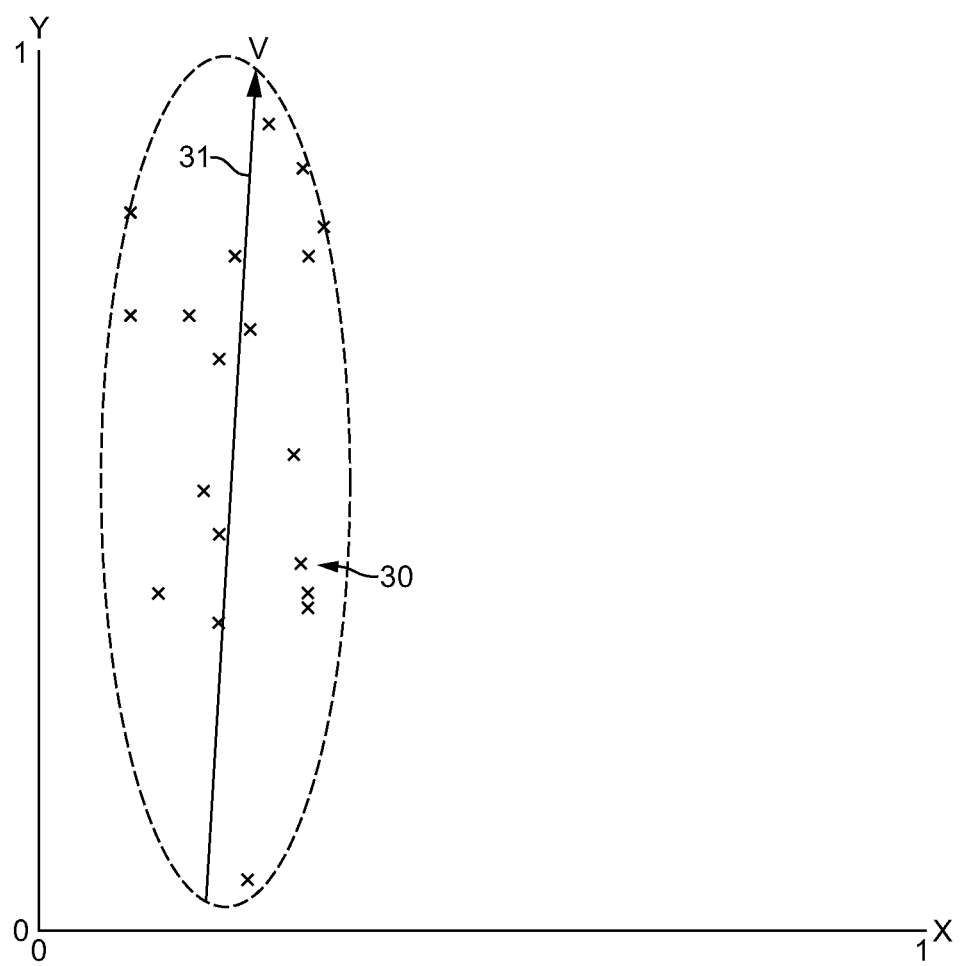

FIGS. 13 and 14 illustrate this. FIG. 13 shows schematically the values of a set of twenty texture data elements 30 in a two-dimensional colour space. FIG. 14 shows the set of texture data values 30 of FIG. 13 together with an exemplary estimate of the dominant direction, best fit, vector V 31 through those colour values in the colour space. The present embodiment uses a particular process to estimate the dominant direction vector V for a given set of texture data element values in the colour space.

FIGS. 15 to 18 show schematically the way that the dominant direction in the colour space of a set of texture data elements to be encoded is estimated in the embodiment of the technology described herein (and in accordance with the technology described herein) (and thus the way that a direction in the colour space to use for a set of texture data elements to be encoded is determined in an embodiment of the technology described herein (and in accordance with the technology described herein)).

Figure 17:
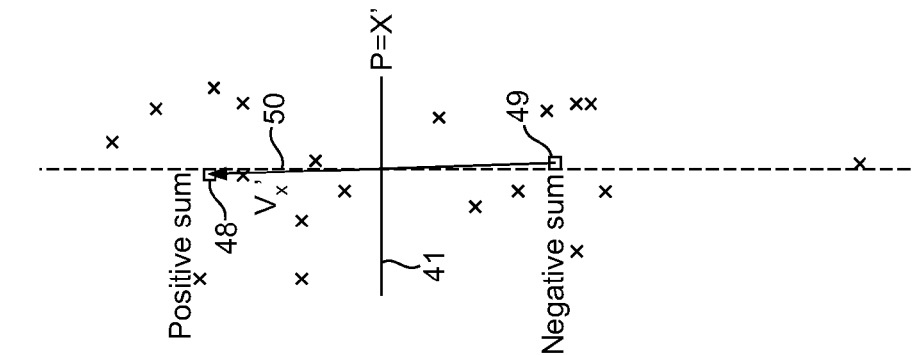
Figure 16:
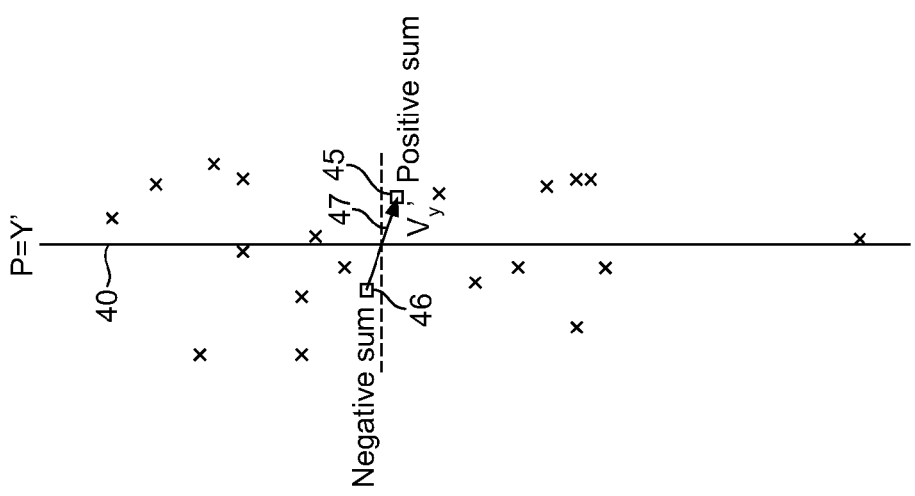
Figure 15:
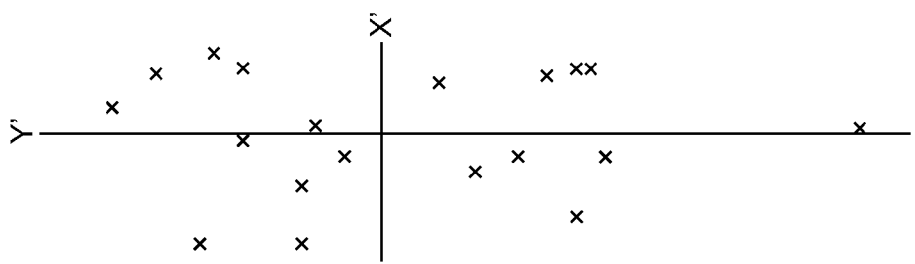
Figure 18:
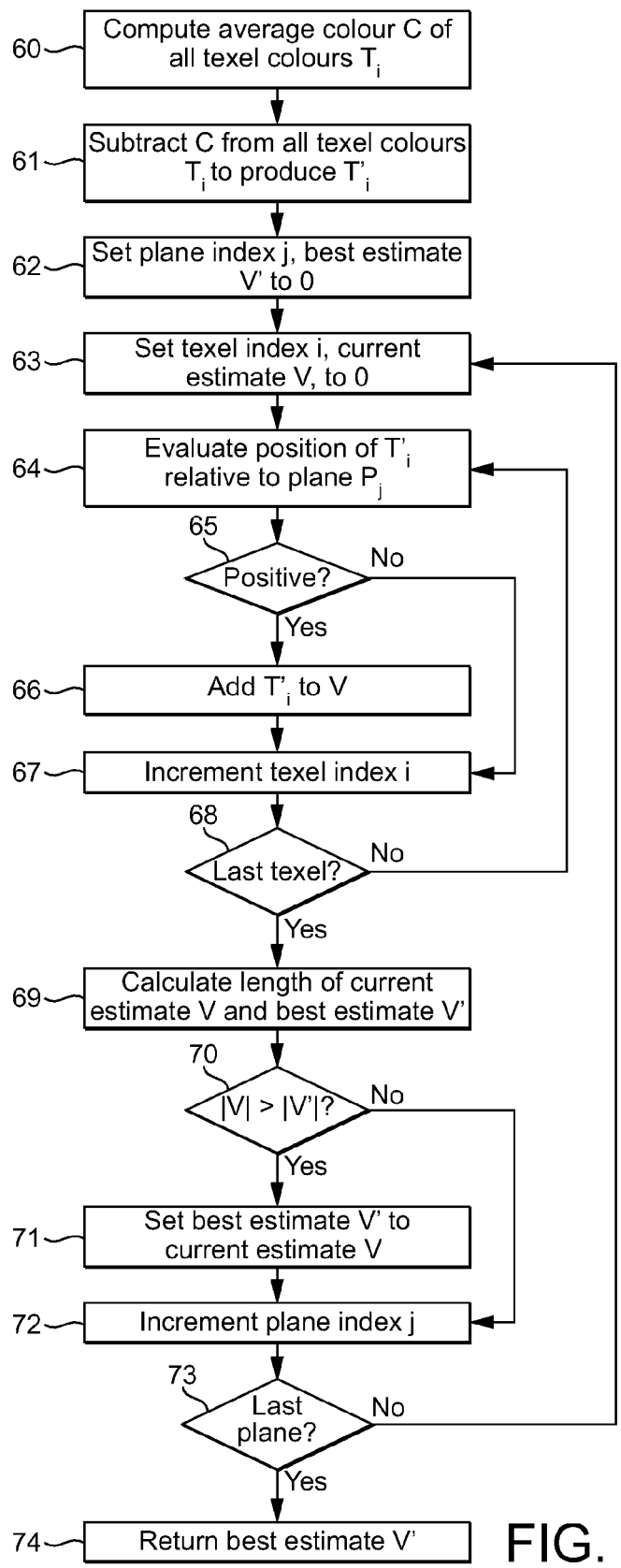

FIGS. 15 to 17 illustrate the dominant direction estimating process of the present embodiment, and FIG. 18 is a flowchart showing how the process is performed in the present embodiment.

FIGS. 13 to 17 show a two-dimensional colour space (e.g. RG) for clarity purposes, although as is known in the art, the colour space will typically be 3 or 4 dimensional (RGB or RGBA). The techniques of the present embodiment may be used irrespective of the number of dimensions in the colour space being considered.

It should also be noted here that, as shown in FIGS. 13 to 17, the assessment of the texel values is done within the colour space. Because the assessment is being done in the colour space, the "spatial" positions of the texels in the set of texels being encoded does not affect the dominant direction estimating process.

The input to the dominant direction estimating process of the present embodiment is the set of texture data elements (texels) for which it is desired to estimate the dominant direction in the colour space. Thus for an RGB texture, the input to the process will be a set of texels each represented with an (R, G, B) colour tuple. Other forms of texture data will be input correspondingly.

As discussed above, the input set of texture data elements may comprise, e.g., all the texture data elements of a texel block (e.g. a 4×4 texel block) to be encoded. Alternatively, where separate pairs of endpoint colours are required for each different partition that a given texel block to be encoded has been divided into, the set of texture data elements input to the dominant direction finding process should be the set of texture data elements of the partition in question, rather than the entire set of texture data elements for the block.

The first step of the process of the present embodiment for estimating the dominant direction is to determine an average colour value C for the set of texture data elements being considered. This may be the true average value, or an approximation of the average value.

Then, for each texture data element in the set, the average colour C is subtracted from the texel's colour value $T_i$ to give an offset colour value $T'_i$ for the texel, $T'=T-C$.

FIG. 15 shows this schematically for the set of texture data elements 30 shown in FIGS. 13 and 14, and shows the set of texture data element values shown in FIGS. 13 and 14 remapped on to axes X', Y' after offsetting each texel value with the average value for the set of texels. The origin in FIG. 15 accordingly corresponds to the average texel value C for the set of texels.

One or more infinite planes are then used to divide the texture data elements into two groups in the colour space (i.e. to divide the colour space into two parts), and for each such plane, a direction vector V' that will be an estimate of the dominant direction for the set of texture data element values in question is determined (in the manner described below).

In the present embodiment, axis aligned infinite planes (i.e. infinite planes that are perpendicular to one axis of the colour space) that pass through the origin of the offset colour space X', Y' are used to divide the offset colour space into two parts. (Each such plane can be uniquely defined by its normal vector.) As many planes as there are dimensions in the colour space of the texture data elements are considered.

Thus, for the two-dimensional colour space shown in FIG. 15, two different, axis-aligned infinite planes that pass through the origin of the offset colour space are defined and considered.

The Applicants have recognised that if the direction estimate V' produced by a given plane that divides the data space defines a direction that is nearly perpendicular to the plane, then the estimated direction V' for that plane will be a very good estimate of the true dominant direction for the set of texture data element values in question. On the other hand, if the estimated direction V' defines a direction that is very nearly parallel to the plane, then it may be an arbitrarily poor estimate of the true dominant direction for the set of texture data element values in question.

Thus, using at least N planes for N dimensions, and uncorrelated, e.g. axis-aligned, planes, helps to ensure at least one "good" direction estimate (as if N−1 or less planes are used, then there will exist at least one axis in the colour space that is parallel with every plane at once; this axis will give rise to poor estimates).

Thus, for a 3D space for example, three planes that are all perpendicular to each other (such as three axis-aligned planes) are in an embodiment tested, as that will ensure that the angle between the true dominant direction and the planes will exceed 54 degrees for at least one of the three planes.

FIGS. 16 and 17 illustrate this. FIG. 16 shows the offset colour space (and thus the offset texel values) divided by a plane 40 that is perpendicular to the X axis and aligned with the Y axis (i.e. the plane X'=0), and FIG. 17 shows the offset colour space divided by a plane 41 that is perpendicular to the Y axis and aligned with the X axis (i.e. the plane Y'=0).

Other arrangements of planes that divide the texel values in the colour space into two groups can be used if desired.

For each such plane, all the texture data element values on one side of the plane are added up (giving a sum V1), as are all the texture data element values that are on the other side of the plane (giving a sum V2). The vector V' between these two sum points in the colour space is then determined: V'=V1−V2 (or V2−V1). This gives a candidate direction vector V' for each plane dividing the colour space that is being considered.

This is illustrated in FIGS. 16 and 17.

FIG. 16 shows the resultant positive 45 and negative 46 sum points (albeit with the sum values being divided by 10 so that they fit on to the same axes) for the plane 40 that is aligned with the Y-axis, together with the resulting direction vector 47.

FIG. 17 shows the resultant positive 48 and negative 49 sum points (albeit with the sum values again being divided by 10 so that they fit on to the same axes) for the plane 41 that is aligned with the X-axis, together with the resulting direction vector 50.

Although as shown in FIGS. 16 and 17 the direction vectors V' 47, 50 are determined as the directions between the positive and negative sum points in the colour space, because the texture data element values have been offset based on their average value, the magnitude of the positive sum values must equal the magnitude of the negative sum values (i.e. the sum V1+V2=0). As such, the vector direction V' (i.e. the difference V1−V2) for a given plane will be equal to twice the positive (or negative) (vector) sum value (i.e. 2*V1 or 2*V2). This means that the direction vector V' for the plane in question can be determined as being from the origin to the point of the positive sum values (or from the origin to the point of the negative sum values) (or vice-versa). The present embodiment therefore only computes the positive (or the negative) (vector) sum values to derive the direction vector V' for each plane being considered.

It can be seen from FIGS. 16 and 17 that this process will provide two potential candidate direction vectors for the two-dimensional colour space being considered. One of these candidate direction vectors is then chosen as the estimated dominant direction in the colour space for the set of texture data elements being considered.

In the present embodiment, the selection of which candidate direction vector to use as the estimated dominant direction in the colour space for the set of texture data elements being considered is based on the respective lengths of the determined candidate direction vectors. The Applicants have recognised that the longest direction vector based on the positive and negative sum positions (or equivalently a positive sum or negative sum position and the origin) will be the most accurate estimate of the dominant direction for the set of texture data element values being considered. This can be seen from FIGS. 16 and 17, where it can be seen that the longer direction vector 50 determined using the plane aligned with the X-axis in FIG. 17 more closely matches the "ideal" estimate 31 shown in FIG. 14 of the dominant direction vector V for the set of texture data element values being considered.

(In general, the Applicants have recognised that for planes that produce a poor estimate of the true dominant direction, texel values that should have contributed in the same direction will cancel each other out instead (this can be seen from FIGS. 16 and 17). Thus, if multiple estimates are computed using multiple different planes that divide the colour space, then direction vectors that are poor estimates of the dominant direction will show up as sum vectors that are shorter than the sum vectors for the good estimates of the dominant direction.)

The longest of the determined estimate vectors can be determined as desired, for example in the usual Euclidean way with a dot-product, or by computing the Manhattan length of each vector (to avoid multiplications).

Thus the method of the present embodiment estimates the dominant direction of a set of texture data element values by: for an N-dimensional space, picking N axis-aligned planes, each perpendicular to one axis of the space, and for each plane P1, P2, P3 . . . , computing an estimated direction vector V1', V2', V3'. The longest of the estimated direction vectors is then taken as direction to use as representing the dominant direction in the colour space of the set of texture data elements in question.

Thus, for a 3-dimensional RGB (red-green-blue) color space, for example, the following calculation will be performed:

For a plane P1 defined by red=0; derive a direction estimate V1' being the sum of all the offset texel values T' with a positive red component.

For a plane P2 defined by green=0; derive a direction estimate V2' being the sum of all the offset texel values T' with a positive green component.

For a plane P3 defined by blue=0; derive a direction estimate V3' being the sum of all the offset texel values T' with a positive blue component.

For all three direction estimates, the only calculations needed in order to compute the estimate are comparisons and additions.

For a 4-dimensional space (as arises when using RGBA colors rather than RGB colors; this occurs with the BC7 and ASTC texture compression formats, for example), then a fourth estimate vector V4' should be derived as follows:

For a plane P4 defined by alpha=0; derive a direction estimate V4' being the sum of all the offset texel values T' with a positive alpha component.

The longest of the estimated vectors (i.e. of V1', V2' or V3', or of V1', V2', V3' or V4') should then be selected as the direction vector to use as representing the dominant direction for the set of texture data elements in question.

FIG. 18 is a flowchart illustrating the dominant direction estimating process of the present embodiment. The input to this process is the set of texture data elements for which it is desired to determine an estimate of the dominant direction. As discussed above, this set of texture data elements could comprise all the texture data elements of a block of texture data elements to be encoded, or the texture data elements of a partition or subset of a block of texture data elements to be encoded.

As shown in FIG. 18, the process starts with a step of computing the average colour C of all the texel colours $T_i$ of the texels in the set of texels whose dominant direction is to be estimated (step 60).

The next step is to subtract the average colour value C from all the texel colours $T_i$ to produce an offset texel value $T_i'$ for each texel (step 61).

The direction finding process is then initialised for the set of texture data elements, by setting the plane index j and the best found dominant direction estimate V' (step 62), and the texel index i and the current direction estimate V (step 63), to 0.

There is then a loop to calculate the (vector) sum value for the first plane that divides the texels in the colour space into two groups (that divides the colour space of the texels into two parts) that is being considered. Thus at step 64, the position of the texel being considered $T_i$ relative to the plane being considered $P_j$ is evaluated and if the texel's offset value $T_i'$ is positive (i.e. it is on the positive side of the plane $P_j$) (step 65), the texel's offset value $T_i$ is added to the current direction estimate V (step 66). If at step 65 it is found that the texel $T_i'$ is on the negative side of the plane $P_j$, the addition step 66 is skipped.

The texel index is then incremented at step 67 to move on to the next texel in the set being considered. If the last texel has not been reached (step 68), the process loops back to the position evaluation step 64 and carries out the same process on the next texel in the set and so on, until the last texel in the set of texels being considered is reached (step 68).

Once the last texel in the set has been considered, the lengths of the determined estimate vector V for the plane currently being considered, and of the existing best direction vector estimate V', are calculated (step 69) and compared (step 70).

If the length of the current dominant direction estimate vector V is longer than the length of the previous longest direction vector estimate V', then the current dominant direction estimate vector V is set as the best dominant direction vector V' that has been found so far (step 71). If that is not the case, then the previous longest dominant direction vector estimate V' is retained as the best dominant direction estimate V'.

The process then moves on to the next plane to be considered and is repeated for that plane (steps 72 and 73), and so on, until the last plane has been considered, at which point the longest found dominant direction vector estimate V' is selected as the estimate of the dominant direction to use for the set of texture data elements being considered (step 74).

Once the estimate of the dominant direction to use for the set of texture data elements (i.e. of the direction in the colour space to be used when determining the endpoint colours for the set of texture data elements to be encoded) has been determined, the endpoint colour values to use for the set of texture data elements in question are then determined using that determined direction. This is done in the present embodiment by using the average color C for the set of texture data elements in question, and the determined (selected) estimated dominant direction vector V', to form a line in the color-space that the texture data elements of the set are then projected on to, as follows:

1. Define a parametric line in color-space, L=C+t*V'
2. Project all the texture data elements onto this line; this basically amounts to finding a parameter value t for the point on the line L that is closest to the texel; given an offset texel value T'=T−C, the parameter t can be computed as t=dot(V',T')/dot(V',V'), where dot( ) denotes the usual vector dot-product.

The lowest and highest parameter values, t_low and t_high, that result from projecting the texture data elements' values onto the determined line in the colour space are then used to derive two endpoint colours E1, E2, to be used for the set of texture data elements in question, as:

$$E1=C+t\_low*V$$

$$E2=C+t\_high*V.$$

Other arrangements for determining the endpoint colours (or other base data value or values) to use for a set of texture data elements using the estimated dominant direction could, of course, be used if desired.

These dominant direction and endpoint value estimating and determining processes may be implemented as desired, e.g. by using appropriately configured dedicated hardware elements (processing circuitry), or by programming a programmable more general processor (processing circuitry) to operate in the manner described.

As will be appreciated by those skilled in the art, as well as determining which endpoint colours to use, the set and block of texture data elements will otherwise need to be encoded in a suitable manner to allow a decoder to decode the encoded texel block to reproduce (at least an approximation to) the original texel values.

The format for encoding (and decoding) a block of texture data elements (texels) that is used in the present embodiment will accordingly now be described.

Overview

The present embodiment uses a texture compression format designed to provide lossy texture compression suitable for a wide range of different types of content and a wide range of quality/bitrate tradeoffs. The format has the following main features:

128-bit block size
an encoded block is self-contained (any given texel is completely defined by the contents of a single block)
Designed for compression of the following types of texture data:
  LDR (low dynamic range) texture data with 1, 2, 3 or 4 components per texel (Luminance, Luminance-Alpha, RGB and RGB-Alpha, respectively)
  HDR (high dynamic range) texture data with 1, 3 or 4 components per texel
Fine-grained per-block adjustable bit-allocation between index bits and color endpoint bits.
2D and 3D variants.
Each block represents a rectangular or cuboidal footprint of texels. The footprint size determines the bit-rate of this texture format and is global for the texture as a whole.
Supported footprint sizes for 2D variants are:
  4×4 (8 bpp)
  5×4 (6.40 bpp)
  5×5 (5.12 bpp)
  6×5 (4.27 bpp)
  6×6 (3.56 bpp)
  8×5 (3.20 bpp)
  8×6 (2.67 bpp)
  10×5 (2.56 bpp)
  10×6 (2.13 bpp)
  8×8 (2 bpp)
  10×8 (1.60 bpp)
  10×10 (1.28 bpp)
  12×10 (1.07 bpp)
  12×12 (0.88 bpp)
Supported footprint sizes for 3D variants are:
  3×3×3 (4.74 bpp)
  4×3×3 (3.56 bpp)
  4×4×3 (2.67 bpp)
  4×4×4 (2 bpp)
  5×4×4 (1.60 bpp)
  5×5×4 (1.28 bpp)
  5×5×5 (1.02 bpp)
  6×5×5 (0.85 bpp)
  6×6×5 (0.71 bpp)
  6×6×6 (0.59 bpp)
The types of texture data supported (component count, LDR vs HDR) is not dependent on footprint size; all types are available at all sizes.
Block partitioning, with a partitioning pattern generation function; each partition has a separate pair of endpoint colors. The format allows different partitions within a single block to have different endpoint types. The format supports 1 to 4 partitions per block.
Index decimation: The format allows indices to be specified for only some texels, with an infill procedure used for the remaining texels; this is especially useful at lower bitrates.
Void extents: The format offers an encoding to indicate large empty regions within the texture.
The ability to use different data rates for different mipmap levels.

Layout of the Block

If partitioning is disabled for the block, then the encoded block has the following format:

| Bits | Usage |
| --- | --- |
| 10:0 | Index Bits Mode |
| 12:11 | "00" |
| 16:13 | Color Endpoint Mode |
| 127:17 | Remaining Space |

If partitioning is enabled, the encoded block has the following format:

| Bits | Usage |
| --- | --- |
| 10:0 | Index Bits Mode |
| 12:11 | Partition count minus 1 |
| 22:13 | Partition index |
| 28:23 | Color Endpoint Mode, initial six bits |
| 127:29 | Remaining Space |

The "Remaining Space" is used to hold Index Data (from the top down), Color Endpoint Data (from the bottom up) and Color Endpoint Mode bits (if more than 6 bits are needed). The sizes of the Index Data, the Color Endpoint Data and the Color Endpoint Mode bits are not fixed, but are instead computed based on Index Bit Mode and the initial six bits of Color Endpoint Mode.

As a special case, if bits[8:0] of the encoded block are "111111100", then the block does not encode ordinary compressed content; instead, it encodes a Void-Extent Block.

Partitioning

An encoded block is subdivided into 1, 2, 3 or 4 partitions, with a separate color endpoint pair for each partition. The number of partitions is specified by the "Partition count minus 1" bits.

If 2 or more partitions are used, then the partition index is used to select one of 1024 partitioning patterns; the set of patterns supported depends on the partition count and block size.

The partitioning patterns are produced with a generator function; this enables a very large set of partitioning patterns for different block sizes to be implemented with a minimal number of gates. The details on how the generator works in this embodiment are given below.

Index Modes

The "Index Bits Mode" field controls the number of indexes present, as well as the range used for them. The set of possible combinations depend on the block dimensionality (2D or 3D).

The actual indexes in the block are stored are follows:
First, they are encoded using the Integer Sequence Encoding method described below.
The resulting bit-sequence is then bit-reversed, and stored from the top of the block downwards.

Usage of Indexes

The indexes are used to interpolate between two endpoint colors for each texel. First, they are scaled from whatever interval (range) they were supplied in to the range 0.1; the resulting value is then used as a weight to compute a weighted sum of the two endpoints. Any suitable unquantization procedure for the scaling to the 0.1 range can be used.

Index Infill

Each texel that the block encodes has a corresponding index to be used for that texel. In some of the index modes, one index is supplied for every texel in the block; in others, the number of indexes is less than the number of texels. In the latter case, the indexes that are actually to be used for the texels are derived by bilinear (or simplex or trilinear, for 3D blocks) interpolation from the indexes that are supplied (encoded) in the block. Thus, when the index count is smaller than the number of texels in the block, the actual indexes to be used for the texels of the block are derived by bilinear (or simplex or trilinear) interpolation from the index values supplied in the encoded block, i.e. the index for a texel will be computed as an appropriately weighted sum of 2, 3 or 4 (or more) of the indexes supplied (included) in the encoded block.

Thus, in the present embodiment, where an encoded texture data block includes fewer indices than the number of texels the block represents, the encoded texture data block will include a set of index values representing an array of index values at a given resolution that is less than the resolution of the array of texture data elements that the block represents, and then the index values to use for the array of texture data elements that the block represents are derived in use by bilinear (or simplex or trilinear) interpolation from the array of index values that is encoded (included) in the encoded texture data block. For example, an encoded block encoding an 8×8 array of texels may encode (include) only a 5×5 array of index values.

Other arrangements, such as using look-up tables, and/or using predefined index infill patterns (which may be derived, e.g. using a predefined infill pattern generation function, or stored explicitly, e.g. in look-up tables), to derive any "missing" texel indexes can also or instead be used if desired.

Index Planes

Depending on the Index Bits mode selected, the format may offer 1 or 2 index planes. In the case of 2 index planes, two indexes rather than just one are supplied for each texel that receives indexes. Of these two indexes, the first one is used for a weighted sum of three of the color components; the second is used for a weighted sum of the fourth color component. If only 1 index plane is present, it applies to all four color components.

If two index planes are used, then a 2-bit bitfield is used to indicate which of the color components the second index plane applies to. These two bits are stored just below the index bits, except in the case where leftover color endpoint type bits are present; in that case, these two bits are stored just below the leftover color endpoint type bits.

This two-bit bitfield has the following layout:

| Value | Meaning |
|-------|---------|
| 0 | Red |
| 1 | Green |
| 2 | Blue |
| 3 | Alpha |

If index infill is present while two index planes are being used, then index infill is performed on each index plane separately.

Index Modes

The Index Mode field specifies the width, height and depth of the grid of indices, what range of values they use, and whether dual index planes are present. Since some these are not represented using powers of two (there are 12 possible index widths, for example), and not all combinations are allowed, this is not a simple bit packing. However, it can be unpacked quickly in hardware.

The index ranges are encoded using a 3 bit value R, which is interpreted together with a precision bit H, as follows:

| Low Precision Range (H = 0) | | | | |
|---|---|---|---|---|
| R | Index Range | Trits | Quints | Bits |
| 000 | Invalid | | | |
| 001 | Invalid | | | |
| 010 | 0...1 | | | 1 |
| 011 | 0...2 | 1 | | |
| 100 | 0...3 | | | 2 |
| 101 | 0...4 | | 1 | |
| 110 | 0...5 | 1 | | 1 |
| 111 | 0...7 | | | 3 |

| High Precision Range (H = 1) | | | | |
|---|---|---|---|---|
| R | Index Range | Trits | Quints | Bits |
| 000 | Invalid | | | |
| 001 | Invalid | | | |
| 010 | 0...9 | | 1 | 1 |
| 011 | 0...11 | 1 | | 2 |
| 100 | 0...15 | | | 4 |
| 101 | 0...19 | | 1 | 2 |
| 110 | 0...23 | 1 | | 3 |
| 111 | 0...31 | | | 5 |

For 2D blocks, the index mode field is laid out as follows:

| 10 | 9 | 8 | 7 | 6 | 5 | 4 | 3 | 2 | 1 | 0 | Width N | Height M | Notes |
|---|---|---|---|---|---|---|---|---|---|---|---|---|---|
| D | H |   | B |   | A | $R_0$ | 0 | 0 | $R_2$ | $R_1$ | B + 4 | A + 2 |   |
| D | H |   | B |   | A | $R_0$ | 0 | 1 | $R_2$ | $R_1$ | B + 8 | A + 2 |   |
| D | H |   | B |   | A | $R_0$ | 1 | 0 | $R_2$ | $R_1$ | A + 2 | B + 8 |   |
| D | H | 0 | B |   | A | $R_0$ | 1 | 1 | $R_2$ | $R_1$ | A + 2 | B + 6 |   |
| D | H | 1 | B |   | A | $R_0$ | 1 | 1 | $R_2$ | $R_1$ | B + 2 | A + 2 |   |
| D | H | 0 | 0 |   | A | $R_0$ | $R_2$ | $R_1$ | 0 | 0 | 12 | A + 2 |   |
| D | H | 0 | 1 |   | A | $R_0$ | $R_2$ | $R_1$ | 0 | 0 | A + 2 | 12 |   |
| D | H | 1 | 1 | 0 | 0 | $R_0$ | $R_2$ | $R_1$ | 0 | 0 | 6 | 10 |   |
| D | H | 1 | 1 | 0 | 1 | $R_0$ | $R_2$ | $R_1$ | 0 | 0 | 10 | 6 |   |
|   | B | 1 | 0 |   | A | $R_0$ | $R_2$ | $R_1$ | 0 | 0 | A + 6 | B + 6 | D = 0, H = 0 |
| x | x | 1 | 1 | 1 | 1 | 1 | 1 | 1 | 0 | 0 | — | — | Void-extent |
| x | x | 1 | 1 | 1 | x | x | x | x | 0 | 0 | — | — | Reserved |
| x | x | x | x | x | x | x | 0 | 0 | 0 | 0 | — | — | Reserved |

Note that, due to the encoding of the R field, as described in the previous page, bits R2 and R1 cannot both be zero, which disambiguates the first five rows from the rest of the table.

For 3D blocks, the index mode field is laid out as follows:

| 10 | 9 | 8 | 7 | 6 | 5 | 4 | 3 | 2 | 1 | 0 | Width N | Height M | Depth Q | Notes |
|---|---|---|---|---|---|---|---|---|---|---|---|---|---|---|
| D | H |   | B |   | A | $R_0$ |   | C | $R_2$ | $R_1$ | A + 2 | B + 2 | C + 2 |   |
|   | B | 0 | 0 |   | A | $R_0$ | $R_2$ | $R_1$ | 0 | 0 | 6 | B + 2 | A + 2 | D = 0, H = 0 |
|   | B | 0 | 1 |   | A | $R_0$ | $R_2$ | $R_1$ | 0 | 0 | A + 2 | 6 | B + 2 | D = 0, H = 0 |
|   | B | 1 | 0 |   | A | $R_0$ | $R_2$ | $R_1$ | 0 | 0 | A + 2 | B + 2 | 6 | D = 0, H = 0 |
| D | H | 1 | 1 | 0 | 0 | $R_0$ | $R_2$ | $R_1$ | 0 | 0 | 6 | 2 | 2 |   |
| D | H | 1 | 1 | 0 | 1 | $R_0$ | $R_2$ | $R_1$ | 0 | 0 | 2 | 6 | 2 |   |
| D | H | 1 | 1 | 1 | 0 | $R_0$ | $R_2$ | $R_1$ | 0 | 0 | 2 | 2 | 6 |   |
| x | x | 1 | 1 | 1 | 1 | 1 | 1 | 1 | 0 | 0 | — | — | — | Void-extent |
| x | x | 1 | 1 | 1 | x | x | x | x | 0 | 0 | — | — | — | Reserved (except for valid void extent encodings) |
| x | x | x | x | x | x | x | 0 | 0 | 0 | 0 | — | — | — | Reserved |

The D bit is set to indicate dual-plane mode. In this mode, the maximum allowed number of partitions is 3.

The size of the grid in each dimension must be less than or equal to the corresponding dimension of the block footprint. If the grid size is greater than the footprint dimension in any axis, then this is an illegal block encoding and all texels will decode to an error color.

The index range specifies how the index values are used to compute the weightings. In all cases, the value 0 will generate an interpolated value with the value of endpoint 1, and the maximum value (according to the selected range) generates an interpolated value equal to endpoint 2's value.

For LDR endpoint values, the interpolation is linear. So if M is the maximum allowed value in the range, the actual interpolated value is equal to (1−index/M)*(endpoint value 1)+(index/M)*(endpoint value 2). The division by M is what scales the input values in the range 0 . . . M into weighting values in the range 0 . . . 1. The range therefore selects how many intermediate steps there are between these two values. The more range, the more likely one is able to represent a value closely, but the more bits needed to encode it.

In the present embodiment, the index value is first rescaled so that M is a power of two (in an embodiment 64), so that the costly division by M can be replaced with a relatively cheap multiplication by 64/M, and then a division by 64.

For HDR endpoint values, the interpolation is a logarithmic function, or an approximation thereof. The endpoint values are encoded as logarithms to the base 2 of the original endpoint values. So if M is the maximum allowed value in the range, the interpolated value is the logarithm of the final decoded values, and is equal to (1−index/M)*(endpoint value 1)+(index/M)*(endpoint value 2). The final decoded value is therefore 2 to the power of the interpolated value.

In the present embodiment, the HDR endpoint values are stored as values with a 12 bit floating point representation, and interpolation occurs in a piecewise-approximate logarithmic manner as follows.

The HDR color components from each endpoint, C0 and C1, are initially shifted left 4 bits to become 16-bit integer values and these are first interpolated in the same way as LDR, using the rescaled index value i. The resulting 16-bit value C is then decomposed into the top five bits, e, and the bottom 11 bits m, which are then processed and recombined with e to form the final value Cf:

C=floor((C0*(64−i)+C1*i+32)/64)
E=(C&0xF800)>>11; m=C&0x7FF;
if (m<512) {mt=3*m;}
else if (m>=1536) {mt=5*m−2048;}
else {mt=4*m−512;}
Cf=(e<<10)+(mt>>3)

This interpolation is simple to implement in hardware, and is a considerably closer approximation to a logarithmic interpolation than interpolating the integer interpretation of the bit pattern of a floating-point value.

The final value Cf is interpreted as an IEEE FP16 value. If the result is +Inf or NaN, it is converted to the bit pattern 0x7BFF, which is the largest representable finite value.

The index count is used in larger block sizes to indicate how many indexes are actually present in the encoded block. This may be less than the size of the block, in which case the "missing" indexes have to be derived (as discussed above). (For example, a block encoding an 8×8 texel array may only specify a 4×4 grid of indexes, in which case the remaining indexes will be generated using "index infill", as discussed above.)
Color Endpoint Modes The format of the present embodiment supports 16 Color Endpoint Modes, which are described in more detail later. These endpoint modes are subdivided into 4 classes:
 class 0: one color endpoint pair is specified by 2 integers
 class 1: one color endpont pair is specified by 4 integers
 class 2: one color endpoint pair is specified with 6 integers
 class 3: one color endpoint pair is specified with 8 integers
Each of these classes contains 4 Color Endpoint Modes.

In 1-partition mode, the 4-bit Color Endpoint Mode field has the following encoding:

| Bits | Usage |
| --- | --- |
| 1:0 | Endpoint Mode Class |
| 3:2 | Endpoint Mode within class |

In modes with more than 1 partition, the color endpoint mode coding is more elaborate:

First, we have a 2-bit Endpoint Mode Class Pair Selector; this selector is encoded as follows:

| Value | Meaning |
| --- | --- |
| 00 | All endpoint pairs are of same type, this type follows |
| 01 | All endpoint pairs are of class 0 or class 1 |
| 10 | All endpoint pairs are of class 1 or class 2 |
| 11 | All endpoint pairs are of class 2 or class 3 |

If all endpoints are of same type, then this field is followed by a 4-bit field, containing the Color Endpoint Mode used for all partitions. Otherwise, the field is followed by:
 First, one bit per partition indicating which class its endpoint pair belongs to.
 Then, two bits per partition indicating which mode within the class it belongs to.

Thus, for multi-partition modes, the endpoint mode representation may take from 6 to 14 bits. Of these, the 6 first bits are stored just after the partition indexes, and the remaining bits are stored just below the index bits (variable position).

This data layout ensures that the bits that indicate endpoint pair class always appear in fixed locations; this helps decode performance in hardware.
Color Endpoint Representation The color endpoints themselves (whose values are determined in the manner discussed above) are also represented using the Integer Sequence Encoding. The actual range being used is not directly encoded in the block; instead, the following is done:
 From the partition-count and color-mode encodings, the number of integers actually needed for the color encodings is computed. This may be from 2 to 32, in increments of 2. (The lowest count, 2, occurs when using the Two-Luminance endpoint type with a single partition; the highest count, 32, occurs when using the Two-RGBA endpoint type with 4 partitions).
 From the partition-count, color-mode encoding and index-bits-mode, the number of bits needed to represent these data fields is computed; this bit count is then subtracted from the block size in order to obtain the number of bits actually available for the color encodings.
 Then, the largest range whose Integer Sequence Encoding will fit into the available number of bits is determined (and used).

For example, if the space available for color endpoints is 35 bits, and the number of integers actually needed for the color encodings is ten, then the range used will be 0.9: the Integer Sequence Encoding of ten integers of such a range takes 34 bits, which fits. The next step up would be to use the range 0.11; for this range, the Integer Sequence Encoding would take 36 bits to encode ten integers, which would not fit.
Integer Sequence Encoding The Integer Sequence Encoding is a data encoding that is used to encode most of the data in the compressed (encoded) texture data block.

In order to use space efficiently, the encoding format is able to use a non-integer number of bits for its color endpoint and index fields. This is achieved by using trits (items that can take the values 0, 1, 2 (whereas bits can only take the values 0 and 1)), and quints (which can take the values 0, 1, 2, 3, 4). As trits and quints cannot be represented directly in a binary computer the encoding format instead stores trits and quints in a bit representation that allows n trits to be represented with $$\left\lceil \frac{8n}{5} \right\rceil$$

bits and n quints to be represented with $$\left\lceil \frac{7n}{3} \right\rceil$$

bits.

The Integer Sequence Encoding is used to store a sequence of integers within a bounded range. The range used determines how many bits, trits and quints are used to store each integer. The set of supported ranges and their bit/trit/quint allocation is:

| Range | Bits | Trits/Quints |
| --- | --- | --- |
| 0 . . . 1 | 1 | 0 |
| 0 . . . 2 | 0 | 1 trit |
| 0 . . . 3 | 2 | 0 |
| 0 . . . 4 | 0 | 1 quint |
| 0 . . . 5 | 1 | 1 trit |
| 0 . . . 7 | 3 | 0 |
| 0 . . . 9 | 1 | 1 quint |
| 0 . . . 11 | 2 | 1 trit |
| 0 . . . 15 | 4 | 0 |
| 0 . . . 19 | 2 | 1 quint |
| 0 . . . 23 | 3 | 1 trit |
| 0 . . . 31 | 5 | 0 |
| 0 . . . 39 | 3 | 1 quint |
| 0 . . . 47 | 4 | 1 trit |
| 0 . . . 63 | 6 | 0 |
| 0 . . . 79 | 4 | 1 quint |
| 0 . . . 95 | 5 | 1 trit |
| 0 . . . 127 | 7 | 0 |
| 0 . . . 159 | 5 | 1 quint |
| 0 . . . 191 | 6 | 1 trit |
| 0 . . . 255 | 8 | 0 |

Encoding with Bits Only

If the range selected only uses bits, then integers are stored sequentially, with the lowest bit appearing first in the sequence encoding. For example, if you want to encode a sequence of four numbers (a, b, c, d) whose range is 0 . . . 7 and whose bit-representation is ($a=a_2a_1a_0$, $b=b_2b_1b_0$, $c=c_2c_1c_0$, $d=d_2d_1d_0$), then the resulting sequence is the 12-bit pattern $d_2d_1d_0c_2c_1c_0b_2b_1b_0a_2a_1a_0$ Encoding with Trits If the range selected uses trits, then each integer is broken into two parts before encoding: if the selected range has b bits, then the low part of a given integer x is given by $L=X \bmod 2^b$ and the high part is given by $$H = \left\lfloor \frac{X}{2^b} \right\rfloor.$$

The L portion is represented by zero or more bits; the H portion is represented by one trit. The integers are then stored in groups of 5, as follows:

First, a trit H is collected from every integer; this results in 5 trits. These are encoded into a trit-block; the full size of the trit-block is 8 bits.

Then, bits are stored in the sequence in the following order:
First, the low bits for the first integer are stored.
Then, bits[1:0] of the trit-block are stored.
Then, the low bits for the second integer are stored.
Then, bits[3:2] of the trit-block are stored.
Then, the low bits for the third integer are stored.
Then, bit [4] of the trit-block is stored.
Then, the low bits for the fourth integer are stored.
Then bits[6:5] of the trit-block are stored.
Then, the low bits for the fifth integer are stored.
Then, bit [7] of the trit-block is stored.

This operation is repeated for every group of 5 integers, until all the integers in the sequence have been consumed. At encode time, if the number of integers is not a multiple of 5, the integer sequence is padded with 0s until its size becomes a multiple of 5. At decode time, if the number of integers to extract from the sequence is not a multiple of 5, then the sequence's bit representation has a (notionally infinite) string of zero-bits appended. This way, the format only stores bits for the integers actually needed, instead of storing bits for a multiple-of-5 integers.

Decoding of a Trit-Block

Let the trit-block be denoted by b[7:0]. Now, proceed as follows:

First, we check whether b[4:2] is equal to 3'b111. If it is, then:
Set c={b[7:5],b[1:0]}
Set $t_4=2$ and $t_3=2$
Else
Set c=b[4:0]
If b[6:5]=2'b11 then
Set $t_4=2$ and $t_3=\{1\text{'b0},b[7]\}$
Else
$t_4=\{1\text{'b0},b[7]\}$ and $t_3=b[6:5]$
if c[1:0]=2'b11 then
$t_2=2, t_1=\{1\text{'b0},c[4]\}, t_0=\{c[3], c[2]\&\sim c[3]\}$
Else if c[3:2]=2'b11 then
$t_2=2, t_1=2, t_0=c[1:0]$
Else
$t_2=\{1\text{'b0},c[4]\}, t_1=c[3:2], t_0=\{c[1],c[0]\&\sim c[1]\}$ This encoding is chosen based on two criteria:
It has the property that if only the n lowest trits are nonzero, then only the $$\left\lceil \frac{8n}{5} \right\rceil$$

lowest bits of the trit-block can actually be nonzero.

The decoding process has a particularly efficient hardware implementation.

The AND-NOT operation on the lowest bit of to ensures that the trit-block unpacks to a tuple of 5 valid trits for all the 256 possible input values, even though there are only $3^5=243$ such tuples.

Example Integer Sequence with Trits

As an example, it will be assumed that 8 integers in the range 0..11 are to be encoded using the Integer Sequence Encoding scheme of the present embodiment, and that these eight integers are {2,9,3,5,11,8,0,4}. First, the integers need to be split them into bits and trits; given that the 0 . . . 11 range has one trit and two bits, the result of this splitting is:

Trits (high part of the numbers): {0,2,0,1,2,2,0,1}
Bits (low part of the numbers): {01,01,11,01,11,00,00,00}

Given that there are 8 trits and 16 bits, the encoded Integer Sequence will have $$16 + \left\lceil \frac{8*8}{5} \right\rceil = 29 \text{ bits.}$$

The trits now need to be encoded into two trit-blocks. The low 5 trits are encoded into one trit-block; the high 3 trits are encoded into a second trit-block.

Encoding with Quints

If the range selected uses quints, then each integer is broken into two parts before encoding: if the selected range has b bits, then the low part of a given integer X is given by $L=X \bmod 2^b$ and the high part is given by $$H = \left\lfloor \frac{X}{2^b} \right\rfloor.$$

The L portion is represented by zero or more bits; the H portion is represented by one quint. The integers are then stored in groups of 3, as follows:

First, a quint H is collected from every integer; this results in 3 quints. These are encoded into a quint-block; the full size of the quint-block is 7 bits.

Then, bits are stored in the sequence in the following order:
First, the low bits for the first integer are stored.
Then, bits[2:0] of the quint-block are stored.
Then, the low bits for the second integer are stored.
Then, bits[4:3] of the quint-block are stored.
Then, the low bits for the third integer are stored.
Then, bit[6:5] of the quint-block is stored.

This operation is repeated for every group of 3 integers, until all the integers in the sequence have been consumed. At encode time, if the number of integers is not a multiple of 3, the integer sequence is padded with 0s until its size becomes a multiple of 3. At decode time, if the number of integers to extract from the sequence is not a multiple of 3, then the sequence's bit representation has a (notionally infinite) string of zero-bits appended. This way, the format only stores bits for the integers actually needed, instead of storing bits for a multiple-of-3 integers.

Decoding of a Quint-Block

Let the quint-block be denoted by b[6:0]. Now, proceed as follows:

if b[2:1]=2'b11 and b[6:5]=2'b00 then
  Set $t_2$={b[0],b[4]&~b[0],b[3]&~b[0]}, $t_1$=4, $t_0$=4
Else
  If b[2:1]=2'b11 then
    Set $t_2$=4 and c={b[4:3], ~b[6:5], b[0]}
  Else
    Set $t_2$={1'b0,b[6:5]} and c=b[4:0]
  If c[2:0]=3'b101 then
    Set $t_1$=4 and $t_0$={1'b0,c[4:3]}
  Else
    Set $t_1$={1'b0,c[4:3]} and $t_0$=c[2:0]

This encoding is chosen by two criteria:

It has the property that if only the n lowest quints are nonzero, then only the $$\left\lceil \frac{7n}{3} \right\rceil$$

lowest bits of the quint-block can actually be nonzero.

The decoding process has a particularly efficient hardware implementation.

The AND-NOT operation in the first rule ensures that all 128 possible values decode to valid quint-triplets, even though there exists only $5^3$=125 distinct quint-triplet values; four of the values (of the form 7'b00xx111) represent the quint-triplet <4,4,4>.

The above decoding arrangement when using trits or quints effectively, for a stream of values, first emit the bits for each value, and then emit sufficient bits from the packed trit- or quint-block to make up 8n/5 (rounded up) bits or 7n/3 (rounded up) bits, respectively. This ensures that the bit-stream can be terminated after any value without losing data.

The above trit/quint unpacking functions have a relatively low hardware cost.

Other arrangements would, of course, be possible. For example, there are a fairly large number of possible unpacking functions as such; some of these can be obtained by e.g. just inverting or swapping input or output bits relative to what is described above; other ones can be obtained by more elaborate sub-case approaches or by arithmetic (repeated division/modulo gives one particularly-easy-to-understand unpacking; however this approach is expensive in HW) or by look-up tables (which allow arbitrary unpacking functions albeit at a higher cost).

Color Endpoint Unquantization

The color endpoints, after having been extracted from their Integer Sequence Encoding, need to be unquantized so that they end up in the range 0.255 instead of whatever range was used in the Integer Sequence Encoding.

For bit-only ranges, the unquantization is done using simple bit replication.

In the case of a number composed of a trit/quint and one or more bits, a more elaborate procedure is performed:

First, the lowest bit $b_0$ is cut off.

Based on the range used, a constant C is selected; the trit or quint is multiplied by this constant, resulting in the 9-bit value T.

Based on the range used, a swizzle is performed on the remaining bits; this 9-bit value is called B.

The addition T+B is then performed, then every bit of the addition result is XORed with the bit $b_0$.

The result is a 9-bit number; $b_0$ is prepended to this number, then the two lowest bits are discarded; this leaves 8 bits, which is the unquantization result.

Below are tables that specify the swizzles and C values to use for the various ranges. Note that the lowest bit $b_0$ is not part of the input bits.

Swizzles and C values for the case where a trit component is present:

| Range | Input bits | Swizzle | C |
|---|---|---|---|
| 0 ... 5 | none | 000000000 | 204 |
| 0 ... 11 | a | a000a0aa0 | 93 |
| 0 ... 23 | ab | ab000abab | 44 |
| 0 ... 47 | abc | abc000abc | 22 |
| 0 ... 95 | abcd | abcd000ab | 11 |
| 0 ... 191 | abcde | abcde000a | 5 |

Swizzles and C values for the case where a quint component is present:

| Range | Input bits | Swizzle | C |
|---|---|---|---|
| 0 ... 9 | none | 000000000 | 113 |
| 0 ... 19 | a | a0000aa00 | 54 |
| 0 ... 39 | ab | ab0000aba | 26 |
| 0 ... 79 | abc | abc0000ab | 13 |
| 0 ... 159 | abcd | abcd0000a | 6 |

This procedure produces an unquantization result with an error that is never greater than off-by-1 relative to a correctly-rounding unquantization, while imposing a much lesser hardware cost (the "correctly rounding" unquantization procedure requires a multiplier, while the procedure presented here does not). It can have the side effect of scrambling the code point order, but this does not adversely affect image quality and is therefore considered acceptable (the encoder can easily compensate for this scrambling with a simple table lookup).

In this unquantisation procedure, the constant C is based on 1023/M where M is the maximum value in the range, and is selected so that the trit or quint makes a low-order contribution to the final unquantized result (while the bits make a high-order contribution, which is what the swizzle ultimately tries to achieve), such that the representable codepoints are as evenly distributed as possible.

The swizzle patterns are related to the bit patterns of the reciprocal of M, so that the swizzle effectively does a truncated multiplication.

The manipulation using $b_0$ is done in order to obtain codepoint symmetry, so that if there exists a value that unquantizes to X, there also always exists a value that unquantizes to 255-X. (This symmetry does not quite hold for the 0 . . . 2 and 0 . . . 4 ranges, which do not allow for the $b_0$ bit at all; these have an odd number of codepoints and therefore cannot be made symmetric.)

Color Endpoint Modes

The format of the present embodiment supports a total of 16 Color Endpoint Modes; these modes control how the color endpoint integers are converted into actual endpoint colors. The integers are the 0.255 range integers that are present after the Color Endpoint Unquantization.

Several procedures are used repeatedly for several color conversion modes; below, C++ implementations of these procedures are given:

The Bit_Transfer_Signed Procedure

The bit_transfer procedure is used when one of the integers in an endpoint representation is deemed to require more precision than the other ones. It is used instead of independently assigning ranges to some sets of values, to skew the bit distribution more favourably.

Assuming two integers A and B, the bit-transfer works from A to B as follows:

```
void bit_transfer_signed( uin8_t &a, uint8_t &b )
{
    b >>= 1;
    b |= a & 0x80;
    a >>= 1;
    a &= 0x3F;
    if( (a & 0x20) != 0 ) a -= 0x40;
}
```

Where necessary, the encoding should specify which values are the donors and which the receivers of the transferred bits.

The Blue-Contraction Procedure

The blue_contract procedure is used to provide 1 extra bit of effective precision for the red and green components of RGB colors that are close to gray. The procedure works as follows:

```
void blue_contract( uint8_t &r, uint8_t &g, uint8_t &b )
{
    r = (r+b) >> 1;
    g = (g+b) >> 1;
}
```

This procedure is used, because the Applicants have recognised that if the texels in a block to be encoded are close to grey, then the endpoint r, g, and b values will be close to one another, and it is advantageous in that case to encode the r and g components with more precision than the blue. The encoder may decide in this case to transfer precision from the blue by expanding the endpoint's green and red components according to the following blue-expansion transformation:

G=(g<<1)−b
R=(r<<1)−b
B=b (It can be determined that the endpoints are sufficiently close to the gray line by, for example, testing if the gray expansion transform results in values that can be properly represented, i.e. they are still in the range 0 . . . 1. Other arrangements would, of course, be possible.)

The resulting R and G and B values are encoded as the endpoint values.

If this has been applied during encoding, the inverse "blue contraction" transformation described above must be applied to the endpoint values after decoding:

g=(G+B)>>1
r=(R+B)>>1
b=B

The encoder could use an additional bit to indicate to the decoder that this is required, but in the present embodiment it takes advantage of the fact that the order of endpoints is not important. A comparison function between the two endpoint colors (e.g. by comparing the total of r, g and b for each endpoint) is therefore defined. The encoder then orders the endpoints such that that the results of the comparison between the color values at endpoint 1 and endpoint 2 reflects whether blue contraction should be applied during the decoding process or not. The decoder will then use the same comparison function to conditionally apply blue contraction on the endpoint values after decoding (as discussed below).

Colour Endpoint Mode 0: Two Luminance or Alpha endpoints

This mode takes as input two integers (v0, v1). If v0 is less than or equal to v1, then these integers form two RGBA colors (r0,g0,b0,a0)=(v0,v0,v0,0xFF) and (r1,g1,b1,a1)=(v1,v1,v1, 0xFF). Otherwise, they form two RGBA colors (r0,g0,b0,a0) =(0,0,0,v1) and (r1,g1,b1,a1)=(0,0,0,v0).

Mode 1: Luminance, Base+Offset

This mode takes as input two integers (v0,v1). Two integers l0 and l1 are then formed according to the following procedure:

```
void mode1_unpack( int v0, int v1, int &l0, int &l1 )
{
    l0 = (v0 >> 2) | (v1 & 0xC0);
    l1 = l0 + (v1 & 0x3f);
    if(l1 > 0xFF) l1 = 0xFF;
}
```

After this, two RGBA colors are formed as (r0,g0,b0,a0)= (l0,l0,l0,0xFF) and (r1,g1,b1,a1)=(l1,l1,l1,0xFF)

Mode 2: HDR Luminance, Large Range

This mode takes as input two integers (v0,v1). These two integers are then unpacked into a pair of HDR luminance values, as follows:

```
void mode2_unpack_y( int v0, int v1, int &y0, int &y1 )
{
    if(v1 >= v0)
    {
        y0 = (v0 << 4);
        y1 = (v1 << 4);
    }
    else
    {
        y0 = (v1 << 4) + 8;
        y1 = (v0 << 4) − 8;
    }
}
```

This mode is intended for use when there are large luminance changes in a small region or there is a need to represent very large/small luminance values.

Mode 3: HDR Luminance, Small Range

This mode takes as input two integers (v0,v1). These two integers are then unpacked into a pair of HDR luminance values, as follows:

```
void mode3_unpack_y( int v0, int v1, int &y0, int &y1 )
{
    if((v0&0x80) !=0)
    {
        y0 = ((v1 & 0xE0) << 4) | ((v0 & 0x7F) << 2);
        d = (v1 & 0x1F) << 2;
    }
    else
    {
        y0 = ((v1 & 0xF0) << 4) | ((v0 & 0x7F) << 1);
        d = (v1 & 0x0F) << 1;
    }
    y1 = y0 + d;
    if(y1 > 0xFFF) { y1 = 0xFFF; }
}
```

Mode 4: Two Luminance-Alpha Endpoints

This mode takes as input four integers(v0, v1, v2, v3). These integers form two RGBA colors (r0,g0,g0,a0)=(v0,v0, v0,v2) and (r1,g1,b1,a1)=(v1,v1,v1,v3)

Mode 5: Luminance-Alpha, Base+Offset

This mode takes as input four integers (v0, v1, v2, v3). From these integers, a base value (lb, ab)=(v0, v2) and an offset value (lo,ao)=(v1,v3) are formed; the bit_transfer_signed procedure is then performed to transfer one bit from lo to lb, and one bit from ao to ab; the two endpoints then form two RGBA colors as (r0,g0,b0,a0)=(lb,lb,lb,ab) and (r1,g1,b1,a1)=(lb–lo,lb+lo,lb+lo,ab+ao). The RGB values are clamped to the range 0x00.0xFF.

Mode 6: RGB and scale

This mode takes as input four integers (v0, v1, v2, v3). From these integers, two endpoint colors are formed:

Endpoint color 0 is given by (r0,g0,b0,a0)=((v0*v3)>>8, (v1*v3)>>8, (v2*v3)>>8, 0xFF)

Endpoint color 1 is given by (r1,g1,b1,a1)=(v0,v1,v2, 0xFF)

Mode 7: Two HDR RGB Endpoints, Base and Scale

This mode takes as input four integers (v0, v1, v2, v3). These are a complex packing allowing bits to be transferred from one color component to another. The integers are unpacked into two HDR RGBA endpoint colors e0 and e1 as follows:

```
void mode7_unpack_y( int v0, int v1, color &e0, color &e1 )
{
    int modeval = ((v0 & 0xC0) >> 6) | ((v1 & 0x80) >> 5) | ((v2 &
0x80) >> 4);
    int majcomp;
    int mode;
    if( (modeval & 0xC ) != 0xC )
        { majcomp = modeval >> 2; mode = modeval & 3; }
    else if( modeval != 0xF )
        { majcomp = modeval & 3; mode = 4; }
    else
        { majcomp = 0; mode = 5; }
    int red = v0 & 0x3f;
    int green = v1 & 0x1f;
    int blue = v2 & 0x1f;
    int scale = v3 & 0x1f;
    int x0 = (v1 >> 6) & 1; int x1 = (v1 >> 5) & 1;
    int x2 = (v2 >> 6) & 1; int x3 = (v2 >> 5) & 1;
    int x4 = (v3 >> 7) & 1; int x5 = (v3 >> 6) & 1; int x6 = (v3 >> 5) & 1;
    int ohm = 1 << mode;
    if( ohm & 0x30 ) green |= x0 << 6;
    if( ohm & 0x3A ) green |= x1 << 5;
    if( ohm & 0x30 ) blue |= x2 << 6;
    if( ohm & 0x3A ) blue |= x3 << 5;
    if( ohm & 0x3D ) scale |= x6 << 5;
    if( ohm & 0x2D ) scale |= x5 << 6;
    if( ohm & 0x04 ) scale |= x4 << 7;
    if( ohm & 0x3B ) red |= x4 << 6;
    if( ohm & 0x04 ) red |= x3 << 6;
    if( ohm & 0x10 ) red |= x5 << 7;
    if( ohm & 0x0F ) red |= x2 << 7;
    if( ohm & 0x05 ) red |= x1 << 8;
    if( ohm & 0x0A ) red |= x0 << 8;
    if( ohm & 0x05 ) red |= x0 << 9;
    if( ohm & 0x02 ) red |= x6 << 9;
    if( ohm & 0x01 ) red |= x3 << 10;
    if( ohm & 0x02 ) red |= x5 << 10;
    static const int shamts[6] = { 1,1,2,3,4,5 };
    int shamt = shamts[mode];
    red <<= shamt; green <<= shamt; blue <<= shamt; scale <<= shamt;
    if( mode != 5 ) { green = red - green; blue = red - blue; }
    if( majcomp == 1 ) swap( red, green );
    if( majcomp == 2 ) swap( red, blue );
    e1.r = clamp( red, 0, 0xFFF );
    e1.g = clamp( green, 0, 0xFFF );
    e1.b = clamp( blue, 0, 0xFFF );
    e1.alpha = 0x780;
    e0.r = clamp( red - scale, 0, 0xFFF );
    e0.g = clamp( green - scale, 0, 0xFFF );
    e0.b = clamp( blue - scale, 0, 0xFFF );
    e0.alpha = 0x780;
}
```

Mode 8: Two RGB Endpoints

This mode takes as input six integers (v0, v1, v2, v3, v4, v5). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,0xFF) and (r1,g1,b1,a1)=(v1, v3,v5,0xFF)

If s1<s0, then the two endpoint colors are obtained as (r0,g0,b0,a0)=(v1,v3,v5,0xFF) and (r1,g1,b1,a1)=(v0, v2,v4,0xFF); both of these two endpoint colors are then subjected to the blue contraction procedure.

Mode 9: RGB Base+Offset

This mode takes as input six integers (v0, v2, v2, v3, v4, v5). These integers form an RGB base (rb, gb, bb)=(v0, v2, v4) and an RGB offset (ro, go, bo)=(v1,v3,v5). The base and offset values are then modified by having the bit_transfer_signed procedure applied to them to move one bit from the offset to the base (that is, from ro to rb, from go to gb and from bo to bb).

The two endpoint colors are then given by (rb,gb,bb,0xFF) and (rb+ro, gb+go, bb+bo, 0xFF).

If the offset sum s=(ro+go+bo) is negative, then the two endpoint numbers are swapped and have the blue contraction procedure applied to them.). The RGB values are clamped to the range 0x00 . . . 0xFF.

Mode 10: RGB, Scale, and Two Alpha Endpoints

This mode takes as input six integers (v0, v1, v2, v3, v4, v5). First, use (v0,v1,v2,v3) to produce two endpoint colors just as in Mode 6. Then replace the alpha of the first endpoint color with v4 and the alpha of the second endpoint color with v5.

Mode 11: Two HDR RGB Endpoints

This mode takes as input six integers (v0, v1, v2, v3, v4, v5). These are a complex packing allowing bits to be transferred from one color component to another. The integers are unpacked into two HDR RGBA endpoint colors e0 and e1 as follows:

```
void mode11_unpack_rgb( int v0, int v1, int v2, int v3, int v4, int v5,
color &e0, color &e1)
    {
        int majcomp = ((v4 & 0x80) >> 7) | ((v5 & 0x80) >> 6);
    if( majcomp == 3 )
    {
        e0 = (v0 << 4, v2 << 4, (v4 & 0x7f) << 5, 0x780);
        e1 = (v1 << 4, v3 << 4, (v5 & 0x7f) << 5, 0x780);
        return;
    }
    int mode = ((v1 & 0x80) >> 7) | ((v2 & 0x80) >>
6) |
        ((v3 & 0x80) >> 5);
    int va = v0 | ((v1 & 0x40) << 2);
    int vb0 = v2 & 0x3f;
    int vb1 = v3 & 0x3f;
    int vc = v1 & 0x3f;
    int vd0 = v4 & 0x7f;
    int vd1 = v5 & 0x7f;
    static const int dbitstab[8] = {7,6,7,6,5,6,5,6};
    vd0 = signextend( vd0, dbitstab[mode] );
    vd1 = signextend( vd1, dbitstab[mode] );
    int x0 = (v2 >> 6) & 1;
    int x1 = (v3 >> 6) & 1;
    int x2 = (v4 >> 6) & 1;
    int x3 = (v5 >> 6) & 1;
    int x4 = (v4 >> 5) & 1;
    int x5 = (v5 >> 5) & 1;
    int ohm = 1 << mode;
    if( ohm & 0xA4 ) va |= x0 << 9;
    if( ohm & 0x08 ) va |= x2 << 9;
    if( ohm & 0x50 ) va |= x4 << 9;
    if( ohm & 0x50 ) va |= x5 << 10;
```

```
if( ohm & 0xA0 ) va |= x1 << 10;
if( ohm & 0xC0 ) va |= x2 << 11;
if( ohm & 0x04 ) vc |= x1 << 6;
if( ohm & 0xE8 ) vc |= x3 << 6;
if( ohm & 0x20 ) vc |= x2 << 7;
if( ohm & 0x5B ) vb0 |= x0 << 6;
if( ohm & 0x5B ) vb1 |= x1 << 6;
if( ohm & 0x12 ) vb0 |= x2 << 7;
if( ohm & 0x12 ) vb1 |= x3 << 7;
int shamt = (modeval >> 1) ^ 3;
va <<= shamt; vb0 <<= shamt; vb1 <<= shamt;
vc <<= shamt; vd0 <<= shamt; vd1 <<= shamt;
e1.r = clamp( va, 0, 0xFFF );
e1.g = clamp( va - vb0, 0, 0xFFF );
e1.b = clamp( va - vb1, 0, 0xFFF );
e1.alpha = 0x780;
e0.r = clamp( va - vc, 0, 0xFFF );
e0.g = clamp( va - vb0 - vc - vd0, 0, 0xFFF );
e0.b = clamp( va - vb1 - vc - vd1, 0, 0xFFF );
e0.alpha = 0x780;
if( majcomp == 1 )      { swap( e0.r, e0.g ); swap( e1.r, e1.g ); }
else if( majcomp == 2 ) { swap( e0.r, e0.b ); swap( e1.r, e1.b ); }
}
```

Unlike mode 7, this mode is able to represent the full HDR range.

Mode 12: Two RGBA Endpoints

This mode takes as input eight integers (v0, v1, v2, v3, v4, v5, v6, v7). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,v6) and (r1,g1,b1,a1)=(v1,v3,v5,v7)

If s1<s0, then the two endpoint colors are obtained as (r0,g0,b0,a0)=(v1,v3,v5,v7) and (r1,g1,b1,a1)=(v0,v2,v4,v6); both of these two endpoint colors are then subjected to the blue contraction procedure.

Mode 13: RGBA Base+Offset

This mode takes as input eight integers (v0, v1, v2, v3, v4, v5, v6, v7). These integers form an RGBA base (rb, gb, bb, ab)=(v0,v2,v4,v6) and an RGB offset (ro, go, bo, ao)=(v1,v3,v5,v7). The bit_transfer_signed procedure is then used to transfer a bit from the offset value to the base values. The two endpoint colors are then given by (rb,gb,bb,ab) and (rb+ro, gb+go, bb+bo, ab+ao). If (ro+go+bo) is negative, then the blue contraction procedure is applied to the RGB portion of each endpoint.

Mode 14: Two HDR RGBA Endpoints with LDR Alpha

This mode takes as input eight integers (v0, v1, v2, v3, v4, v5, v6, v7). The RGB components are decoded from values (v0 . . . v5) in the manner of Mode 11 discussed above. The alpha components for endpoints 0 and 1 are then filled in from values v6 and v7 respectively.

Mode 15: Two HDR RGBA Endpoints with HDR Alpha

This mode takes as input eight integers (v0, v1, v2, v3, v4, v5, v6, v7). The RGB components are decoded from values (v0 . . . v5) in the manner of Mode 11 discussed above. The alpha components are then decoded as follows from values v6 and v7 as follows:

```
void mode15_unpack_alpha(int v6, int v6, int& alpha0, int& alpha1)
{
    mode = ((v6 >> 7) & 1) | ((v7 >> 6) & 2);
    v6 &= 0x7F;
    v7 &= 0x7F;
    if(mode==3)
    {
        alpha0 = v6 << 5;
        alpha1 = v7 << 5;
    }
    else
    {
        v6 |= (v7 << (mode+1))) & 0x780;
        v7 &= (0x3F >> mode);
        v7 ^= 0x20 >> mode;
        v7 -= 0x20 >> mode;
        v6 <<= (4-mode);
        v7 <<= (4-mode);
        v7 += v6;
        v7 = clamp(v7, 0, 0xFFF);
        alpha0 = v6;
        alpha1 = v7;
    }
}
```

The Void-Extent Block

A Void-Extent block is an encoded texture data block that specifies a region within the texture in which every texture data element should be allocated the same data value when decoded and in which every sample look-up within the encoded texture will only use texture data elements having that same data value (in the present embodiment). If bits[8:0] of the compressed (encoded) block are "111111100", then the compressed block is a Void-Extent Block. This means that the block has a constant color that is common for all texels in the block, and the block additionally specifies a region within the texture (for a 2D block) in which every bilinear-sampled lookup within the texture will only touch texels whose color is identical to this constant color.

The Void-Extent feature is intended to enable specific texturing optimizations:

If a texture mapper uses a multipass method for trilinear filtering or anisotropic mapping, it may use the information in the Void-Extent block to ascertain that all its passes will only ever access texels of the same value, and thus return that value as the final texturing result immediately after the first pass without running any further passes.

A texture mapper may additionally keep a cache of recently-seen Void-Extent blocks and use them to suppress actual texture-cache line fills from memory for subsequent texturing operations.

Using the Void-Extent information is not mandatory; a texture mapper that does not implement these optimizations may ignore the Void-Extent and just treat the block as a constant-color block.

The following rules and observations apply:

If the Void-Extent coordinates are all 1s, then it is interpreted as if the block has no Void-Extent at all and is simply a constant-color block.

Encoders that cannot compute Void-Extents properly but still wish to use constant-color blocks thus always have the option to just specify an all-1s pattern for the Void-Extent in order to produce a straight constant-color block.

If a Void-Extent appears in a mipmap other than the most detailed (lowest) one, then the Void-Extent applies to all more detailed (lower) mipmap levels as well. As such, a texture mapper that implements mipmapping as a multipass method may sample the least detailed (highest) mipmap first, then upon encountering a Void-Extent, it may abstain from sampling the more detailed (lower) mipmap.

A consequence of this rule is that if a block has a constant color but the corresponding region in any of the more detailed (lower) mipmaps do not have a constant color, then the Void-Extent coordinates must be set to all 0s to signal the absence of a Void-Extent block. This situation is always the case for the top 1×1 level of any mipmap pyramid, and may be the case for more detailed (lower) levels as well, in case of e.g. checkerboard textures.

The constant-color itself is specified using IEEE-754-2008 compliant FP16 values; this is the way in the format of the present embodiment to specify floating-point content that can hold negative values.

If a Void-Extent extends all the way to the edge of a texture, the filtered texturing result may not necessarily be equal to the texel value specified in the Void-Extent block; this may happen if data sources other than the texture surface itself contributes to the final filtered result. In such cases, the texture mapper must include such data into its filtering process in the same manner as if the Void-Extent were not present. Examples of such data sources are:

Texture border color, when the border color is different from the color specified in the Void-Extent block.

Adjacent-face textures in case of Seamless Cube-Mapping

Neighboring texture repeat in the case of the "Repeat" texture wrap mode

If the texture mapper is keeping a cache of recently-seen Void-Extent blocks, it must guarantee that the presence of this cache does not produce texture filtering results that are different from the result it would have produced without the cache; depending on the specifics of the filtering unit, this may limit caching to Void-Extent blocks with very specific color values (e.g. all components are 0 or 1).

The Void-Extent specified by a Void-Extent block does not need to actually overlap the block itself; such non-overlap is unlikely to be useful, though.

Invalid Void-Extents—that is, a Void-Extent specified across a region of a texture that does not actually have a constant color—will result in undefined texturing results.

2D Textures

For 2D textures, the Void-Extent Block has the following layout:

| Bits | Usage |
| --- | --- |
| 8:0 | "111111100" |
| 9 | Dynamic range flag |
| 11:10 | Reserved, set to "11". |
| 24:12 | Void Extent: Low S coordinate |
| 37:25 | Void Extent: High S coordinate |
| 50:38 | Void Extent: Low T coordinate |
| 63:51 | Void Extent: High T coordinate |
| 79:64 | Block color R component |
| 95:80 | Block color G component |
| 111:96 | Block color B component |
| 127:112 | Block color A component |

The Void Extent is defined by a (low,high) interval for the S and T texture coordinates. The interval endpoints are represented as UNORM13 values; as such, to get normalized coordinates in the [0,1] range, the values stored in the block must be divided by $2^{13}-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

3D Textures

For 3D textures, the Void-Extent Block has the following layout:

| Bits | Usage |
| --- | --- |
| 8:0 | "111111100" |
| 9 | Dynamic range flag |
| 18:10 | Void Extent: Low S coordinate |
| 27:19 | Void Extent: High S coordinate |
| 36:28 | Void Extent: Low T coordinate |
| 45:37 | Void Extent: High T coordinate |
| 54:46 | Void Extent: Low P coordinate |
| 63:55 | Void Extent: High P coordinate |
| 79:64 | Block color R component |
| 95:80 | Block color G component |
| 111:96 | Block color B component |
| 127:112 | Block color A component |

The Void-Extent is defined by a (low,high) interval for the S, T and P texture coordinates. The interval endpoints are represented as UNORM9 values; as such, to get normalized coordinates in the [0,1] range, the values stored in the block must be divided by $2^9-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

Partitioning Pattern Generator

As discussed above, the encoding scheme of the present embodiment uses a partitioning pattern generator (a partitioning pattern generation function) in order to produce its partitioning patterns; this allows a large number of partitioning patterns to be supported at minimal hardware cost. (This comes at a slight quality cost compared to using optimized partition tables, however this cost has been measured to be only about 0.2 dB, which does not justify the large hardware cost of providing a full set of optimized tables.)

The generator itself is specified in the form of a C99 function. The arguments to this function are:

a seed: this is the partition index specified at bits 17:8 in the 128-bit compressed block. This seed may take values from 0 to 1023.

a partition count; this may be 2, 3 or 4.

x, y and z positions; these are x, y and z texel position relative to the upper-left corner of the compressed block (for a 2D block, z is set to zero (0)).

a flag indicating small blocks; its value depends on the block size being used. The value of this flag is chosen to be 1 if the number of texels in the block is less than 31, otherwise it is set to 0.

The function returns an integer value in the range 0.3 specifying which partition the specified texel belongs to. The actual function is defined as follows:

```
int select_partition( int seed, int x, int y, int z, int partitioncount, int small_block )
{
// first, scale up coordinates for small blocks.
if(small_block) { x <<= 1; y <<= 1; z <<= 1; }
```

```
// then, compute eight pseudoranom numbers, all of uniform distribution.
// They need to be at least approximately statistically independent,
// so that they can cover a reasonably wide parameter space.
// the random-seed is modified with the partition-count, so that the
// partitionings we generate for 2, 3 and 4 partitions are distinct.
seed += (partitioncount−1) * 1024;
// we need reproducibility of the pseudorandom numbers, which calls for
// a hash function. The hash52( ) function is designed specifically to provide
// a strong pseudorandom distribution at a modest hardware cost.
uint32_t rnum = hash52(seed);
// construct the seed values from the hash value. While it is important that
// the seeds are independent, it is not important that they have great precision;
// in fact, no error improvement was seen when using seeds wider than 4 bits.
int seed1 = rnum & 0xF;
int seed2 = (rnum >> 4) & 0xF;
int seed3 = (rnum >> 8) & 0xF;
int seed4 = (rnum >> 12) & 0xF;
int seed5 = (rnum >> 16) & 0xF;
int seed6 = (rnum >> 20) & 0xF;
int seed7 = (rnum >> 24) & 0xF;
int seed8 = (rnum >> 28) & 0xF;
int seed9 = (rnum >> 18) & 0xF;
int seed10 = (rnum >> 22) & 0xF;
int seed11 = (rnum >> 26) & 0xF;
int seed12 = ((rnum >> 30) | (rnum << 2)) & 0xF;
// square the seeds. This biases them, so that they are more likely to
// take small rather than large values. The seed values represent
// frequencies for a 2D sawtooth function; squaring them causes
// low frequencies to be more heavily represented than high freqeuncies.
// For the partition function, this causes partitionings with low frequencies
// (large, cleanly-divided regions) to appear more frequently than
// partitionings with high frequencies (lots of detail), while not entirely
// blocking the latter.
seed1 *= seed1;
seed2 *= seed2;
seed3 *= seed3;
seed4 *= seed4;
seed5 *= seed5;
seed6 *= seed6;
seed7 *= seed7;
seed8 *= seed8;
seed9 *= seed9;
seed10 *= seed10;
seed11 *= seed11;
seed12 *= seed12;
// perform shifting of the seed values
// this causes the sawtooth functions to get increased high-frequency content along either
// the X axis or the Y axis or neither; the result is an increase in the amount of
// partitionings that are dominated by horizontal/vertical stripes; these are
// relatively important for overall psnr.
int sh1, sh2, sh3;
// use the bottom bit of the seed to toggle horiz/vert direction.
if( seed & 1 )
  {
    sh1 = (seed & 2 ? 4 : 5);
    sh2 = (partitioncount == 3 ? 6 : 5);
  }
else
  {
    sh1 = (partitioncount == 3 ? 6 : 5);
    sh2 = (seed & 2 ? 4 : 5);
  }
  sh3 = (seed & 0x10) ? sh1 : sh2;
seed1 >>= sh1;
seed2 >>= sh2;
seed3 >>= sh1;
seed4 >>= sh2;
seed5 >>= sh1;
seed6 >>= sh2;
seed7 >>= sh1;
seed8 >>= sh2;
seed9 >>= sh3;
seed10 >>= sh3;
seed11 >>= sh3;
seed12 >>= sh3;
// combine the seed values with the XYZ coordinates to produce 3D planar functions
// Each of them also has an offset added; this offset itself needs to be pseudorandom
// and unbiased for optimal quality. Unlike the seeds themselves, this offset
```

```
    // needs to have a uniform distribution.
    int a = seed1*x + seed2*y + seed11*z + (rnum >> 14);
    int b = seed3*x + seed4*y + seed12*z + (rnum >> 10);
    int c = seed5*x + seed6*y + seed9*z + (rnum >> 6);
    int d = seed7*x + seed8*y + seed10*z + (rnum >> 2);
    // bitwise "AND" with a mask turns planar functions into sawtooth functions.
    a &= 0x3F;
    b &= 0x3F;
    c &= 0x3F;
    d &= 0x3F;
    // remove some of the functions if we are using less than 4 partitions.
    if( partitioncount < 4 ) d = 0;
    if( partitioncount < 3 ) c = 0;
    // then, compare the resulting sawtooth-function values in order to select
    // a partition.
    if( a >= b && a >= c && a >= d )
        return 0;
    else if( b >= c && b >= d )
        return 1;
    else if( c >= d )
        return 2;
    else
        return 3;
    }
```

The generator relies on an auxiliary function called hash52( ); this function itself is defined as follows:

```
    // autogenerated hash function. This hash function was produced by generating
    // random instruction sequences (from the set: add-shift, xor-shift, multiply-by-odd-constant;
    // these operations have in common that they are all invertible and therefore cannot lose data)
    // and then checking whether the instruction sequence, when fed the input data sequence
    // 0,1,2,3, ... produces a good pseudorandom output data sequence. The randomness tests run
    // were George Marsaglia's "Some Difficult-to-pass Tests Of Randomness".
    // Several hundred sunch instruction sequences were generated; "hash52" below was the
    // one that appeared to have the most compact hardware representation.
    // the multiply-by-odd-constant steps had their constants specifically selected so that they
    // could be implemented with three shift-add operations, which are much cheaper in hardware
    // than general multiplications.
    uint32_t hash52( uint32_t p )
    {
        p ^= p >> 15;
        p *= 0xEEDE0891; // (2^4+1)*(2^7+1)*(2^17-1)
        p ^= p >> 5;
        p += p << 16;
        p ^= p >> 7;
        p ^= p >> 3;
        p ^= p << 6;
        p ^= p >> 17;
        return p;
    }
```

Note that the arithmetic in hash52( ) must be implemented using unsigned integers that are exactly 32 bits wide. Also note that the multiply may be implemented as a series of three addition/subtraction operations.

The above partition generation function basically works by implementing 2 to 4 sawtooth functions with pseudorandomly-selected directions and frequencies; this is particularly cheap to implement in hardware while being able to produce nearly all partition shapes of interest.

The seed (partition index) is used to generate the parameters for the sawtooth wave generation. As each different seed gives a different combination of waves, it can be thought of as a "pattern index". (The seed is accordingly, effectively equivalent to the index into the pattern table in a lookup-table based design.)

A mask is used to generate the sawtooth function. It effectively changes a continuously increasing set of values (e.g. 0, 16, 32, 48, 64, 80, 96, 112, 128, 144, 160 . . . ) into a repeating set. A mask of 0x3F applied to the previous sequence would give a sawtooth of (0, 16, 32, 48, 0, 16, 32, 48, 0, 16, 32, 48, 0, 16, 32 . . . ). This is equivalent to the remainder when dividing by 64, but only works when the divisor is a power of two. It is also very much cheaper to implement in hardware than a division circuit.

Other arrangements for determining the partitioning patterns could be used, if desired. For example, the function could be configured to generate curved partitioning shapes. For example, $x^2$ and $y^2$ terms could be added into the sawtooth functions. This will yield partitionings with curved shapes (which the "basic" version of the sawtooth function is unable to provide). However, testing with actual content did not actually show any image quality improvement from these shapes. This kind of curve support will also increase the hardware cost.

The partitioning pattern generation function is in an embodiment implemented as a dedicated hardware element in the decoder.

Figure 12:
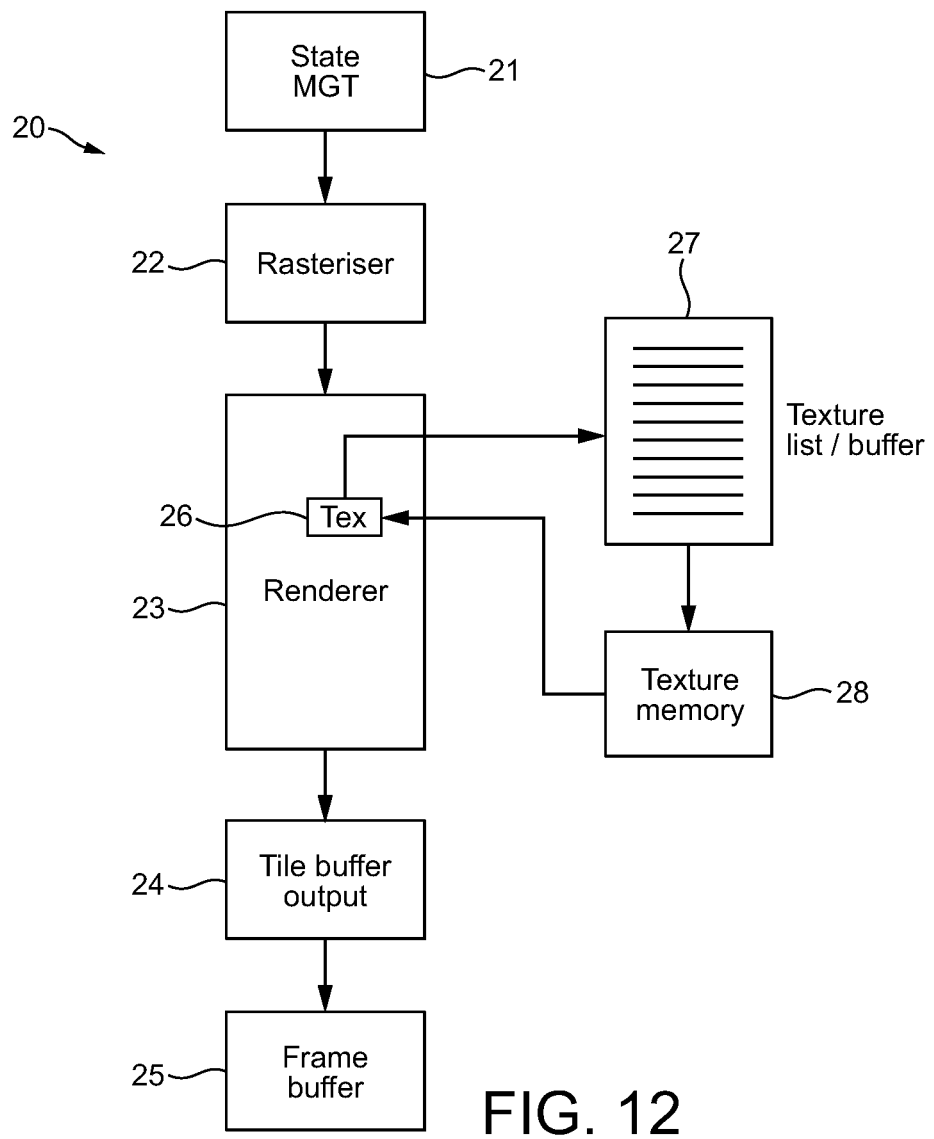
FIG. 12 shows schematically a graphics processing system that can use texture data that has been encoded in the manner of the described embodiment of the technology described herein.

FIG. 12 shows schematically an arrangement of a graphics processing system 20 that can use textures that have been encoded in accordance with the present embodiment. In this embodiment, the graphics processing system 20 is a tile-based rendering system. However, other arrangements are, of course, possible.

As shown in FIG. 12, the graphics processing system 20 includes a state management system 21, a rasterising stage 22, and a rendering stage 23 in the form of a rendering pipeline. It will be appreciated that each of the stages, elements, and units, etc., of the graphics processor 20 as shown in FIG. 12 may be implemented as desired and will accordingly comprise, e.g., appropriate circuitry, and/or processing logic, etc., for performing the necessary operation and functions.

The state management system 21 stores and controls state data and the state of the graphics processing units to control the graphics processing operation, as is known in the art.

The rasteriser 22 takes as its input primitives to be displayed, and rasterises those primitives to sampling positions and generates fragments to be rendered, as is known in the art.

The rendering pipeline 23 takes fragments from the rasteriser 22 and renders those fragments for display. As is known in the art, the rendering pipeline 23 will include a number of different processing units, such as fragment shaders, blenders, texture mappers, etc.

The output from the rendering pipeline 23 (the rendered fragments) is output to tile buffers 24 (since the present embodiment is a tile-based system). The tile buffers' outputs are then finally output to a frame buffer 25 for display.

FIG. 12 also shows schematically particular features of the graphics processing system 20 that are provided in order for it to use textures encoded in the manner of the present embodiment.

In particular, as shown in FIG. 12, the rendering pipeline 23 includes a texture mapping stage 26 configured to be able to access a texture list buffer 27 to determine a texture needed for texturing a fragment that it receives for rendering.

The texture list buffer 27 will indicate the texture that is required, and then, as is known in the art, the texture mapper 26 will fetch the relevant texture data from a memory 28 and used the fetched texture data to process the fragment in question.

The textures stored in the texture memory 28 are stored using the encoding format of the present embodiment. Thus, when the texture mapper 26 needs a given texel or texels for applying to a fragment being rendered, it will determine the texture map and encoded block within that map that it needs for the texel in question (e.g. based on the position of the texel, as is known in the art), retrieve that block from the memory 28 and then determine the texel's value (e.g. colours) from the encoded block in the manner described above.

The texture mapper 26 includes a suitable decoder (decoding circuitry) to do this. This decoder may, e.g., be in the form of a dedicated hardware element that is configured to decode textures encoded in the form of the present embodiment, or it may, e.g., comprise programmable processing circuitry that has been programmed appropriately to be able to decode textures encoded in the form of the present embodiment. In an embodiment a dedicated hardware decoder is used. This decoder will, inter alia, implement the partitioning pattern generation function of the present embodiment.

In the present embodiment, the decoding process comprises first determining whether the position of a texture data element to be decoded is within a previously encountered and stored constant data value region (void extent). If it is, the stored corresponding constant data value for the constant data value region (void extent) in question is then returned as the data value to use for the texture data element immediately (i.e. without accessing and decoding any encoded texture data block).

On the other hand, if the position of a texture data element to be decoded is not within a previously encountered and stored constant data value region (void extent), then it is determined which encoded texture data block in the set of encoded texture data blocks representing the texture map to be decoded represents (contains) the texel whose value is required (i.e. that is to be decoded). This is done based on the position of the texel and knowledge of the block size and size of the texture. The identified encoded texture data block is then accessed (e.g. fetched) from memory.

It is then determined whether the encoded block is a Void Extent block (i.e. indicates a constant data value region) or not, by determining whether the block contains the void extent flag (and also that the block is not simply a "constant colour" block).

If the block is a Void Extent block, the decoder determines the constant data value indicated in the Void Extent block and uses that value as the data value for the texel in question.

The decoder also determines from the encoded Void Extent block the extent of the constant data value region specified by the block, and stores that information together with the constant data value for the region (void extent) in question for future use. This information is stored for the most recent Void Extent blocks that the decoder has accessed, on a first-in, first out basis. Other arrangements would, of course, be possible.

The decoding process in an embodiment also comprises, where the encoded texture data block to be decoded is indicated (flagged) as being a Void Extent block, then determining from the information in the block indicating the extent of the constant data value region whether the block is a true "Void Extent" block, or whether it is in fact only a "constant colour" block. In the latter case, in an embodiment it is also determined whether the constant data value applies to more detailed mipmaps or not. If the block is a "constant colour" block, the decoder determines the constant data value indicated in the block and uses that value as the data value for the texel in question.

Where the encoded texture data block is not a Void Extent or a "constant colour" block (i.e. is a "normal" block), the decoder determines the value for the texel from the encoded block of texture data as follows:

1. Find the x,y,z position of the texel to be decoded, relative to the corner of the block (for 2D blocks, z=0).
2. If there is more than one partition, pass the x,y,z position and the seed (partition index) through the partition generation function to determine the partition number for the texel.
3. Read and decode the endpoint values for the partition selected in step 2. This process depends on the colour endpoint mode.
4. Read and decode the index for the texel. Where to find the index data, and how to decode it, is determined by the index range, index count, and number of index planes.
5. Interpolate between the endpoint colors using the index value, as specified above.

6. If there are two index planes, repeat steps 4-5 for the second index, and combine the color components from the separate planes (e.g. RGB from one, A from another into a single RGBA value).

7. The final color is the decoded texel color.

Thus, in the present embodiment, the decoding process for a given texel whose value is required will comprise the following steps:

Determine the position of the texel being looked up
If it is inside a cached void-extent
    return the constant colour value for that extent immediately
else
    calculate which block the texel is in
    load the block
    if the block is a constant-colour block
        return the constant colour value
        if it's a void extent block
            cache the void extend bounds and the colour
    if it's not a constant-colour block
        decode as normal This is repeated for each texel value that is required, and the so-generated, decoded texel values are then applied to sampling positions (fragments) that are being rendered to generate rendered data for those sampling positions (fragments), which rendered data is then, e.g., written to the frame buffer for a display to display the "textured" sampling positions and/or fragments.

As discussed above, the decoder (the texture mapping process) is also configured, in response to recognition of a "constant data value" region indicating Void Extent block to: not perform (avoid) subsequent passes in a multi-pass texture mapping process once such a block has been identified; not sample (avoid sampling) more detailed mipmaps in a multi-pass mip-mapping process once such a constant data value region indicating block has been identified; cache recently loaded/processed constant data value region indicating (Void Extent) blocks and use them to suppress (texture) cache filling from memory for subsequent decoding (texturing) operations; and/or not load (avoid loading) adjacent encoded texture data blocks, where a constant data value region indicating (Void Extent) block has been recognised.

As will be appreciated from the above, in the decoding arrangements, the actual data values (e.g. in terms of their format and what they represent) that are generated for the set of data values to be used for a texture data block and for the individual texture data elements will depend on the nature of the texture data that is being encoded. Thus, for example, as discussed above, in the case of colour data and colour maps, each data value will represent a given colour, and, e.g., comprise a set of colour values, such as RGB or RGBA values. On the other hand, for a luminance map, each data value may comprise and represent a single luminance value. For normal-maps (bump maps), each data value will comprise a set of components representing a normal vector, and for shadow maps (light maps), each data value will comprise and represent a set of values indicating, e.g., the presence or absence, and amount of, light or shadow, and so on.

The above describes the decoding process used for the encoding scheme used in an embodiment of the technology described herein. As will be appreciated by those skilled in the art, the encoding process will be carried out in a corresponding converse manner.

Thus, to encode a given texture map using the above encoding format in the present embodiment, the original texture map is first divided into blocks of a selected size.

Each block of texture data elements is then tested to see whether the set of texture data elements of the block can be encoded as having the same, constant data value. This is done by determining whether all the texture data elements of the block have sufficiently similar data values to be encoded as a constant data value block (based, e.g., and in an embodiment, on some selected, in an embodiment predetermined, similarity margin or threshold)

Where it is determined that the texture data elements of a block of texture data elements to be encoded all have sufficiently similar data values, then the extent of a contiguous extended region within the texture including the block in which every texture data element has sufficiently similar data values is determined. This is done by attempting to extend a rectangular (for 2D) or rectangular cuboid (for 3D) region outwards from the edge of the block of texture data elements in question (while still only including texture data elements having sufficiently similar data (e.g. colour) values). Any suitable process, e.g. algorithm, can be used for this.

It should be noted here that the constant data value region does not need to align with the boundaries of the blocks the original texture has been divided into for encoding purposes, but can only partially cover or overlap blocks that the original texture has been divided into.

If an extended "constant data value" region is found, then the block of texture data elements in question is encoded as a Void Extent block, having the form discussed above.

The constant data value for an encoded Void Extent block may be selected as desired, based on the value of the texture data elements in the original texture in the region of the texture in question. For example, an average of the values of the texture data elements of the block (or void extent region) could be used as the constant data value for the encoded Void Extent texture data block. Other arrangements would, of course, be possible.

It should be noted here that where a given block of texture data elements is found to fall within a constant data value region in the texture (and is encoded as such), that does not mean that other, e.g. adjacent, blocks of texture data elements that also fall within the same constant data value region do not need to be encoded. Rather, every separate block of texture data elements that falls within the same constant data value region (void extent) is still encoded as a respective separate encoded Void Extent texture data block specifying that region. This facilitates random access into the encoded texture.

The encoding process may also comprise identifying blocks of texture data elements as being constant data value blocks but which do not also specify a greater constant data value region (as discussed above), if desired. These blocks of texture data elements should then be encoded as "constant colour" blocks having the form discussed above.

Where it is determined that the set of texture data elements of a block of texture data elements don't all have sufficiently similar data values, then a "non-void extent" encoded texture data block representing the block of texture data elements having the form discussed above is generated.

The encoding process for a "non-constant data value" block can be carried out in any suitable manner on or using the original texture data that is to be encoded. For example, as in known prior art processes, the original data for the block could be encoded using some or all of the various different encoding and partitioning possibilities that are available (i.e. that, in effect, a "non-constant data value" encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block when it is encoded).

For each possible encoding arrangement being considered for a block, the pair or pairs of endpoint colours to be used for the block should be determined in the manner of the present embodiment.

This is done for each different block that the original data (e.g. texture map) has been divided into. The process may then be repeated using a different block size, and so on, if desired, until the block size and encoding arrangements giving the least error (or at least a sufficiently small error) is found, which may then be selected as the encoding arrangement to use for the texture.

The original texture may then be encoded using the determined block size and the encoding arrangement determined for each block (or the already encoded blocks from the testing used, if they have been retained), to produce a stream or set of encoded texture data blocks representing, and corresponding to, the original set of data (e.g. texture map). This set of encoded texture data blocks can then be stored, e.g. on a portable storage device such as a DVD, for later use, e.g. when it is desired to apply the texture to an image to be rendered.

In an embodiment a set of mipmaps is generated to represent the texture, with each mipmap in an embodiment being generated in the above manner. Where mipmaps are used, the compression rate (and bit rate) is in an embodiment varied for (is different for) different mipmap levels, with higher bit rates (i.e. lower levels of data compression) being used for smaller mipmap levels (i.e. lower resolution mipmap levels).

Each block that the original data (e.g. texture map) is divided into is in an embodiment the same size and configuration. The block size that is being used is provided to the decoder. This may be done, for example, by including (indicating) the block size in a (global) data header that is associated with (attached to) the set of encoded texture data blocks, or in any other suitable manner.

The selection algorithm can use any desired (and many different) testing schemes such as, for example, measuring the peak signal-to-noise ratio between the encoded version of a block and the original version of the block.

The encoding can be carried out as desired, e.g. using a suitably programmed general-purpose processor that, e.g., has access to the original texture data in memory, or a suitable dedicated processor could be used.

Although the above embodiment has been described with reference to texture data in the form of colours, as discussed above, and as will be appreciated by those skilled in the art, the technology described herein is also applicable to other forms of texture data, such as luminance-maps or bump-maps, etc., and to other, non-texture data. In such arrangements the data can be encoded or decoded in an advantageous manner, but each data value will, e.g., represent a luminance value or normal vector, etc., rather than a colour.

Similarly, although the present embodiment has been described primarily with reference to the encoding of square or cubical blocks of texels, other texel block arrangements and configurations, such as the encoding of non-square rectangular blocks of texels and non-cubical rectangular cuboid blocks of texels would be possible, if desired.

FIGS. 3 to 11 illustrate the basic encoded block layouts that the encoding format of the present embodiment will produce. Each encoded block comprises, as discussed above, 128-bits.

Figure 3:
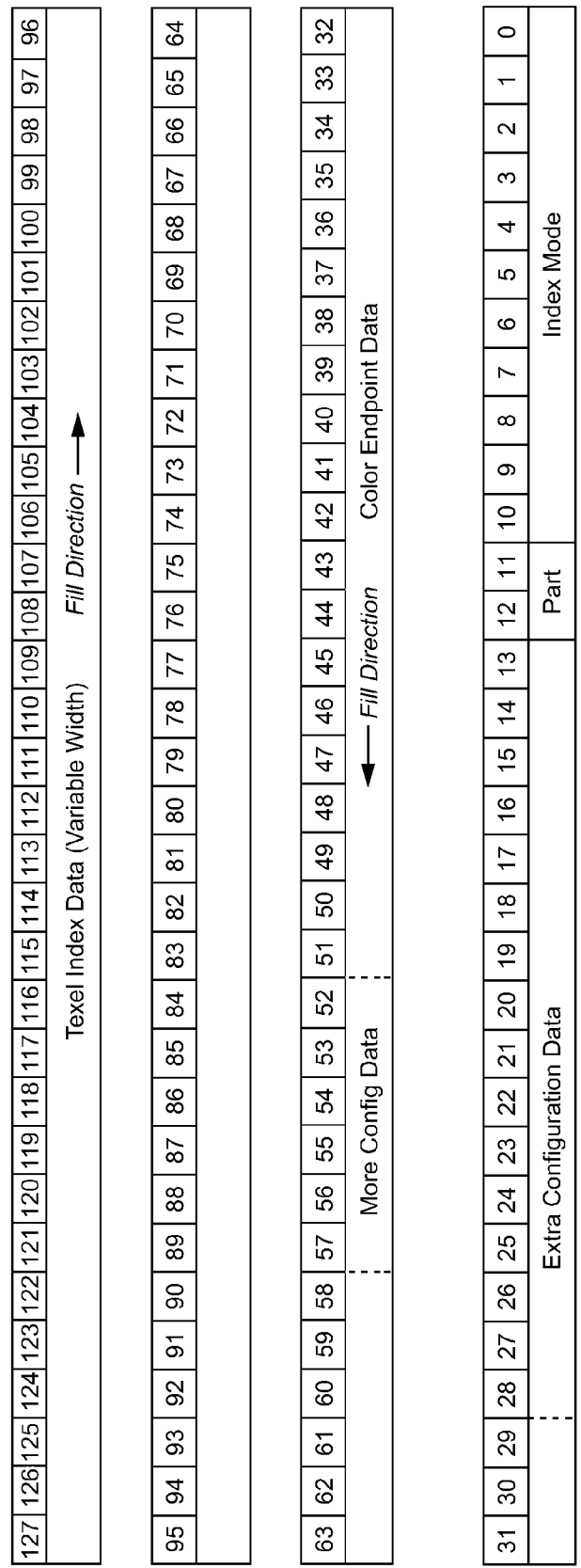

FIG. 3 shows an overview of the basic block layout. Thus it shows the index mode data in bits 0-10, the "partition count−1" data in bits 11-12, and the filling of the remaining space with any necessary extra configuration data, and the respective endpoint colour data and texel index data (which are both of variable width).

Figure 4:
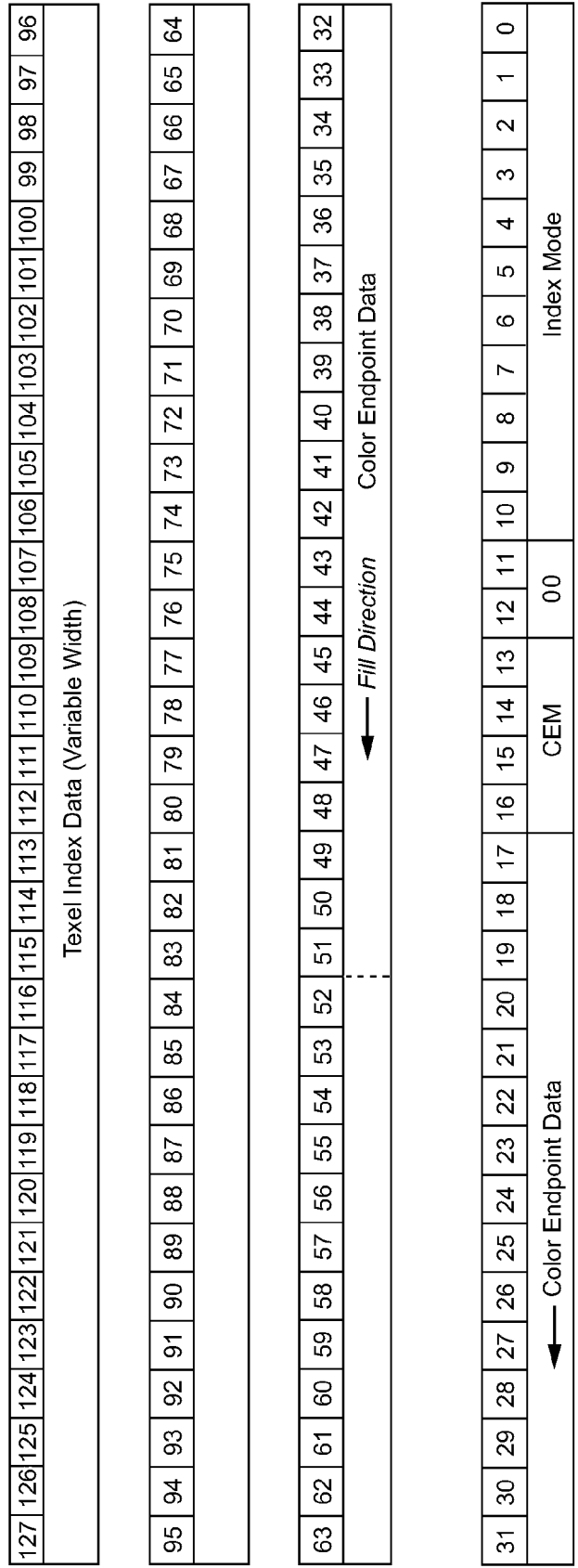

FIG. 4 shows the layout for a non-partitioned block. Thus in this case, the "partition-count-1" data in bits 11-12 is set to "00" and the colour endpoint mode data (shown as CEM in FIG. 4) is placed in bits 13-16.

Figure 5:
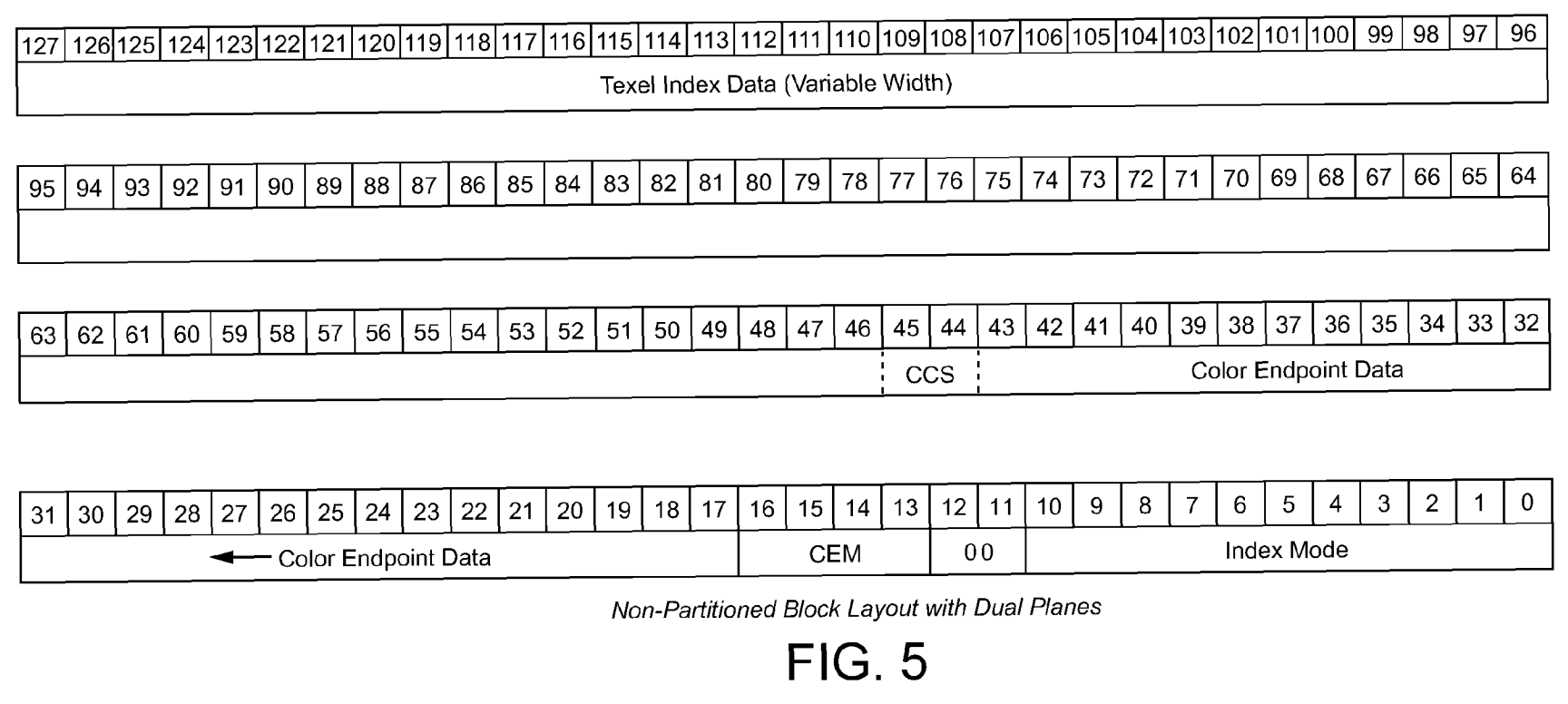

FIG. 5 shows the layout for a non-partitioned block but which uses two index planes. In this case, as shown in FIG. 5, two bits are used to act as the colour component selector (CCS) for the second index plane. These bits appear immediately below the texel index data (which is variable width, as discussed above).

Figure 6:
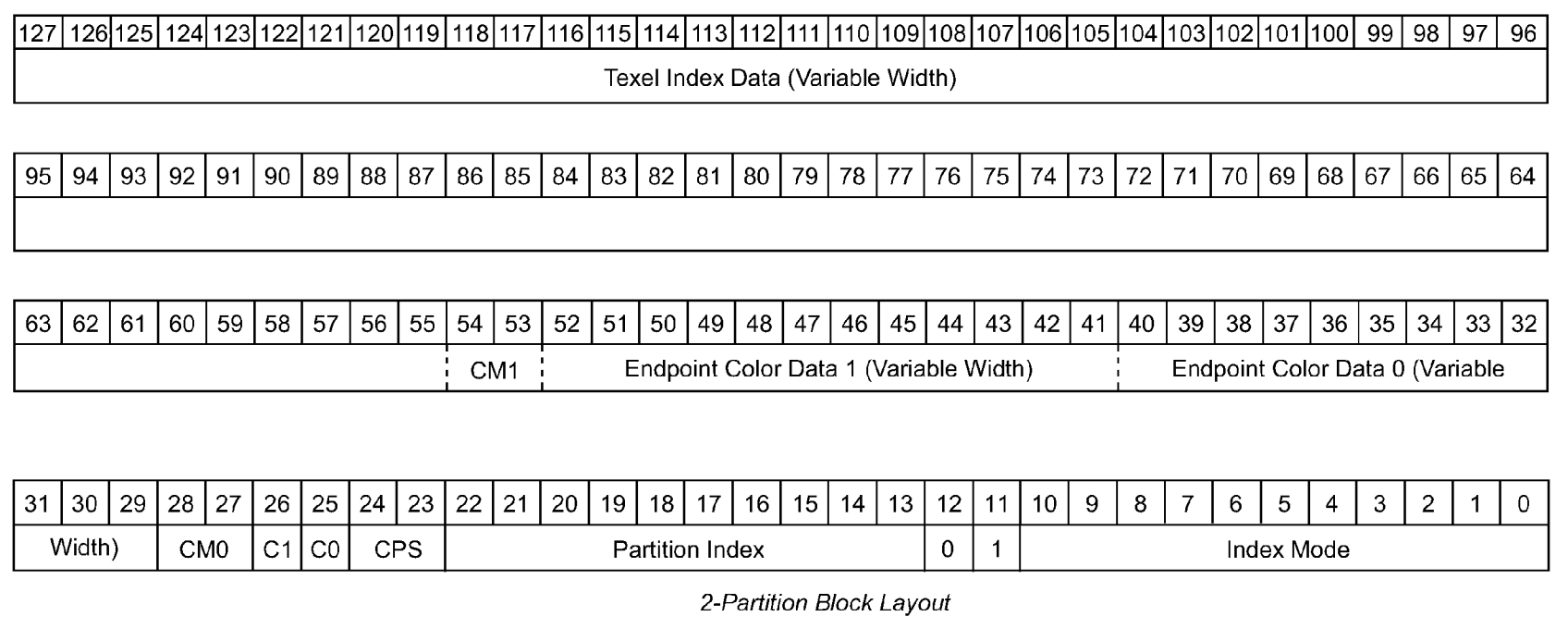

FIG. 6 shows the layout for a block encoding a block of texels (texture data elements) that has been divided into two partitions. In this case, the encoded block includes, as shown in FIG. 6, the "partition count−1" "01" (as there are two partitions) in bits 11-12, and the partition index (seed) for the partitioning pattern generation function in bits 13-22.

The encoded block also includes, as shown in FIG. 6, the colour endpoint mode pair selector (CPS) value in bits 23-24, and colour endpoint mode indicators (information) for each of the two partitions. The colour endpoint mode information comprises a respective colour endpoint class bit Cn and 2-bit colour endpoint mode field CMn for each partition n, and is arranged such that all the colour class bits for all the partitions are emitted first (in partition order), followed by the colour mode fields for each partition (in order). If this all requires more than 6 bits, then the additional bits are stored just below the texel index bits (which will be a variable position, as discussed above). It can be more efficient for a hardware decoder for the colour class bits to be at fixed positions in the encoded block.

Thus, as shown in FIG. 6, in the case of a two partition block, the colour endpoint mode pair selector (CPS) value is placed in bits 23-24, the respective colour class bits, C0, C1, for each partition (the first partition, partition 0, and the second partition, partition 1, respectively) are first placed in bits 25-26 (i.e. after the colour endpoint mode pair selector bits), and the 2-bit colour endpoint mode fields then follow (in partition order), up to the limit of 6-bits, with any remaining bits then being placed just below the texel index data. Thus, the colour endpoint mode indicator for the first partition (partition 0) is placed in bits 27-28 (CM0), and the colour endpoint mode for the second partition (partition 1) is placed in bits 53-54 (CM1). As shown, the additional bits required for the colour endpoint mode for the second partition (CM1) appear immediately below the texel index data. The block also includes appropriate sets of colour endpoint data for the two different partitions (endpoint colour data 0 and endpoint colour data 1, respectively).

Figure 7:
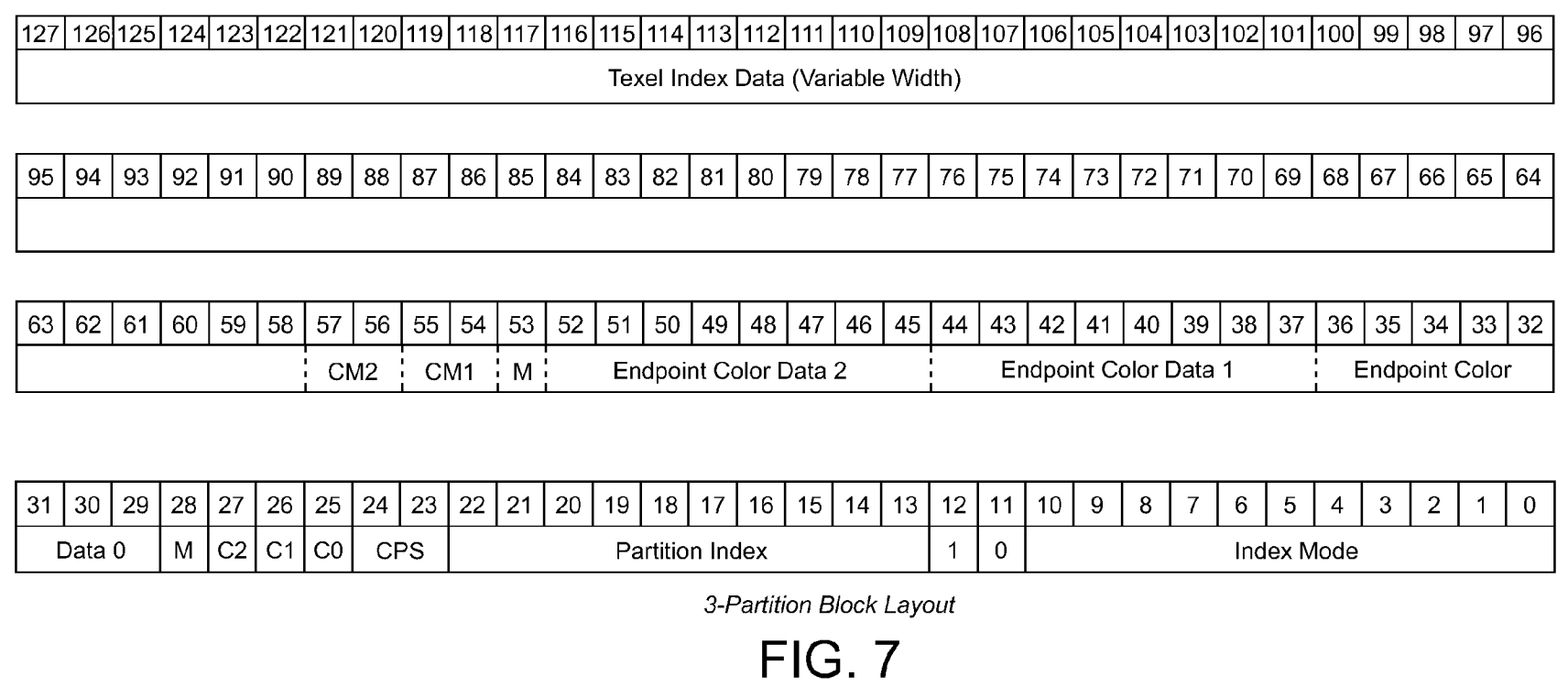

FIG. 7 shows the layout for a block that encodes a block of texture data elements that has been divided into three partitions. In this case, as shown in FIG. 7, there are three sets of colour endpoint class and mode data (C0, C1, C2, M (CM0), CM1 and CM2), one for each partition, arranged as discussed above in relation to FIG. 6, together with corresponding sets of endpoint colour data (endpoint colour data 0, endpoint colour data 1 and endpoint colour data 2), one for each partition. In this case the two bits of CM0 (denoted by "M" in FIG. 7) are, as shown in FIG. 7, split between bit 28 and a variable position immediately below CM1. Also, as shown in FIG. 7, the "partition count−1" bits 11-12 are set accordingly to "10" to indicate that this is a three-partition block.

Figure 8:
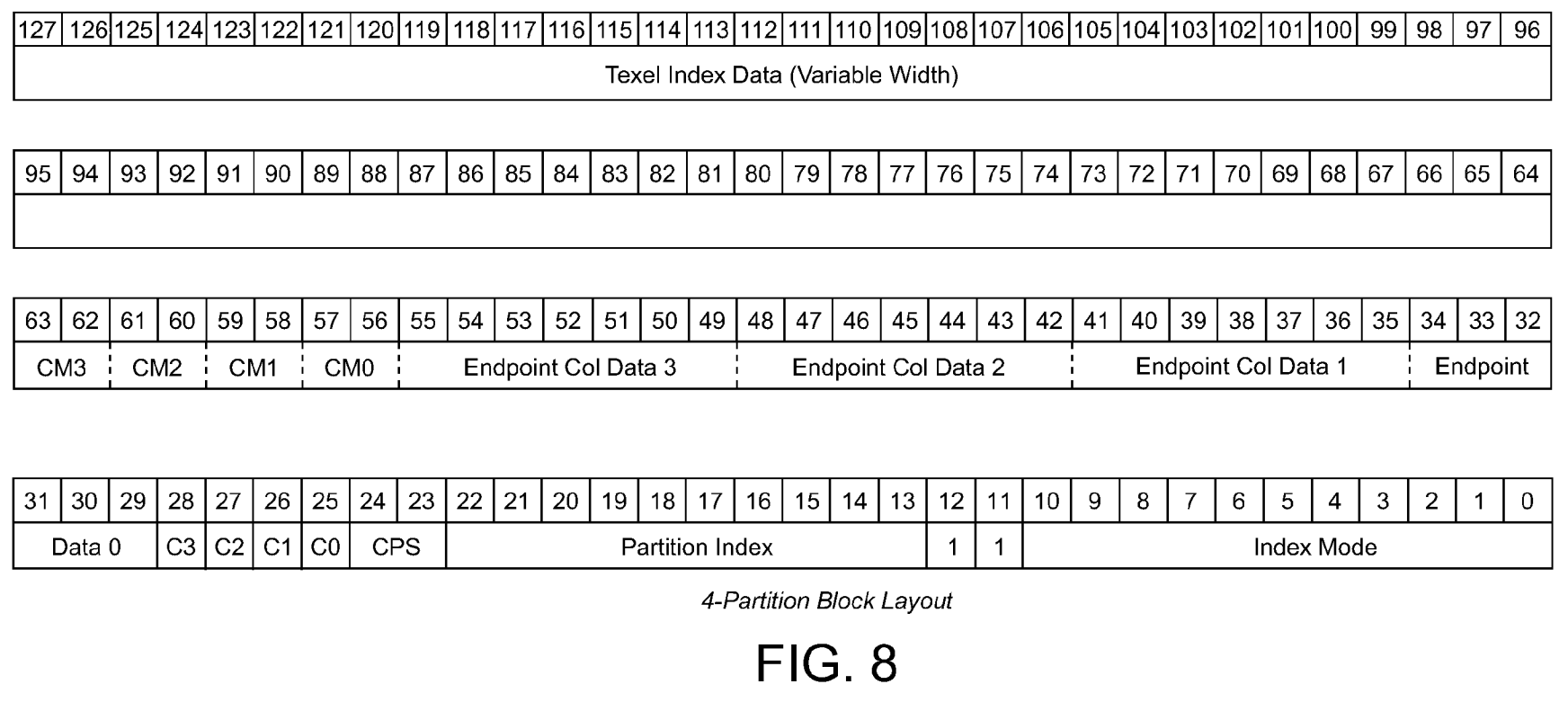

FIG. 8 shows the layout for a block that encodes a set of texture data elements that have been divided into four partitions. In this case, there is accordingly four sets of colour endpoint class and mode data and four sets of corresponding endpoint colour data, one for each partition. Also, as shown in FIG. 8, the "partition count−1" bits 11-12 are set accordingly to "11" to indicate that this is a four-partition block.

FIG. 9 shows the layout for a block that encodes a set of texture data elements that have been divided into two partitions and that also uses two index planes. In this case, as shown in FIG. 9, the block includes a colour component selector (CCS) field for the second index plane. In this case, this colour component selector appears directly below the additional colour endpoint mode bits (CM1) for the second partition, which are in turn directly below the texel index data bits. (The same layout rule (scheme) applies to three and four partition blocks with dual index planes.)

FIG. 10 shows the layout for a 2D void-extent block (i.e. a block indicating a constant colour value). Thus, as shown, bits 0 to 8 of the block are set to indicate that the block is a void-extent block.

As shown in FIG. 10, the void-extent block includes data indicating the constant colour for the block, and the extent over which that colour extends, in terms of low and high S and T values.

FIG. 11 shows the layout for a 3D void-extent block. This layout essentially corresponds to the 2D void-extent block layout shown in FIG. 10, but includes a further extent component P (as the encoded block represents a 3D block of texture data elements).

A number of variations and modifications to the described embodiment of the technology described herein would be possible, if desired.

For example, instead of using the encoding format of the present embodiment, other block based encoding schemes, such as S3TC, BC6 and BC7, could be used to encode the texel blocks.

In these cases, the endpoint colours to use for a block of texture data elements to be encoded should be determined in the manner discussed above. Then, as is known in the art, two additional colors should be derived through interpolation between the two endpoint colours to give a set of four colors for the block to be encoded that all lie on the determined straight line in the color-space.

Then, each texel in the block should be assigned an index indicating which of the four colours in the set of four colours for the block is to be used for the texel in question (in practice indicating which colour of the four colors for the block is closest to the texel's actual colour).

Similarly, although the present embodiment has been described above as testing plural different planes in the colour space when estimating the dominant direction of the set of texture data elements in question, it is possible to use just one plane, instead of plural planes, if desired. This will, as explained above, cause a loss of quality but will increase the encoding speed, and so may be tolerable for "ultrafast" encoding implementations.

In this case, the plane in the colour space to use is in an embodiment picked so as to avoid (known) common-case dominant-directions lying in or close to the plane. For example, for RGB color content, the dominant direction is usually fairly close to (1,1,1), so using the plane defined by (red+green+blue)=0 should yield good results in enough cases to be tolerable for an "ultrafast" encoder. In this case, the direction estimate would be:

For each offset texel value $T'_i$ compute the sum red+green+blue; add together all the texels for which this sum is positive.

As can be seen from the above, the technology described herein can comprise, in its embodiments at least, a method and system that estimate the direction along which a set of points in a low-dimensional space exhibits the greatest variance faster than what is possible with standard eigenvector based methods, for example.

The technology described herein can accordingly replace the traditional discrete Karhunen-Loewe Transform (KLT) (also known as Principal Component Analysis) methods with a much simpler method that nevertheless retains texture compression quality.

Since the method of the technology described herein only requires additions and comparisons and is devoid of things like multiplications/divisions/root-taking/special-case-handling, it is suitable for direct hardware implementation. Also, due to the reduced computational load, it is suitable for use with "ultrafast" software encoders. Thus, unlike the KLT, the method of the technology described herein is suitable for "ultrafast" texture compression and hardware texture compression.

This is achieved, in embodiments of the technology described herein at least, by estimating the dominant direction in the colour space of a set of texture data elements to be encoded by determining, for one or more planes that divide the texels in the colour space into two groups, the direction of the vector in the colour space from the point in the colour space of the average value of all the texture data elements of the set of texture data elements to be encoded whose values lie on one side of the plane in the colour space to the point in the colour space of the average value of all the texture data elements of the set of texture data elements to be encoded whose values lie on the other side of the plane in the colour space, and then selecting the longest one of determined direction vectors as the estimate of the dominant direction in the colour space of the set of texture data elements to be used when determining colour endpoint values to be used for the set of texture data elements when encoding the set of texture data elements.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of determining for a set of texture data elements to be encoded for use in a graphics processing system, a direction in the data space of the texture data elements to be used when determining a base data value or values to be used for the set of texture data elements when encoding the set of texture data elements, the method comprising:

determining by processing circuitry, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and using, by the processing circuitry, the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements.

2. The method of claim 1, wherein the set of texture data elements that is being encoded comprises all the texture data elements of a block of texture data elements that the texture has been divided into for encoding purposes, or a subset of the texture data elements of a block of texture data elements that the texture has been divided into for encoding purposes.

3. The method of claim 1, wherein the determining by the processing circuitry, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space comprises:

determining by the processing circuitry, for at least one plane that divides the set of texture data elements to be encoded into two groups in the data space, the direction of a vector in the data space from a point in the data space of an average value for the texture data elements of the set of texture data elements to be encoded whose values lie on one side of the plane in the data space to a point in the data space of an average value for the texture data elements of the set of texture data elements to be encoded whose values lie on the other side of the plane in the data space.

4. The method of claim 1, further comprising first determining by the processing circuitry an average texture data element value for the set of texture data elements being considered, and then offsetting each texture data element's value by the determined average value.

5. The method of claim 4 wherein:

the determining by the processing circuitry, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and the using, by the processing circuitry, the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements, comprise:

determining by the processing circuitry, for at least one plane that divides the offset values of the set of texture data elements to be encoded into two groups in the data space, the direction of a vector in the data space between the origin in the data space and the point in the data space of the sum of the offset values of the texture data elements of the set of texture data elements to be encoded whose values lie on one side of the plane in the data space; and using, by the processing circuitry, the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

6. The method of claim 1, wherein each plane that divides the texture data elements in the data space for which the direction of a vector in the data space is determined is perpendicular to one of the axes of the data space.

7. The method of claim 1, further comprising:

determining by the processing circuitry whether to use a determined direction for a plane that has been used to divide the texture data element values as the direction to use when determining a base data value or values to use when encoding the set of texture data elements on the basis of the length of the vector in the data space.

8. The method of claim 1, comprising determining by the processing circuitry the direction of a vector in the data space for each of plural different planes that divide the texture data elements in the data space.

9. The method of claim 8, further comprising selecting by the processing circuitry the direction determined in the data space of the texture data elements for one of the plural different planes that divide the texture data elements into two groups in the data space as the direction in the data space to use when determining a base data value or values to be used for the set of texture data elements when encoding the set of texture data elements on the basis of the lengths in the data space of the vectors that were used to determine the directions in the data space.

10. A method of encoding a texture map for use in a graphics processing system, the method comprising:

dividing a texture map to be encoded into a plurality of blocks of texture data elements; and for each block of texture data elements:

determining, for at least one plane that divides the block of texture data elements to be encoded into two groups in the data space, the direction of a vector in the data space from a point in the data space that is based on the values of texture data elements of the block of texture data elements to be encoded whose values lie on one side of the plane in the data space to a point in the data space that is based on the values of texture data elements of the block of texture data elements to be encoded whose values lie on the other side of the plane in the data space;

using the direction determined in the data space of the texture data elements for at least one of the at least one planes that divide the block of texture data elements into two groups in the data space to determine a direction in the data space to be used when determining a base data value or values to be used for the block of texture data elements when encoding the block of texture data elements;

using the at least one determined direction in the data space for the block of texture data elements to derive at least one base data value to be used when encoding the block of texture data elements; and encoding the block of texture data elements as a block of texture data representing the block of texture data elements using the derived at least one base data value.

11. The method of claim 10, wherein the step of using the at least one determined direction in the data space for the block of texture data elements to derive at least one base data value to be used when encoding the block of texture data elements comprises:

using the at least one determined direction in the data space for the block of texture data elements to derive a pair of endpoint data values to be used when encoding the block of texture data elements.

12. An apparatus for determining for a set of texture data elements to be encoded for use in a graphics processing system, a direction in the data space of the texture data elements to be used when determining a base data value or values to be used for the set of texture data elements when encoding the set of texture data elements, the apparatus comprising:

processing circuitry configured to:
determine, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and
use the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements.

13. The apparatus of claim 12, wherein the set of texture data elements that is being encoded comprises all the texture data elements of a block of texture data elements that the texture has been divided into for encoding purposes, or a subset of the texture data elements of a block of texture data elements that the texture has been divided into for encoding purposes.

14. The apparatus of claim 12, wherein the processing circuitry is configured to:
determine, for at least one plane that divides the set of texture data elements to be encoded into two groups in the data space, the direction of a vector in the data space from a point in the data space of an average value for the texture data elements of the set of texture data elements to be encoded whose values lie on one side of the plane in the data space to a point in the data space of an average value for the texture data elements of the set of texture data elements to be encoded whose values lie on the other side of the plane in the data space.

15. The apparatus of claim 12, wherein the processing circuitry is further configured to first determine an average texture data element value for the set of texture data elements being considered, and to then offset each texture data element's value by the determined average value.

16. The apparatus of claim 15 wherein the processing circuitry is configured to:
determine, for at least one plane that divides the offset values of the set of texture data elements to be encoded into two groups in the data space, the direction of a vector in the data space between the origin in the data space and the point in the data space of the sum of the offset values of the texture data elements of the set of texture data elements to be encoded whose values lie on one side of the plane in the data space; and
use the direction determined in the data space of the texture data elements for at least one of the at least one planes that divides the offset values of the set of texture data elements into two groups to determine a direction in the data space to be used when determining a base data value or values to be used for the set of texture data elements when encoding the set of texture data elements.

17. The apparatus of claim 12, wherein each plane that divides the texture data elements in the data space for which the direction of a vector in the data space is determined is perpendicular to one of the axes of the data space.

18. The apparatus of claim 12, wherein the processing circuitry is configured to determine whether to use a determined direction for a plane that has been used to divide the texture data element values as the direction to use when determining a base data value or values to use when encoding the set of texture data elements on the basis of the length of the vector in the data space.

19. The apparatus of claim 12, wherein the processing circuitry is configured to determine the direction of a vector in the data space for each of plural different planes that divide the texture data elements in the data space.

20. The apparatus of claim 19, wherein the processing circuitry is configured to select the direction determined in the data space of the texture data elements for one of the plural different planes that divide the texture data elements into two groups in the data space as the direction in the data space to use when determining a base data value or values to be used for the set of texture data elements when encoding the set of texture data elements on the basis of the lengths in the data space of the vectors that were used to determine the directions in the data space.

21. An apparatus for encoding a texture map for use in a graphics processing system, the apparatus comprising:
processing circuitry configured to:
divide a texture map to be encoded into a plurality of blocks of texture data elements;
and configured to, for each block of texture data elements:
determine, for at least one plane that divides the block of texture data elements to be encoded into two groups in the data space, the direction of a vector in the data space from a point in the data space that is based on the values of texture data elements of the block of texture data elements to be encoded whose values lie on one side of the plane in the data space to a point in the data space that is based on the values of texture data elements of the block of texture data elements to be encoded whose values lie on the other side of the plane in the data space;
use the direction determined in the data space of the texture data elements for at least one of the at least one planes that divide the block of texture data elements into two groups in the data space to determine a direction in the data space to be used when determining a base data value or values to be used for the block of texture data elements when encoding the block of texture data elements;
use the at least one determined direction in the data space for the block of texture data elements to derive at least one base data value to be used when encoding the block of texture data elements; and encode the block of texture data elements as a block of texture data representing the block of texture data elements using the derived at least one base data value.

22. The apparatus of claim 21, wherein the processing circuitry is configured to use the at least one determined direction in the data space for the block of texture data elements to derive a pair of endpoint data values to be used when encoding the block of texture data elements.

23. A non-transitory computer readable storage medium storing computer software code which when executing on a processor performs a method of determining for a set of texture data elements to be encoded for use in a graphics processing system, a direction in the data space of the texture data elements to be used when determining a base data value or values to be used for the set of texture data elements when encoding the set of texture data elements, the method comprising:

determining, for at least one plane that divides the set of texture data elements to be encoded into two groups in the data space, the direction of a vector in the data space from a point in the data space that is based on the values of texture data elements of the set of texture data elements to be encoded whose values lie on one side of the plane in the data space to a point in the data space that is based on the values of texture data elements of the set of texture data elements to be encoded whose values lie on the other side of the plane in the data space; and using the direction determined in the data space of the texture data elements for at least one of the at least one planes that divide the set of texture data elements into two groups in the data space to determine a direction in the data space to be used when determining a base data value or values to be used for the set of texture data elements when encoding the set of texture data elements.

* * * * *